United States Patent [19]

Giras et al.

[11] 4,029,952
[45] June 14, 1977

[54] ELECTRIC POWER PLANT HAVING A MULTIPLE COMPUTER SYSTEM FOR REDUNDANT CONTROL OF TURBINE AND STEAM GENERATOR OPERATION

[75] Inventors: Theodore C. Giras, Pittsburgh; William E. Mendez, Jr., Murrysville; Jack R. Smith, Pittsburgh, all of Pa.

[73] Assignee: Westinghouse Electric Corporation, Pittsburgh, Pa.

[22] Filed: Nov. 6, 1973

[21] Appl. No.: 413,275

[52] U.S. Cl. .................... 235/151.21; 290/40 R; 60/645; 415/15; 444/1
[51] Int. Cl.² ................ F01D 17/02; G05B 15/00; G06F 15/06
[58] Field of Search ....... 235/151.21, 150.5, 151.1, 235/151.3, 151; 444/1; 60/645, 646, 73; 340/172.5; 290/40 R; 415/15

[56] References Cited

UNITED STATES PATENTS

| | | | |
|---|---|---|---|
| 3,552,872 | 1/1971 | Biras et al. | 415/17 |
| 3,555,251 | 1/1971 | Shavit | 235/151 |
| 3,561,216 | 2/1971 | Moore, Jr. | 60/73 |
| 3,564,273 | 2/1971 | Cockrell | 415/17 X |
| 3,588,265 | 6/1971 | Berry | 415/17 X |

OTHER PUBLICATIONS

Application of the Prodac 50 System to Direct Digital Control. J. C. Belz, G. J. Kirk & P. S. Radcliffe, IEEE Intl. Conv. Rec. Part 3, 1965, pp. 102–122.

Monitoring and Automatic Control in Steam Power Stations by Process Computer, E. Doetsch & G. Hirschberg, Siemens Review XXXV(1968) No. 12, pp. 471–476.

*Primary Examiner*—Edward J. Wise
*Attorney, Agent, or Firm*—E. F. Possessky

[57] ABSTRACT

The electric power plant including a steam generator and a steam turbine is operated by a control system including two redundant digital computers. Switching circuitry is provided for coupling one of the computers through interface equipment to the steam generator and the turbine and a generator according to programmed computer control. A data link is established between the computers to transfer manual/automatic status and other needed data from the control computer to the standby computer. A system is provided for detecting when certain hardware and software malfunctions have occurred and for responsively transferring control to the standby computer. The standby computer is tracked to the control computer so that control computer transfer can be made reliably without disturbing the electric power generation process.

32 Claims, 43 Drawing Figures

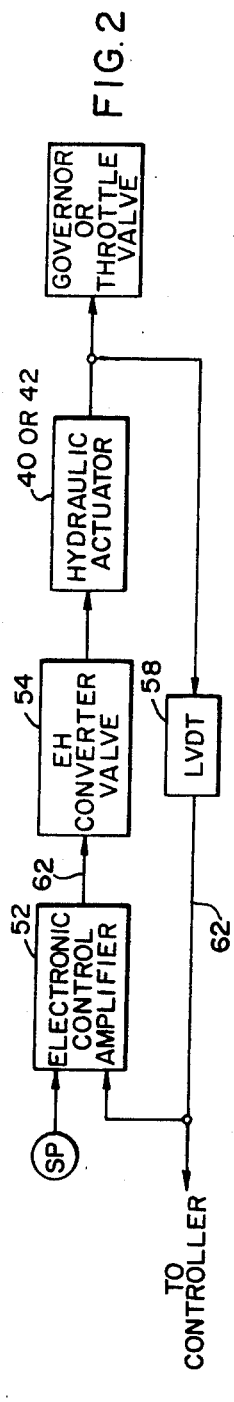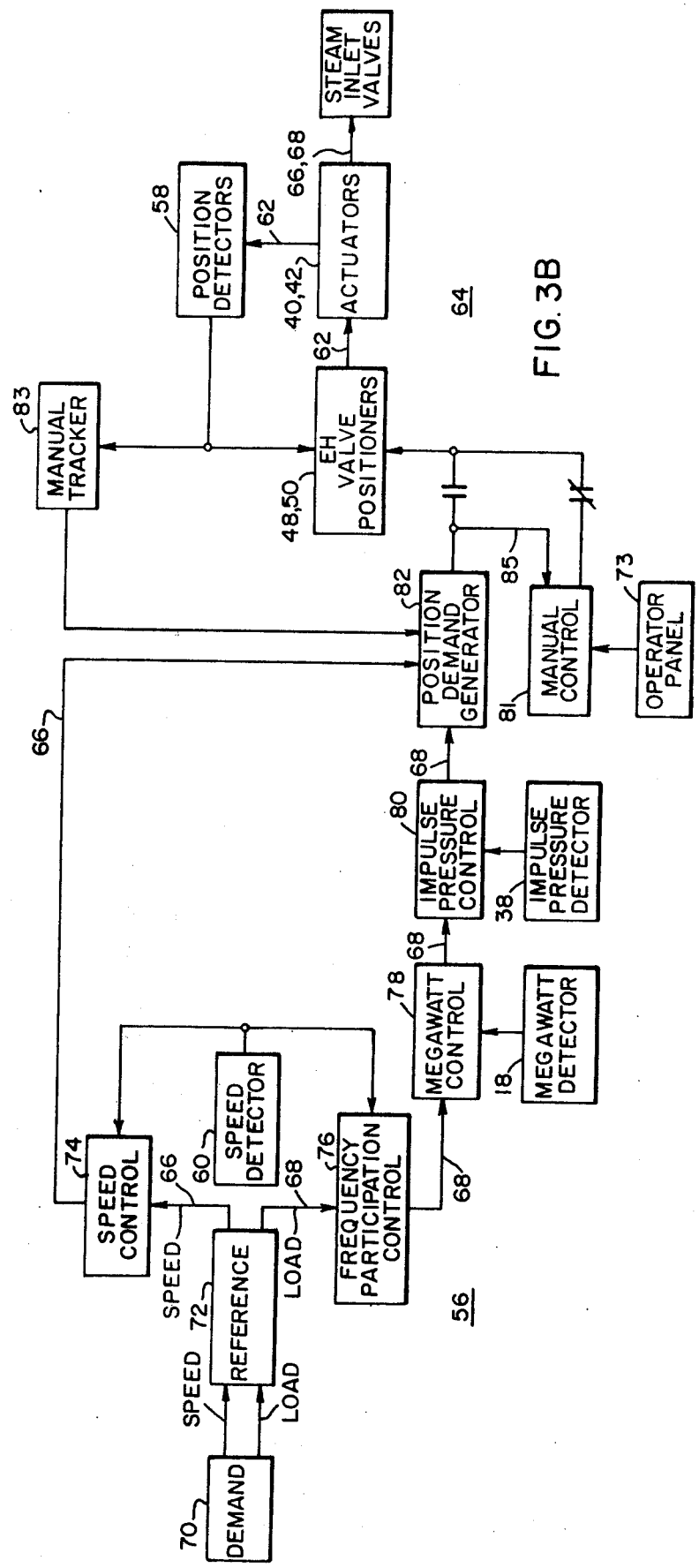

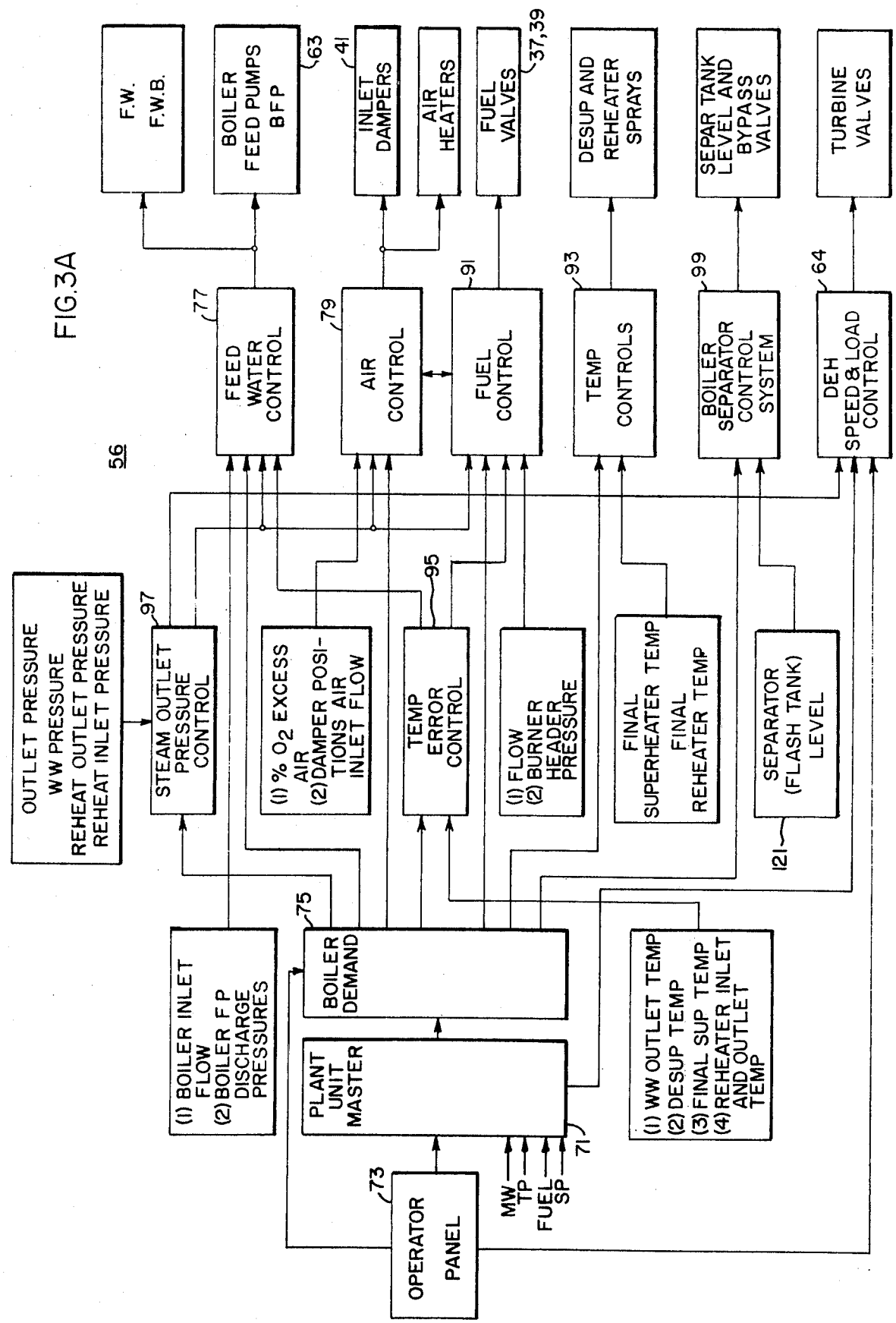

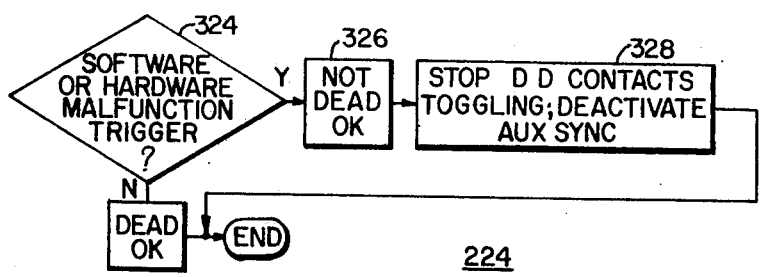
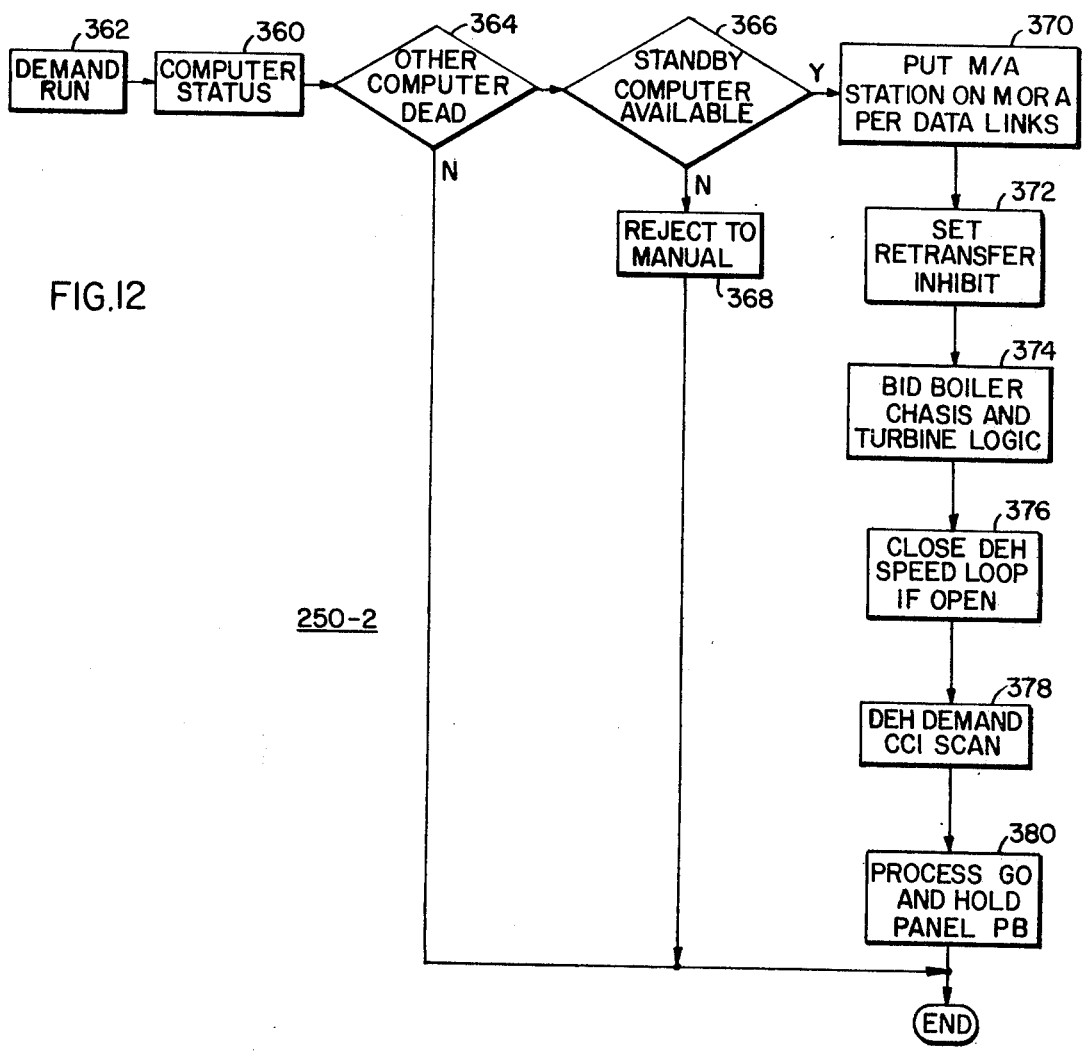

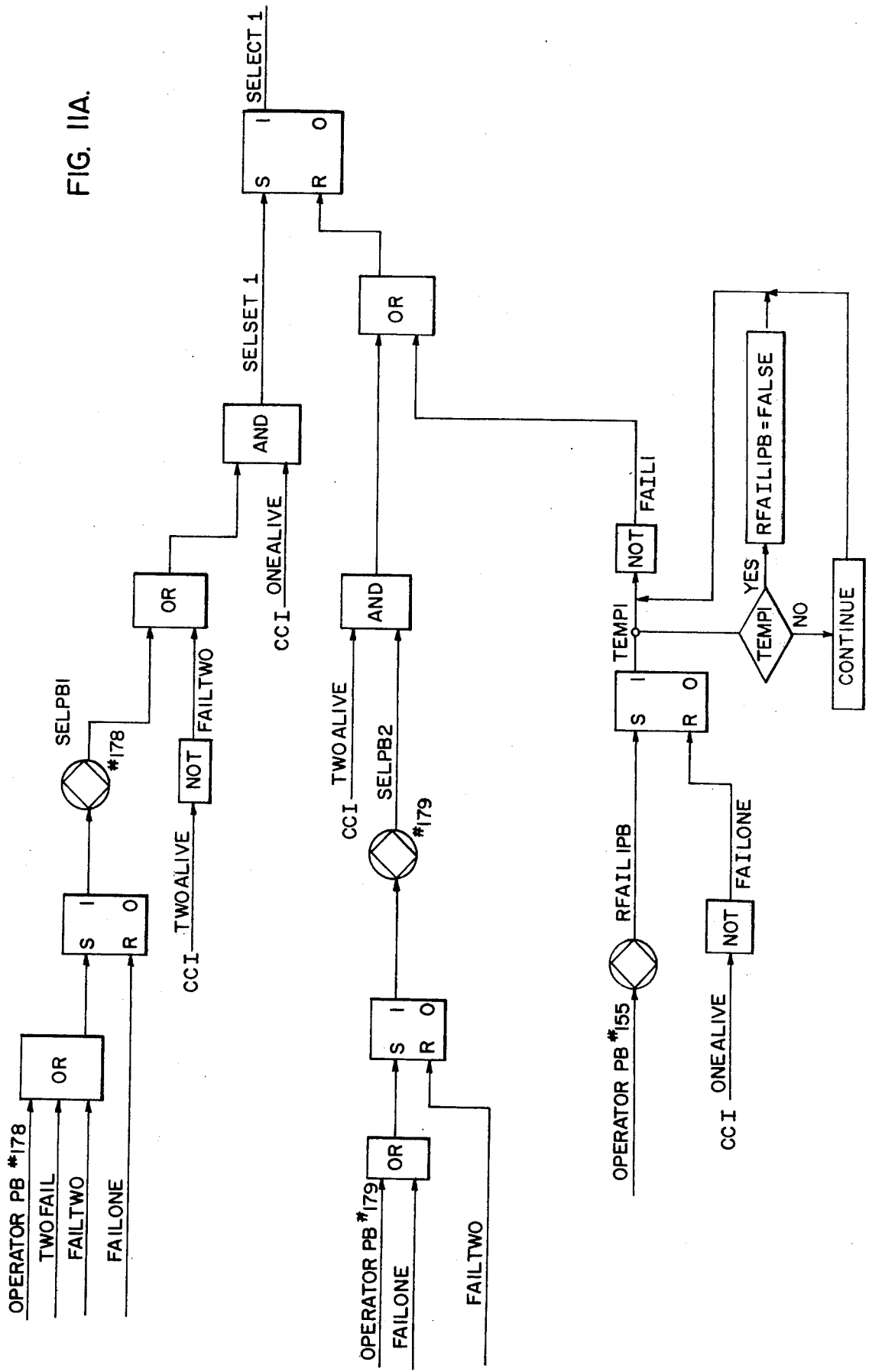
FIG. IIA.

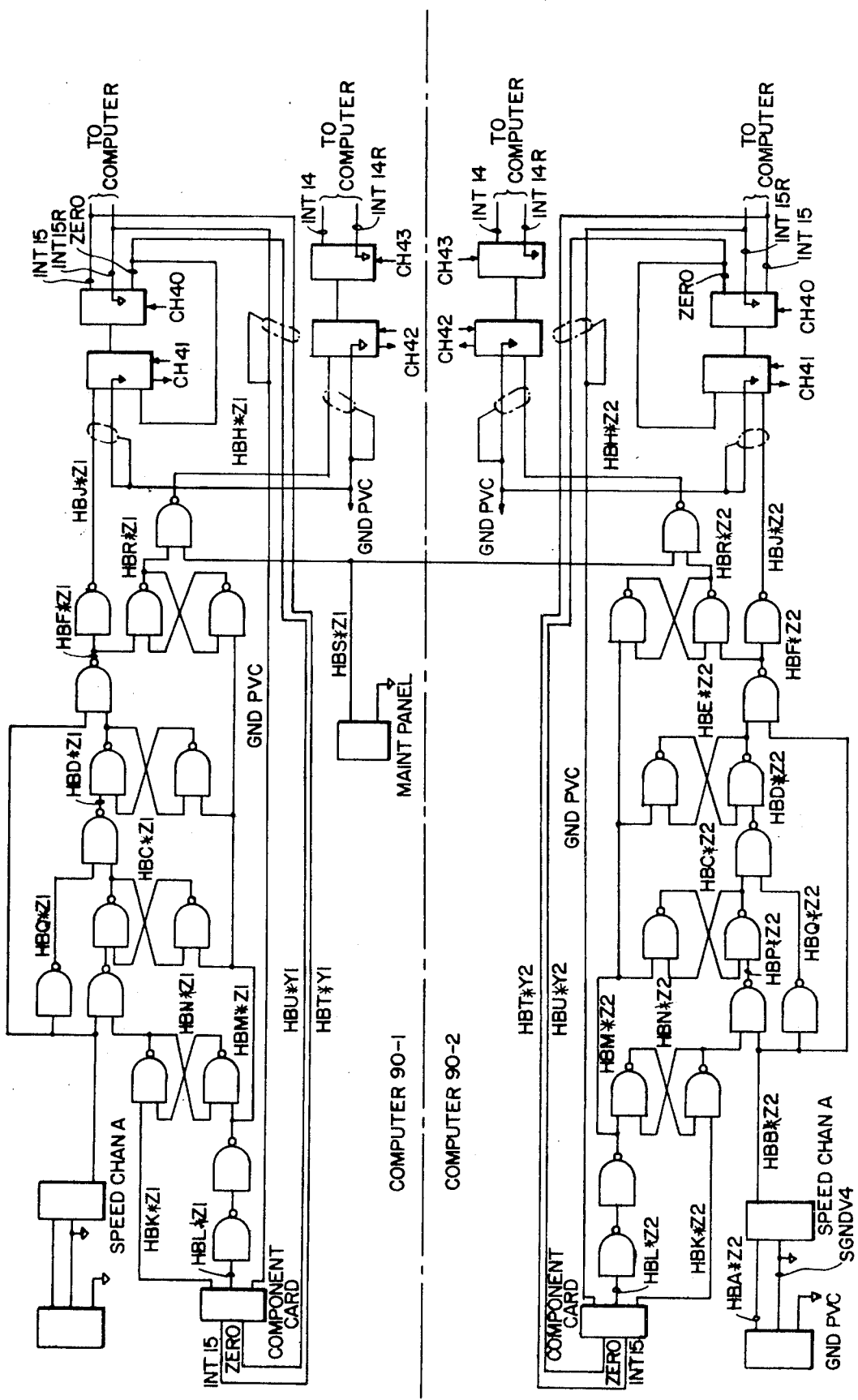

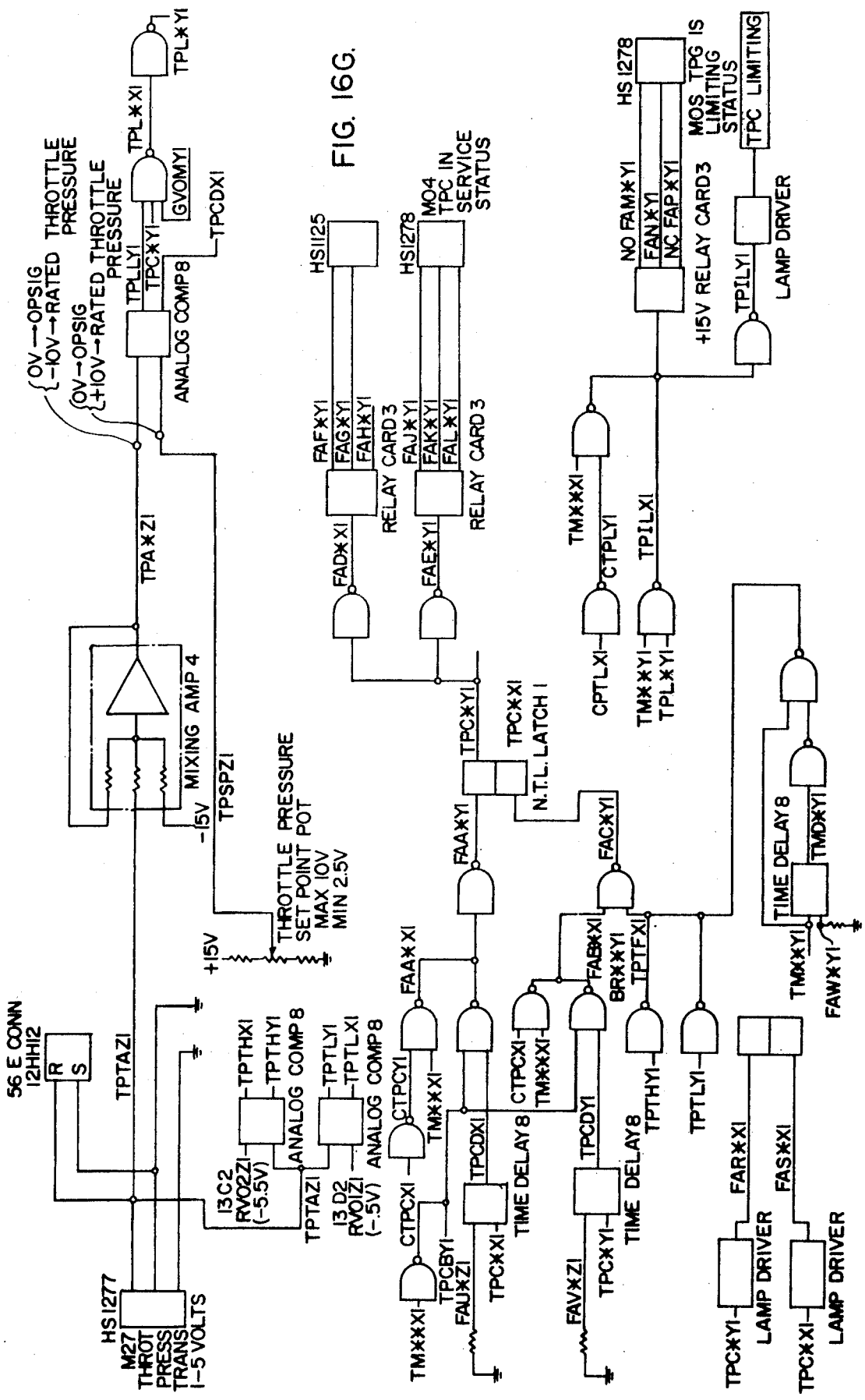

ELECTRIC POWER PLANT HAVING A MULTIPLE COMPUTER SYSTEM FOR REDUNDANT CONTROL OF TURBINE AND STEAM GENERATOR OPERATION

CROSS-REFERENCE TO RELATED APPLICATIONS

The following co-assigned patent applications are hereby incorporated by reference:

1. Ser. No. 250,826 entitled "A Digital Computer Monitored And/Or Operated System or Process Which Is Structured For Operation With An Improved Automatic Programming Process And System" filed by J. Gomola et al on May 5, 1972.

2. Ser. No. 247,877 entitled "System And Method For Starting, Synchronizing And Operating A Steam Turbine With Digital Computer Control" filed by T. Giras et al on April 26, 1972, abandoned.

3. Ser. No. 306,752 entitled "System And Method Employing Valve Management For Operating A Steam Turbine" filed by T. Giras et al on November 15, 1972.

4. Ser. No. 413,291 entitled "Plant Unit Master Control For Fossil Fired Boiler Implemented With A Digital Computer" filed by G. Davis and J. Smith concurrently herewith.

The following co-assigned patent applications are referenced as related applications:

1. Ser. No. 413,277, entitled "Protection System For Transferring Turbine And Steam Generator Operation To A Backup Mode Especially Adapted For Multiple Computer Electric Power Plant Control Systems" filed by G. Davis concurrently herewith, now Pat. No. 3,875,384.

2. Ser. No. 413,271, entitled "A Multiple Computer System For Operating A Power Plant Turbine With Manual Backup Capability" filed by G. Davis, R. Hoover and W. Ghrist concurrently herewith, now Pat. No. 3,898,444.

3. Ser. No. 413,274, entitled "A System For Initializing A Backup Computer In A Multiple Electric Power Plant And Turbine Control System To Provide Turbine And Plant Operation With Reduced Time For Backup Computer Availability" filed by G. Davis concurrently herewith.

4. Ser. No. 413,272, entitled "Control System With Adaptive Process Controllers Especially Adapted For Electric Power Plant Operation" filed by G. Davis concurrently herewith, now Pat. No. 3,939,328.

5. Ser. No. 413,278, entitled "A System For Manually Or Automatically Transferring Control Between Computers Without Power Generation Distrubance In An Electric Power Plant Or Steam Turbine Operated By A Multiple Computer Control System" filed by G. Davis concurrently herewith.

6. Ser. No. 413,273, entitled "Wide Load Range System For Transferring Turbine Or Plant Operation Between Computers In A Multiple Computer Turbine And Power Plant Control System" filed by G. Davis, F. Lardi and W. Ghrist concurrently herewith.

7. Ser. No. 413,276, entitled "Wide Speed Range System For Transferring Turbine Operation Between Computers In A Multiple Turbine Computer Control System" filed by D. Jones and G. Davis concurrently herewith.

BACKGROUND OF THE INVENTION

The present invention relates to the operation of steam turbines and electric power plants and amore particularly to the implementation of a multiple digital computer control system in the operation of steam turbines and electric power plants.

One highly significant factor in the security and safety of steam turbine and electric power plant operation is the reliability with which the turbine and plant controls function to make the turbine and steam generator operate at desired levels. Thus, if turbine or steam generator control becomes inoperative, the plant must be shut down with resultant loss of system power generation capacity, a corresponding loss of system security against blackouts and brownouts, cyclic stress damage to the expensive power generation equipment and possible loss of customer service and revenues where system loads must be cut back to match the resultant system power generation capacity. Therefore, electric power companies are especially interesting in purchasing highly secure control equipment.

In U.S. Pat. 3,552,872, issued to T. Giras and W. Barnes and in an improvement patent application W. E. Case 42,389, filed by A. Braytenbah on Oct. 14, 1970, there is disclosed a control system which operates a steam turbine with high reliability. The control system includes a digital control computer which is interfaced with a manual backup control so as normally to provide automatic turbine operation and so as to transfer automatically and bumplessly to manual backup control in the event of certain contingencies. In the above-referenced U.S. Pat. it is suggested that a digital computer control can be used as a backup turbine controller if it is economically justifiable, but the manner in which this can be done and the desirability of backup computer control are not considered. Similarly, in a paper entitled "Steps To Automation" presented by J. Rocca at the Nov. 16-20, 1969 meeting of the Power Division of The American Society of Mechanical Engineers and a paper entitled "The Control Computer Installation At The Moss Landing Power Plant" presented by J. Rocca to the prospective fact of redundant backup computer control is set forth but means for providing such control are not disclosed. While multiple computer configurations have been used in hierarchical arrangements for operating various types of processes including electric power plants, and while multiple computers may have been used in various configurations with varying degrees of backup capability among the computers in some industrial processes, no multiple computer configuration is known to have been applied to power generation plants for computer backup for the whole of or a substantial portion of primary turbine and or steam generator control loops in a primary computer.

In fact, a power plant or turbine control system with one or more backup computers is desirable for a number of reasons. For example, with a backup computer control, completely automatic backup control is possible even though the main computer controller is down. With manual backup control only, failure of the on-line automatic control system can result in reliable plant and turbine operation but the backup operation requires operator attention and it is limited in flexibility and control function. Another factor that makes backup computers desirable is that the standby or off-line computer or computers can be used for other purposes at various times in the plant life. Thus, the standby computer(s) can be used off-line to process data in accordance with programs loadable into the standby computer(s) for that purpose. Further, the standby computer(s) can be used for plant simulation for plant installation and maintenance purposes and for operator training as disclosed in various papers including a paper entitled "A Training Simulator For A Digitally Controlled 750 MW Thermopower Generating Unit" presented by R. F. Hawes, L. M. Koskela, J. R. Smith and U. G. Ronnen to the April 1970 Chicago American Power Conference, a paper entitled "The Real-Time Simulation Of A Once-Through Supercritical Generating Unit" presented by U. G. Ronnen at the July 9, 1972 IEEE Power Engineering Society Symosium on Adequacy and Philosophy of Modeling: System Dynamic Performance in San Francisco California, a paper entitled "Systems Engineering Considerations In The Development Of Industrial Training Simulators" presented by J. R. Smith and U. G. Ronnen to the April 1971 Pittsburgh Conference on Modeling Simulation, a paper entitled "Design And Modeling Considerations For On-Site Real-Time Training Simulators For Power Plants" presented by J. R. Smith and U. G. Ronnen to the June 1972 San Diego Simulation Conference, and an article entitled "Simulator Helps Train Plant Operators" published in the June 1971 issue of "Power Magazine".

It is also especially noteworthy that extended turbine and plant security can be realized with multiple computer plant and turbine operation. Thus, the primary computer and the standby computer(s) may be interfaced with a manual backup control and thereby provide for turbine and plant operation with a control failure probability defined by the combined failure probability of the multiple computer controls and the manual backup control. Further, and nearly as importantly, an automatic control failure probability is then defined by the combined failure probabilities of the multiple computer control. In a dual computer configuration of P2000 computers for example, the probable failure rate for the computer control portion of the control system is specified to be 6000 HR MTBF where the idividual failure rates are specified to be 4000 HR MTBF (Hours Mean Time Between Failures). With the provision of advanced system operating techniques not possible with a single computer control system, the MTBF of the dual computer configuration can be raised to values up to 35,000 HR or more.

One of the principal problems associated with implementing backup computer control in an electric power plant is that associated with poviding a system which provides for reliable and secure automatic transfer without disturbing the electric power generation process. If the transfer mechanism is inaccurate or unreliable, there may be a failure in the object to achieve increased plant and turbine security through backup computer control. The fact that in the typical power plant application a large number of manual/automatic control loops must be switched on a transfer makes it especially difficult to obtain relatively improved overall reliability.

Further, and most importantly, the potential for multi-million dollar turbine wrecks or boiler explosions and consequential personnel injuries exists in accordance with the likelihood that a major disturbance would be induced during a transfer between control computers by the very act of the transfer. It is accordingly especially important that the transfer mechanism be reliable. There is no progress if the allegedly improved system apparently produces better plant security but in fact causes extensive damage at some point in time when it fails in a destructive manner. For example, the on-line computer may be operating the plant at a 250 MW level when it fails and a transfer is made to a backup controller. If some additional malfunction has occurred so as to cause the backup control to call for a 500 MW level of plant operation, responsive opening turbine valve movement to this new demand could be so fast that all of the stored energy would be drawn out of the steam generator to cause wet steam to enter the turbine and machine off or wreck the front row or rows of blades in any one or any combination of the high pressure, intermediate pressure and low pressure sections.

A great variety of malfunction conditions could occur at the time of transfer to cuase the extreme consequences of immediate boiler or turbine damage or, as would more often tend to be the case, the less extreme but highly undesirable consequences of a boiler or turbine trip or an undesirable equipment stress cycle without a trip. An unnecessary trip and associated stress cycling could occur, for example, if a controller malfunction occurs such that at the time of transfer the on-line computer is calling for 70% load and the backup controller calls for 40% load resulting in closing movement of the turbine valves which restricts the boiler flow and causes a boiler overpressure trip.

Among other significant problems associated with implementation of backup computer control in an electric plant is that of determining what types of contingencies and what specific contingencies should initiate automatic protection transfers between control computers and devising a protective transfer system for triggering control computer transfers.

In the present application, no representation is made that any cited prior patent or other art is the best prior art not that the interpretation placed on such art herein is the only interpretation that can be placed on that art.

SUMMARY OF THE INVENTION

An electric power plant comprises one or more turbines and a steam generator and a control system which includes at least two digital computers. An arrangement is provided in the control system for safely and bumplessly executing control transfers between computers during turbine and steam generator operation and for executing such transfers under certain predetermined conditions. Means are provided for dynamically structuring the stanby computer like the controlling computer as the process is operated so that the standby computer is available for transfer.

BRIEF DESCRIPTION OF THE DRAWINGS

FIG. 2 shows a schematic block diagram of a position control loop for electrohydraulic valves empolyed in a turbine included in the plant of FIG. 1A;

FIG. 3A shows a schematic block diagram of a plant unit master control system for the electric power plant shown in FIG. 1A;

FIG. 3B shows a control loop diagram for the steam turbine in the electric power plant of FIG. 1A;

FIG. 9 shows a flow chart for a computer status detection program employed in the computer transfer system of FIG. 6;

FIGS. 11A and 11B show block diagrams which detail the logic employed in the two computers to identify the selected computer;

FIG. 12 shows a flow chart for a boiler logic program;

FIGS. 15A1 and 15A2 show a schematic diagram of analog input systems provided for the digital computers of FIG. 4;

FIGS. 16A-16E, 16F1, 16F2 and 16G 16J show various circuits in a DEH hybrid panel including a manual turbine backup control and electronic circuitry for interfacing the computer control system with the turbine hydraulically operated valves.

DESCRIPTION OF THE PREFERRED EMBODIMENT

Electric Power Plant and Steam Turbine System

Figure 1A:
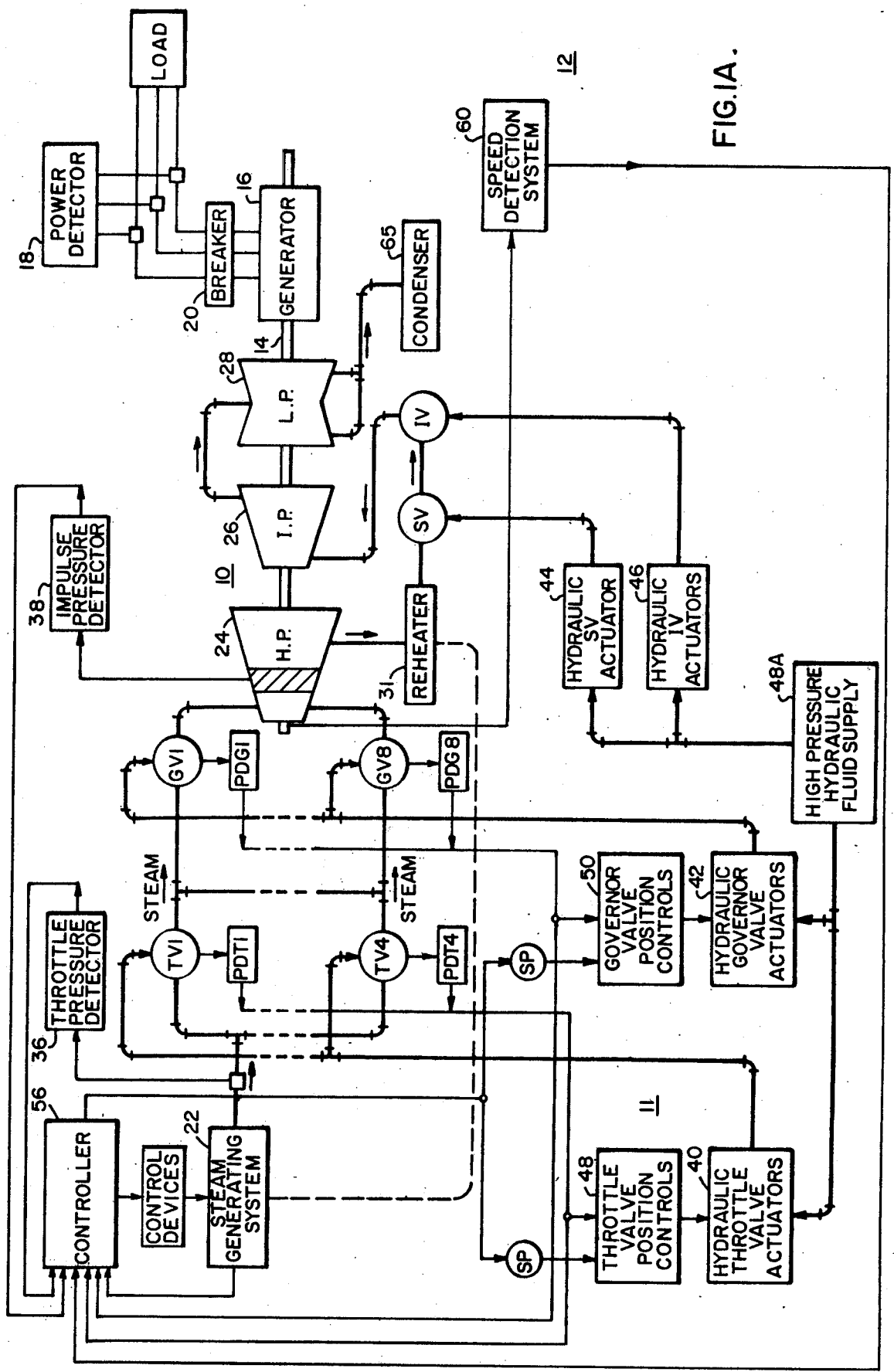
FIG. 1A shows a schematic block diagram of an electric power plant which is operated by a control system in accordance with the principles of the invention.

More specifically, there is shown in FIG. 1A a large single reheat steam turbine 10 and a steam generating system 22 constructed in a well known manner and operated by a control system 11 in an electric power plant 12 in accordance with the principles of the invention. The turbine 10 and the turbine control functions are like those disclosed in the cross-referenced Uram copending patent application Ser. No. 247,877 entitled "System For Starting, Synchronizing and Operating a Steam Turbine With Digital Computer Control", abandoned.

The turbine 10 is provided with a single output shaft 14 which drives a conventional large alternating current generator 16 to produce three-phase electic power sensed by a power detector 18. Typically, the gnerator 16 is connected through one or more breakers 20 per phase to a large electric power network and when so connected causes the turbo-generator arrangement to operate at synchronous speed under steady state conditions. Under transient electric load change conditions, system frequency may be affected and conforming turbo-generator speed changes would result if permitted by the electric utility control engineers.

After synchronism, power contribution of the generator 16 to the network is normally determined by the turbine steam flow which in this instance is normally supplied to the turbine 10 at substantially constant throttle pressure. The constant throttle pressure steam for driving the turbine 10 is developed by the steam generating system 22 which in this case is provided in the form of a conventional once through type boiler operated by fossil fuel in the form of natural gas or oil. The boiler 22 specifically can be a 750 MW Combustion Engineering supercritical tangentially fired gas and oil fuel once through boiler.

In this case, the turbine 10 is of the multistage axial flow type and it includes a high pressure section 24, an intermediate spressure section 26, and a low pressure section 28 which are designed for fossil plant operation. Each of the turbine sections may include a plurality of expansion stages provided by stationary vanes and an interacting bladed rotor connected to the shaft 14.

Figure 1B:
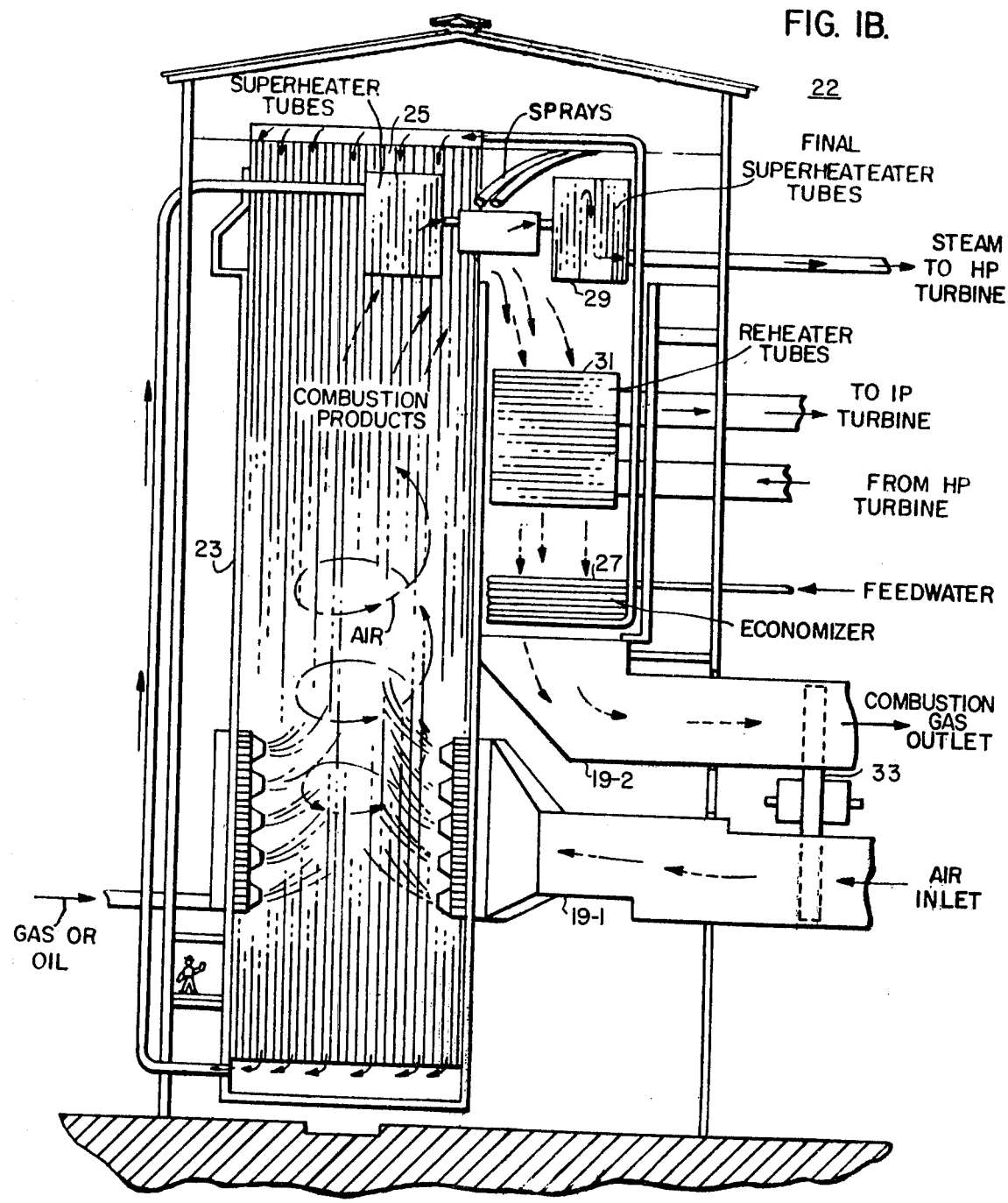
FIG. 1B shows a schematic view of a once-through boiler employed in the plant of FIG. 1A, with portions of the boiler cut away.
Figure 1B:
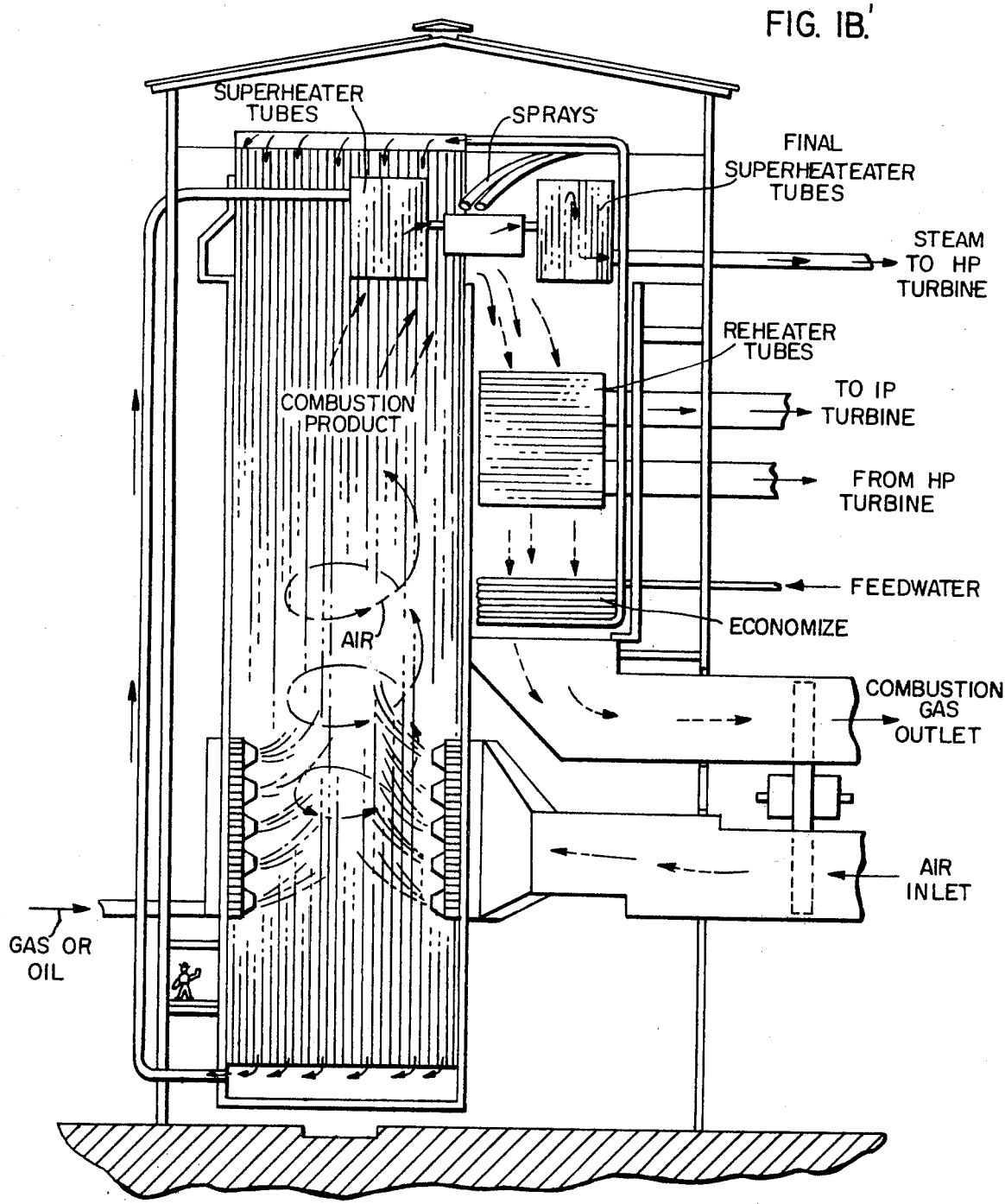

As shown in FIG. 1B, the once-through boiler 22 includes walls 23 along which vertically hung waterwall tubes 25 are distributed to pass preheated feedwater from an economizer 27 to a superheater 29. Steam is directed from the superheater 29 to the turbine HP section 24 and steam from the HP section 24 is redirected to the boiler 22 through reheater tubes 31 and back to the turbine IP section 26. The feedwater is elevated in pressure and temperature in the waterwall tubes 25 by the heat produced by combustion in approximately the lower half of the furnace interior space.

Five levels of burners are provided at each of the four corners of the furnace. The general load operating level of the plant determines how many levels of burners are in operation, and the burner fuel flow is placed under control to prodice particular load levels. At any one burner level, both gas and oil burners are provided but only one type of burner is normally operated at any one time.

Combustion air is preheated by the exhaust gases and enters the furnace near the furnace corners through four inlet ducts 19-1 under the driving force of four large fans. Air flow is basically controlled by positioning of respective dampers in the inlet ducts.

Hot products of combustion pass vertically upward through the furnace to the superheater 29. The hot exhaust gases then pass through the reheater tubes 31 and then through the feedwater economizer 27 and an inlet air heat exchanger 33 in an exhaust duct 19-2 prior to being exhausted in the atmosphere through a large stack.

Figure 1C:
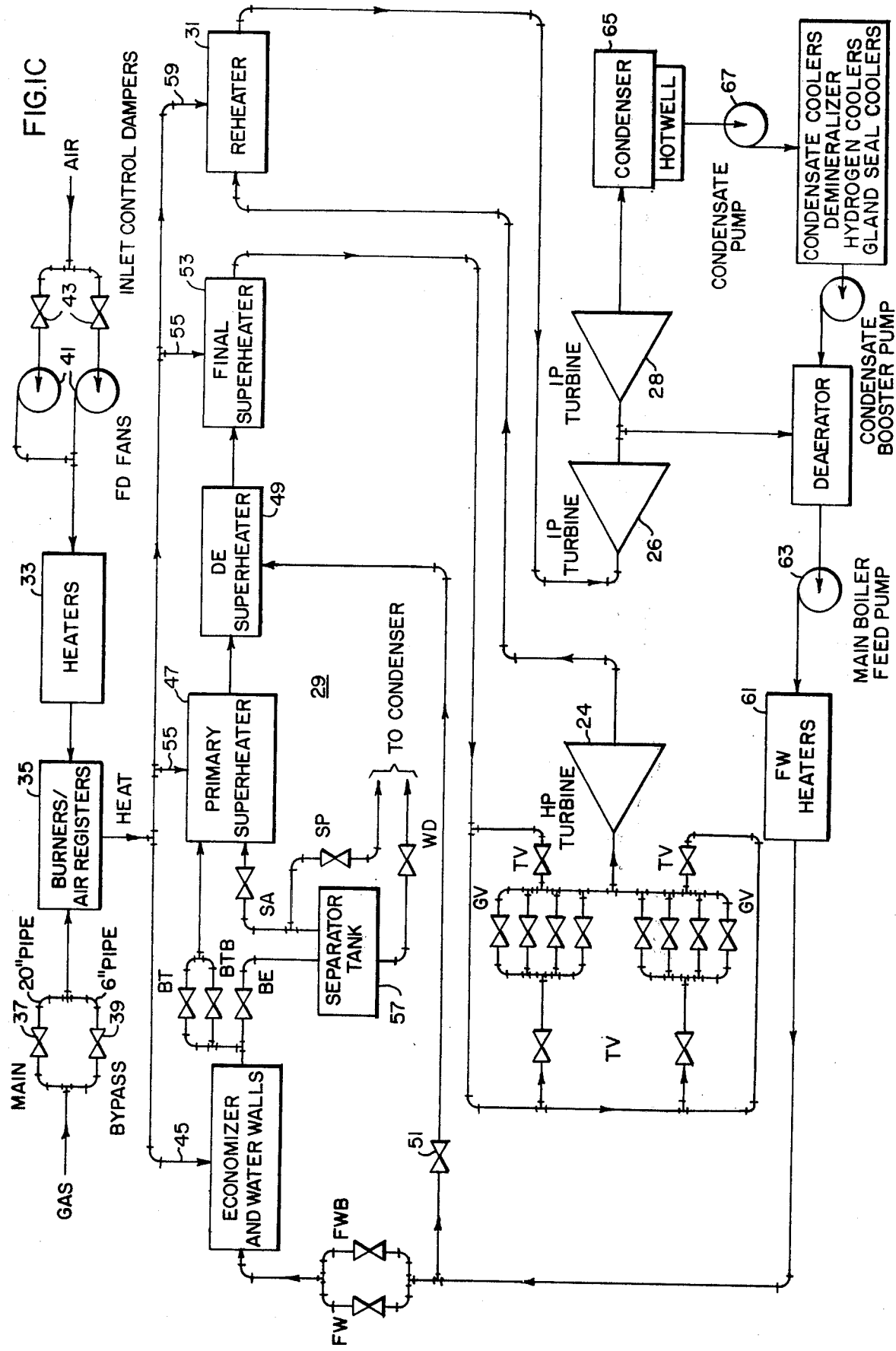
FIG. 1C shows a process flow diagram for the electric power plant of FIG. 1A.
Figure 1C:
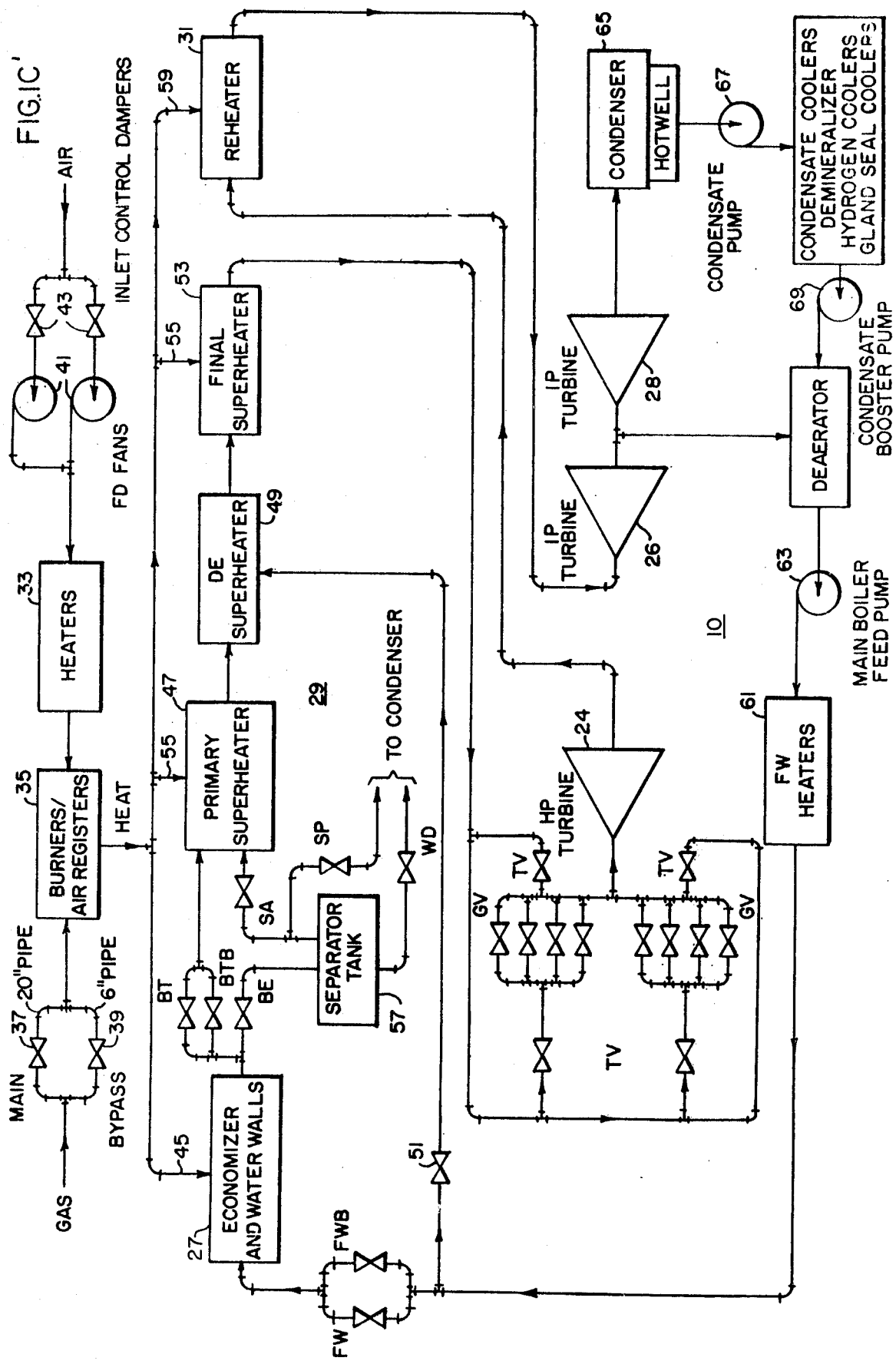

In FIG. 1C, there is shown a schematic process flow diagram which indicates how the plant working fluid is energized and moved through the turbine 10 to operate the generator 16 and produce electric power. Thus, gas or other fuel is supplied to burners 35 through main valves 37 or bypass valves 39. Air for combustion is supplied through the preheaters 33 and air registers to the combustion zone by fans 41 under flow control by dampers 43.

Feedwater is preheated by heaters 61 and flows under pressure produced by boiler feedwater pumps 63 to the economizer 27 and waterwall tubes 25 through valve FW or startup valve FWB. Heat is transferred to the working fluid in the economizer 27 and waterwall tubes 25 as indicated by the reference character 45. Next, the working fluid flows to the superheater 29 comprising a primary superheater 47, a desuperheater 49 to which cooling spray can be applied through a valve 51, and a final superheater 53. Heat is added to the working fluid as indicated by the reference character 55 in the superheaters 29. Valves BT and BTB pass the working fluid to the superheater 29 after boiler startup, and valves BE, SA, SP and WD cooperate with a separator tank 57 and a condenser 65 to separate steam and water flows and regulate superheater working fluid flow during boiler startup.

Boiler outlet steam flows from the final superheater 53 through the turbine inlet throttle and governor valves to the turbine HP section 24. The steam is then reheated in the reheater 31 as indicated by the reference character 59 and passed through the IP and LP turbine sections 26 and 28 to the condenser 65. Condenser pumps 67 and 69 then drive the return water to the boiler feed pump 63 through condensate and hydrogen cooling systems, and makeup water is supplied through a demineralizer treatment facility.

The fossil turbine 10 in this instance employs steam chests of the double ended type, and steam flow is directed to the turbine steam chests (not specifically indicated) through four main inlet valves or throttle inlet valves TV1-TV4. Steam is directed from the admission steam chests to the first high pressure section expansion stage through eight governor inlet valves GV1-GV8 which are arranged to supply steam to inlets arcuately spaced about the turbine high pressure casing to constitute a somewhat typical governor valve arrangement for large fossil fuel turbines. Nuclear turbines on the other hand typically utilize only four governor valves. Generally, various turbine inlet valve configurations can involve different numbers and/or arrangements of inlet valves.

In applications where the throttle valves have a flow control capability, the governor valves GV1-GV8 are typically all fully open during all or part of the startup process and steam flow is then varied by full arc throttle valve control. At some point in the startup and loading process, transfer is normally and preferably automatically made from full arc throttle valve control to full arc governor valve control because of throttling energy losses and/or reduced throttling control capability. Upon transfer, the throttle valves TV1-TV4 are fully open, and the governor valves GV1-GV8 are positioned to produce the steam flow existing at transfer. After sufficient turbine heating has occurred, the operator would typically transfer from full arc governor valve control to partial arc governor valve control to obtain improved heating rates.

In instances where the main steam inlet valves are stop valves without flow control capability as is often the case in nuclear turbines, initial steam flow control is achieved during startup by means of a single valve mode of governor valve operation. Transfer can then be made to sequential governor valve operation at an appropriate load level.

In the described arrangement with throttle valve control capability, the preferred turbine startup and loading method is to raise the turbine speed from the turning gear speed of about 2 rpm to about 80% of the synchronous speed under throttle valve control, then transfer to full arc governor valve control and raise the turbine speed to the synchronous speed, then close the power system breakers and meet the load demand with full or partial arc governor valve control. On shutdown, governor valve control or coastdown may be employed. Other throttle/governor valve transfer practice may be employed but it is unlikely that transfer would be made at a loading point above 40% rated load because of throttling efficiency considerations.

Similarly, the conditions for transfer between full arc and partial arc governor valve control modes can vary in other applications of the invention. For example, on a hot start it may be desirable to transfer from throttle valve control directly to partial arc governor valve control at about 80% synchronous speed.

After the steam has crossed past the first stage impulse blading to the first stage reaction blading of the high pressure section 24, it is directed to the reheater 31 as previously described. To control the flow of reheat steam, one or more reheat stop valves SV (FIG. 1A) are normally open and closed only when the turbine is tripped. Inerceptor valves IV (only one indicated), are also provided in the reheat steam flow path.

A throttle pressure detector 36 of suitable conventional design senses the steam throttle pressure for data monitoring and/or turbine or plant control purposes. As required in nuclear or other plants, turbine control action can be directed to throttle pressure control as well as or in place of speed and/or load control.

In general, the steady state power or load developed by a steam turbine supplied with substantially constant throttle pressure steam is proportional to the ratio of first stage impulse pressure to throttle pressure. Where the throttle pressure is held substantially constant by external control, the turbine load is proportional to the first stage impulse pressure. A conventional pressure detector 38 is employed to sense the first stage impulse pressure for assigned control usage in the turbine part of the control 11.

A speed detection system 60 is provided for determining the tubine shaft speed for speed control and for frequency participation control purposes. The speed detector 60 can for example include a reluctance pickup (not shown) magnetically coupled to a notched wheel (not shown) on the turbo-generator shaft 14. In the present case, a plurality of sensors are employed for speed detection.

Respective hydraulically operated throttle valve actuators 40 and governor valve actuators 42 are provided for the four throttle valves TV1-TV4 and the eight governor valves GV1-GV8. Hydraulically operated actuators 44 and 46 are also provided for the reheat stop and interceptor valves SV and IV. A high pressure hydraulic fluid supply 48A provides the controlling fluid for actuator operation of the valves TV1-TV4, GV1-GV8, SV and IV. A lubricating oil system (not shown) is separately provided for turbine plant lubricating requirements.

The inlet valve actuators 40 and 42 are operated by respective electrohydraulic position controls 48 and 50 which form a part of the control system 11. If desired, the interceptor valve actuators 46 can also be operated by a position control (not shown).

Each turbine valve position control includes a conventional electronic control amplifier 52 (FIG. 2) which drives a Moog valve 54 or other suitable electrohydraulic (EH) converter valve in the well known manner. Since the turbine power is proportional to steam flow under substantially constant throttle pressure, inlet valve positions are controlled to produce control over steam flow as an intermediate variable and over turbine speed and/or load as an end controlled variable or variables. The actuators position the steam valves in response to output position control signals applied through the EH converters 54. Resepective throttle and governor valve position detectors PDT1-PDT4 and PDG1-PDG8 (FIG. 1A) are provided to generate respective valve position feedback signals which are combined with respective valve position setpoint signals SP to provide position error signals from which the control amplifiers 52 generate the output control signals.

The setpoint signals SP (FIG. 1A) are generated by a controller system 56 which also forms a part of the control system 11 and includes multiple control computers and a manual backup control. The throttle and governor valve position detectors are provided in suitable conventional form, for example they may be linear variable differential transformers 58 (FIG. 2) which generate negative position feedback signals for algebraic summing with the valve position setpoint signals SP.

The combination of the amplifier 52, converter 54, hydraulic actuator 40 or 42, and the associated valve position detector 58 and other miscellaneous devices (not shown) form a local analog electrohydraulic valve position control loop 62 for each throttle or governor inlet steam valve.

Plant Master Control

After the boiler 22 and the turbine 10 are started under manual/automatic control, a plant unit master 71 (FIG. 3A) operates as a part of the computer controller system 56 and coordinates lower level controls in the plant control hierarchy to meet plant load demand in an efficient manner. Thus, in the integrated plant mode, the plant unit master 71 implements plant load demand entered by the operator from a panel 73 or from an automatic dispatch system by simultaneously applying a corresponding turbine load demand to a digital electrohydraulic (DEH) speed and load control 64 for the turbine 10 and a corresponding boiler demand applied to a boiler demand generator 75 for distribution across the various boiler subloops as shown in FIG. 3A to keep the boiler 22 and the turbine 10 in step. Under certain contingency conditions, the plant unit master 71 rejects from integrated control and coordinates the plant operation in either the turbine follow mode or the boiler follow mode. If the plant unit master 71 is not functioning, load is controlled through a boiler demand generator 75 and the turbine load is controlled directly from the operator panel 73.

In some usages, "coordinated control" is equated to "integrated control" which is intended to mean in step or parallel control of a steam generator and a turbine. However, for the purposes of the present patent application, the term coordinated control is intended to embrace the term "integrated control" and in addition it is intended to refer to the boiler and turbine follow modes of operation in which control is "coordinated" but not "integrated". Once-Through Boiler Controls Feedwater flow to the economizer 27 (FIG. 1C) is controlled by setting the speed of the boiler feed pumps 63 and the position of the FW or FWB (startup) valve. Generally, valve stems and other position regulated mechanisms are preferably positioned by use of a conventional electric motor actuator. Air flow is controlled by two speed fans and dampers 41 and fuel flow is controlled by the valves 37, 39.

In the boiler part of the control system 11, first level control for the feedwater pumps 63 and the feedwater valves is provided by a feedwater control 77 which responds to load demand from the boiler demand generator 75 and to process variables so as to keep the feedwater flow dynamically in line with the load demand. Similarly, first level control is provided for the fans and the fuel valves respectively by an air control 79 and a fuel control 91. Fuel-air ratio is regulated by interaction between the air and fuel controls 79 and 91. The air and fuel controls respond to the boiler demand generator 75 and process variables so that water, fuel and air flows are all kept in step with load demand.

A first level temperature control 93 operates desuperheater and reheater sprays to drop outlet steam temperature as required. A second level temperature error control 95 responds to the boiler demand and to process variables to modify the operation of the feedwater and fuel controls 77 and 91 for outlet steam temperature control. Another second level control is a throttle pressure control 97 which modifies turbine and boiler flow demands to hold throttle pressure constant as plant load demand is met.

During startup, the level of the flash or separator tank 57 and the operation of the bypass valves referred to in connection with FIG. 1C are controlled by a boiler separator control system 99. Once the boiler 22 is placed in load operation, the boiler separator control system 99 is removed from control.

Generally, individual boiler control loops and boiler subcontrol loops in the control system 11 can be operated automatically or manually from the panel 73. Where manual control is selected for a lower control sub-loop and it negates higher level automatic control, the latter is automatically rejected for that particular subloop and higher control loops in the hierarchy.

Steam Turbine Control Loops

In FIG. 3B, there is shown the preferred arrangement 64 of control loops employed in the control system 11 to provide automatic and manual turbine operation. To provide for power generation continuity and security, a manual backup control 81 is shown for implementing operator control actions during time periods when the automatic control is shut down. Relay contacts effect automatic or manual control operation as illustrated. Bumpless transfer is preferably provided between the manual and automatic operating modes, and for this purpose a manual tracker 83 is employed for the purpose of updating the automatic control on the status of the manual control 81 during manual control operation and the manual control 81 is updated on the status of the automatic control during automatic control operation as indicated by the reference character 85.

The control loop arrangement 62 is schematically represented by functional blocks, and varying structure can be employed to produce the block functions. In addition, various block functions can be omitted, modified or added in the control loop arrangement 62 consistently with application of the present invention. It is further noted that the arrangement 62 functions with overriding restrictions imposed by elements of an overall turbine and plant protection system (not specifically indicated in FIG. 3B).

During startup, an automatic speed control loop 66 in the control loop arrangement 62 operates the turbine inlet valves to place the turbine 10 under wide range speed control and bring it to synchronous speed for automatic or operator controlled synchronization. After synchronization, an automatic load control loop 68 operates the turbine inlet valves to load the turbine 10. The speed and load control loops 66 and 68 function through the previously noted EH valve position control loops 62.

The turbine part of the controller 56 of FIG. 1A is included in the control loops 66 and 68. Speed and load demands are generated by a block 70 for the speed and load control loops 66 and 68 under varying operating conditions in the integrated or non-integrated coordinated modes or non-coordinated mode in response to a remote automatic load dispatch input, a synchronization speed requirement, a load or speed input generated by the turbine operator or other predetermined controlling inputs. In the integrated mode, the plant unit master 71 functions as the demand 70. A reference generator block 72 responds to the speed or load demand to generate a speed or load reference during turbine startup and load operation preferably so that speed and loading change rates are limited to avoid excessive thermal stress on the turbine parts.

An automatic turbine startup control can be included as part of the demand and reference blocks 70 and 72 and when so included it causes the trubine inlet steam flow to change to meet speed and/or load change requirements with rotor stress control. In that manner, turbine life can be strategically extended.

The speed control loop 66 preferably functions as a feedback type loop, and the speed reference is accordingly compared to a representation of the turbine speed derived from the speed detector 60. A speed control 74 responds to the resultant error to generate a steam flow demand from which a setpoint is developed for use in developing valve position demands for EH valve position control loops 62 during speed control operation.

The load control loop 68 preferably includes a frequency participation control subloop, a megawatt control subloop and an impulse pressure control subloop which are all cascaded together to develop a steam flow demand from which a setpoint is derived for the EH valve position control loops 62 during load control operation. The various subloops are preferably designed to stabilize interactions among the major turbine-generator variables, i.e. impulse pressure, megawatts, speed and valve position. Preferably, the individual load control subloops are arranged so that they can be bumplessly switched into and out of operation in the load control loop 68.

The load reference and the speed detector output are compared by a frequency participation control 76, and preferably it includes a proportional controller which operates on the comparison result to produce an output which is summed with the load reference. A frequency compensated load reference is accordingly generated to produce a megawatt demand.

A megawatt control 78 reponds to the megawatt demand and a megawatt signal from the detector 18 to generate an impulse pressure demand. In the megawatt control subloop, the megawatt error is determined from the megawatt feedback signal and the megawatt demand, and it is operated upon by a proportional plus integral controller which produces a megawatt trim signal for multiplication against the megawatt demand.

In turn, an impulse pressure control 80 responds to an impulse pressure signal from the detector 38 and the impulse pressure demand from the megawatt control to generate a steam flow demand from which the valve position demands are generated for forward application to the EH valve position control loops 62. Preferably, the impulse pressure control subloop is the feedback type with the impulse pressure error being applied to a proportional pluse integral controller which generates the steam flow demand.

Generally, the application of feedforward and feedback principles in the control loops and the types of control transfer functions employed in the loops can vary from application to application. More detail on the described control loops is presented in the crossreferenced copending application Ser. No. 247,877, abandoned.

Speed loop or load loop steam flow demand is applied to a position demand generator 82 which generates feedforward valve position demands for application to the EH valve position controls 52, 54 (FIG. 2) in the EH valve position control loops 62. Generally, the position demand generator 82 employs an appropriate characterization to generate throttle and governor valve position demands as required for implementing the existing control mode as turbine speed and load requirements are satisfied. Thus, up to 80% synchronous speed, the governor valves are held wide open as the throttle valves are positioned to achieve speed control. After transfer, the throttle valves are held wide open and the governor valves are positioned either in single valve operation or sequential valve operation to achieve speed and/or load control. The position demand generator 82 can also include a valve management function as set forth more fully in the crossreferenced copending patent application Ser. No. 306,789.

Control System

Figure 4:
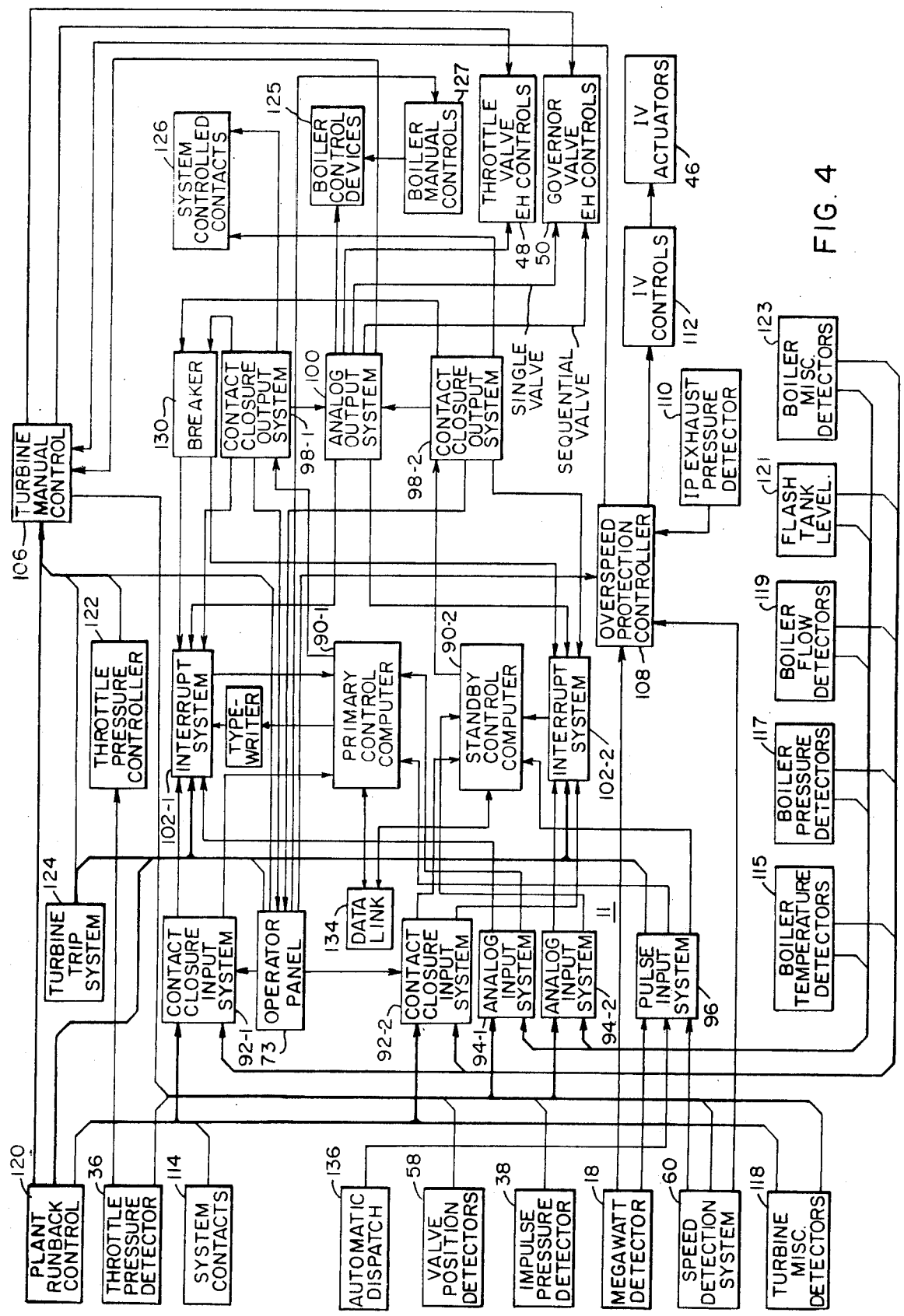
FIG. 4 shows a schematic diagram of apparatus employed in a control system for the steam turbine and the once-through boiler of the electric power plant of FIG. 1A.

The control system 11 includes multiple and preferably two programmed digital control computers 90-1 and 90-2 and associated input/output equipment as shown in the block diagram of FIG. 4 where each individual block generally corresponds to a particular structural unit of the control system 11. The computer 90-1 is designated as the primary on-line control computer 90-2 is a standby and preferably substantially redundantly programmed computer which provides fully automatic backup operation of the turbine 10 and the boiler 22 under all plant operating conditons. As needed, the computers 90-1 and 90-2 may have their roles reversed during plant operation, i.e. the omputer 90-1 may be the standby computer. As shown in FIG. 5B and briefly considered subsequently herein, a plant monitoring computer 15 can also provide some control functions within the control system 11. The fact that the boiler and turbine controls are integrated in a single computer provides the advantage that redundant computer backup control for two major pieces of apparatus is possible with two computers as opposed to four computers as would be the case where separate computers are dedicated to separate major pieces of apparatus. Further, it is possible in this manner to achieve some economy in background programming commonly used for both controls.

In relating FIGS. 3A and 3B with FIG. 4, it is noted that particular functional blocks of FIGS. 3A and 3B may be embraced by one or more structural blocks of FIG. 4. The computers 90-1 and 90-2 in this case are P2000computers sold by Westinghouse Electric Corporation and designed for real time process control applications. The P2000operates with a 16-bit word length, 2's complement, and single address in a prallel mode. A 3 microsecond memory cycle time is employed in the P2000computer and all basic control functions can be performed with a 65K core memory. Expansion can be made to the 65K core memory to handle various options includable in particular control systems by using mass memory storage devices.

Generally, input/output interface equipment is preferably duplicated for the two computers 90-1 and 90-2. Thus, a conventional contact closure input system 92-1 or 92-2 and an analog input system 94-1 or 94-2 are preferably coupled to each computer 90-1 or 90-2 to interface system analog and contact signals with the computer at its input. A dual channel pulse input system 96 similarly interfaces pulse type system signals with each computer at its input. Computer output signals are preferably interfaced with external controlled devices through respective suitable contact closure output systems 98-1 and 98-2 and preferably a single suitable analog output system 100.

A conventional interrupt system 102-1 or 102-2 is imployed to signal each computer 90-1 or 90-2 when a computer input is to be executed or when a computer output has been executed. The computer 90-1 or 90-2 operates immediately to detect the identity of the interrupt and to execute or to schedule execution of the response required for the interrupt.

The operator pannel 73 provides for operator control, monitoring, testing and maintenance of the turbine-generator system and the boiler 22. Panel signals are applied to the computer 90-1 or 90-2 through the contact closure input system 92-1 or 92-2 and computer display outputs are applied to the panel 73 through the contact closure output system 98-1 or 98-2. During manual turbine control, panel signals are applied to a manual backup control 106 which is like the manual control 81 of FIG. 3B but is specifically arranged for use with both digital computers 90-1 and 90-2.

An overspeed protection controller 108 provides protection for the turbine 10 by closing the governor valves and the interceptor valves under partial or full load loss and overspeed conditions, and the panel 73 is tied to the overspeed protection controller 108 to provide an operating setpoint therefor. The power or megawatt detector 18, the speed detector 60 and an exhaust pressure detector 110 associated with the IP turbine section generate signals which are applied to the controller 108 in providing overspeed protection. More detail on a suitable overspeed protection scheme is set forth in U.S. Pat. No. 3,643,437, issued to M. Birnbaum et al.

Generally, process sensors are not duplicated and instead the sensor outputs are applied to the input interface equipment of the computer in control. Input signals are applied to the computers 90-1 and 90-2 from various relay contacts 114 in the turbine-generator system and the boiler 22 through the contact closure input systems 92. In addition, signals from the electric power, steam pressure and speed detectors 18, 36, 38 and 60 and steam valve position detectors 58 and other miscellaneous turbine-generator detectors 118 are interfaced with the computer 90-1 or 90-2. The detectors 118 for example can include impulse chamber and other temperature detectors, vibration sensors, differential expansion sensors, lubricant and coolant pressure sensors, and current and voltage sensors. Boiler process detectors include waterall outlet desuperheater, final superheater, reheater inlet and outlet and other temperature detectors 115, waterwall and the reheat and BFP discharge and other pressure detectors 117, boiler inlet and other flow detectors 119, flash tank level detector 121 and other miscellaneous boiler sensors 123.

Generally, the turbine and boiler control loops described in connection with FIGS. 3A and 3B are embodied in FIG. 4 by incorporation of the computer 90-1 or 90-2 as a control element in those loops. The manual backup control 106 and its control loop are interfaces with and are external to the computers 90-1 and 90-2.

Certain other control loops function principally as part of a turbine protection system externally of the computer 90-1 or 90-2 or both exterenally and internally of the computer 90-1 or 90-2. Thus, the overspeed protection controller 198 functions in a loop external to the computer 90-1 or 90-2 and a plant runback control 120 functions in a control loop through the computer 90-1 or 90-2 as well as a control loop external to the computer 90-1 or 90-2 through the manual control 106. A throttle pressure control 122 functions through the manual control 106 in a control loop outside the computer 90-1 or 90-2, and throttle pressure is also applied to the computer 90-1 or 90-2 for monitoring and control purposes as described in connection with FIG. 3A. A turbine trip system 124 causes the manual control computer outputs to reflect a trip action initiated by independent mechanical or other trips in the overall turbine protection system.

Contact closure outputs from the computer 90-1 or 90-2 operate various turbine and boiler system contacts 126, and various displays, lights and other devices associated with the operator panel 73. Further, in a plant synchronizing system, a breaker 130 is operated by the computer 90-1 or 90-2 through computer output contacts. If desired, synchronization can be performed automatically during startup with the use of an external synchronizer, it can be accurately performed manually with the use of the accurate digital speed control loop with which operates through the computer 90-1 or 90-2, or it can be performed by use of an analog/digital hybrid synchronizaton system which employs a digital computer in the manner set forth in a copending application Ser. No. 276,508, entitled "System And Method Employing A Digital Computer For Automatically Synchoronizing A Gas Turbine Or Other Electric Power Plant Generator With A Power System" filed by J. Reuther on July 31, 1972 as a continuation of an earlier filed patent application and assigned to the present assignee. In the present case, synchronization is preferably performed under operator control.

The analog output system 100 accepts outputs from one of the two computers 90-1 or 90-2 and employs a conventional resistor network to produce output valve position signals for the turbine throttle and governor valve controls during automatic control. Further, the automatic valve position signals are applied to the manual control 106 for bumpless automatic/manual transfer purposes. In manual turbine operation, the manual control 106 generates the position signals for application to the throttle and governor valve controls and for application to the computers 90-1 and 90-2 for computer tracking needed for bumpless manual/automatic transfer. The analog output system 100 further applies output signals to various boiler control devices 125 in boiler automatic operation. These devices include all those previously described devices which are used for controlling boiler fuel, air and water flows and for other purposes. A set of boiler manual controls 127 operates off the operator panel 73 to provide manual boiler operations for those loops where automatic boiler operation has been rejected by the operator or by the control system.

An automatic dispatch computer or other controller 136 is coupled to the computers 90-1 and 90-2 through the pulse input system 96 for system load scheduling and dispatch operations. A data link 134 in this case provides a tie between the digital computers 90-1 and 90-2 for coordination of the two computers to achieve safe and reliable plant operation under varying contingency conditions.

Program System For Control Computers

Figure 5A:
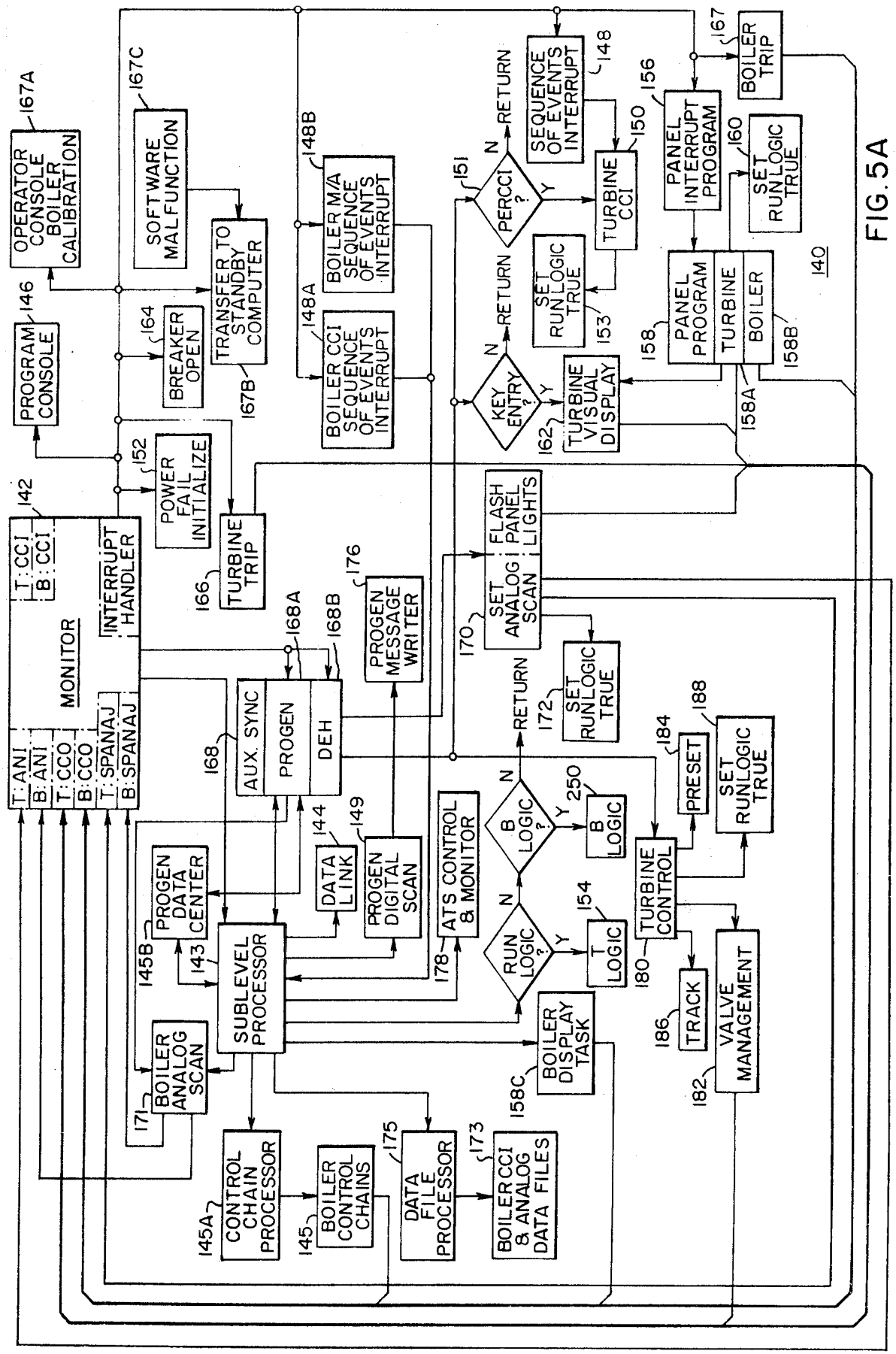
FIG. 5A shows a block diagram of the organization of a program system included in each of two computers employed in the control system of FIG. 4.
Figure 5B:
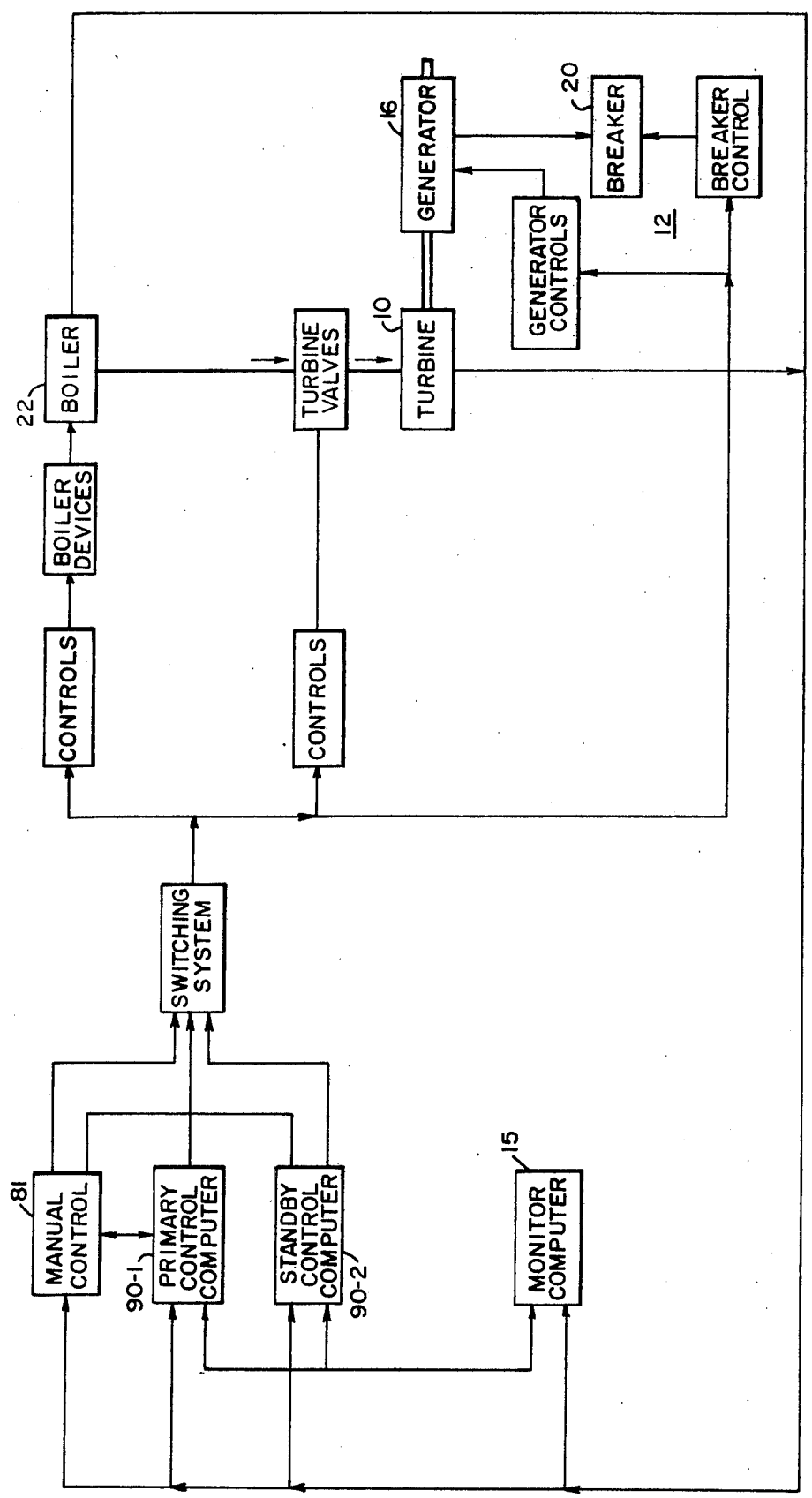
FIG. 5B shows a schematic apparatus block diagram of the electric power plant of FIG. 1A with the control system shown from the standpoint of the organization of computers in the system.

A computer program 140 is preferably organized as shown in FIG. 5A to operate the control system 11 as a sampled data system in providing turbine variable monitoring and control and continuous turbine, boiler and plant control with stability, accuracy and substantially optimum response. Substantially like programming corresponding to the program system is loaded in both computers 90-1 and 90-2. However, some minor programming differences do exist.

The program system 140 will be describe herein only to the extent necessary to develop an understanding of the manner in which the present invention is applied. As shown in FIG. 5B it is noted that the plant 12 is provided with the plant monitoring computer 15 which principally functions as a plant data logger and a plant performance calculator. In addition, certain plant sequencing control functions may be performed in the computer 15. For example, the computer 15 may sequence the particular burners and the particular burners levels which are to be used to execute fuel flow demand from the control computer 90-1 or 90-2. However, the sequencing functions of the computer 15 generally are not essential to an understanding of the present invention and they are therfore not considered in detail herein.

An exective or monitor program 142 (FIG. 5A), an auxiliary synchronizer 168 including a PROGEN sybchronizer section 168A and a DEH synchronizer section 168B, and a sublevel processor 143 provide scheduling control over the running of boiler control chains and various programs in the computer 90-1 or 90-2 as well as control over the flow of computer inputs and outputs through the previously described input/output systems. Generally, the executive priority system has 16 task levels and most of the DEH programs are assigned to 8 task levels outside the PROGEN sublevel processor 143. The lowest task level is made available for the programmer's console and the remaining 7 task levels are assigned to PROGEN. Thus, boiler control chains and some DEH and other programs are assigned as sublevel tasks on the various PROGEN task levels in the sublevel processor 143. Generally, bids are processed to run the bidding task level with the highest priority. Interrupts may bid programs, and all interrupts are processed with a priority higher than any task or subtask level.

Generally, the program system 140 is a combination of turbine control programs and boiler control chains 145 along the support programming needed execute the control programs and the chains 145 with an inteface to the power plant in real time. The boiler control chains 145 are prepared with the use of an automatic process programming and structuring system known a PROGEN and disclosed in the referenced patent application Ser. No. 250,826. The PROGEN executed DEH or turbine programs and the boiler control chains 145 are interfaced with the support programs such as the sublevel processor 143, the auxiliary synchronizer 168, a control chain processor 145A and the executive monitor 142 generally in the manner described in Ser. No. 250,826. A PROGEN data center 145B provides PROGEN initialization and other data. The turbine control programs are like those disclosed in the referenced patent applications Ser. No. 247,877, abandoned and Ser. No. 306,752, and those turbine or DEH programs which bypass the sublevel processor 143 are interfaced with the auxiliary synchronizer 168 as described in the same application.

Once the boiler control chains 145 are written, they are processed off-line by a control chain generator (not indicated in FIG. 5B) and the output from the latter is entered into the computer with use of a file loader program (not indicated). Chains then are automatically stored in the computer and linked to the process through the I/O equipment and to other programmed chains and program elements as required to execute the desired real time chain performance. Logic related to the selection of a chain for execution or the process triggering of a selected chain generally is entered into the computer 90-1 or 90-2 as a separate chain. Thus, if a particular boiler control mode requires the execution of a certain, the chain is automatically executed when that mode is selected.

A data link program 144 is bid periodically or on demand to provide for intercomputer data flow which updates the status of the standby computer relative to the controlling computer in connection with computer switchover in the event of a contingency or operator selection. A programmer's console program 146 is bid on demand by interrupt and it enables program system changes to be made.

When a turbine system contact changes state, an interrupt causes a sequence of events interrupt program 148 to place a bid for a scan of all turbine system contacts by a turbine contact closure input program 150. A periodic bid can also be placed for running the turbine contact closure input program 150 through a block 151. Boiler contacts are similarly scanned by a PROGEN digital scan 149 in response to a boiler contact change detected with a Manual/Auto Station sequence of events interrupt 148B or a boiler plant CCI sequence of events interrupt 148A. A power fail initialize 152 also can bid the turbine contact closure input program 150 to run as part of the computer initialization procedure during computer starting or restarting. The program 152 also initializes turbine contact outputs through the executive 142. In some instances, changes in tubine contact inputs will cause a bid 153 to be placed for a turbine logic task or program 154 to be executed so as to achieve programmed responses to certain turbine contact input changes. Periodic scanning of boiler contacts by the block 149 is initiated through the sublevel processor 143.

When an operator panel signal is generated, external circuitry decodes the panel input and an interrupt is generated to cause a panel interrupt program 156 to place a bid for the execution of a panel program 158 which includes turbine and boiler porions 158A and 158B and which provides a response to the panel request. The turbine panel program 158A can itself carry out the necessary response or it can place a bid 160 for the turbine logic task 154 to perform the response or it can bid a turbine visual display program 162 to carry out the response. In turn, the turbine visual display program 162 operates contact closure outputs to produce the responsive panel display. Similarly, the boiler panel program 158B may itself provide a response or it may place a bid for a task to be performed, such as the execution of a boiler visual display task 158C which operates CCO's.

Generally, the turbine visual display program 162 causes numerical data to be displayed in panel windows in accordance with operator requests. When the operator requests a new display quantity, the visual display program 162 is initially bid by the panel program 158. Apart from a new display request, the turbine visual display program 162 is bid periodically to display the existing list of quantities requested for display. The boiler display task 158C similarly is organized to provide a boiler data display for the plant operator through output devices.

The turbine pushbuttons and keys on the operator panel 104 are classifiable in one of several functional groups. Some turbine pushbuttons are classified as control system switching since they provide for switching in or out certain control functions. Another group of turbine pushbuttons provide for operating mode selection. A third group of pushbuttons provide for automatic turbine startup and a fourth group provide for manual turbine operation. Another group of turbine pushbuttons are related to valve status/testing/limiting, while a sixth group provide for visual display and change of DEH system parameters.

Boiler and plant panel pushbuttons include a large number which serve as manual/automatic selectors for various controlled boiler drives, valves and other devices. Other boiler and plant pushbuttons relate to functions including operating mode selection and visual display. Certain pushbuttons relate to keyboard activity, i.e. of the entry of numerical data into the computer 90-1 or 90-2.

A breaker open interrupt program 164 causes the computer 90-1 or 90-2 to generate a close governor valve bias signal when load is dropped. Similarly, when the trip system 124 (FIG. 4) trips the turbine 10 or when the boiler 22 is tripped, a trip interrupt program 166 causes close throttle and governor valve bias signals to be generated by the computer 90-1 or 90-2. On a boiler trip, a program 167 configures the control computers for a plant shutdown. Boilers trips can be produced for example by the monitor computer 15 (FIG. 5B) on the basis of calculated low pressure or improper flow or other parameters or on the basis of hardware detected contingencies such as throttle overpressure or waterwall overpressure or on the basis of improper water conductivity detected in the controlling computer. After the governor valves have been closed in response to a breaker open interrupt, the turbine system reverts to speed control and the governor valves are positioned to maintain synchronous speed.

Boiler calibration is provided as an operator console function as indicated by block 167A. A protective transfer in computer control is triggered by block 167B in response to a hardware interrupt condition or in response to a software malfunction 167C as described more fully subsequently herein.

Periodic programs are scheduled by the auxiliary sychronizer program 168. An external clock (not shown) functions as the system timing source. A task 170 which provides turbine analog scan is directly bid every half second to select turbine analog inputs for updating through an executive analog input handler. A boiler analog scan 171 is similarly run through the sublevel processor 143 to update boiler analog inputs in PROGEN files 173 under the control of a PROGEN data file processor 175. After scanning, the analog scan program 170 or 171 converts the inputs to engineering units, performs limit checks and makes certain logical decisions. The turbine ligic task 154 may be bid by block 172 as a result of a turbine analog scan program run. Similarly, a boiler control chain may be bid as a result of the updating of a boiler analog data file.

The turbine analog scan task 170 also provides a turbine flash panel light function to flash prefetermined turbine panel lights through the executive contact closure output handler under certain conditions. In the present embodiment, a total of nine turbine conditions are continually monitored for flashing.

The turbine logic program 154 is run periodically to perform various turbine logic tasks if it has been bid. A PROGEN message program 176 is run off the sublevel processor every 5 seconds to provide a printout of significant automatic turbine startup events and other preselected messages.

A boiler logic program 250 is run each time a run logic flag has been set. If the resultant bid is for a boiler logic function, the turbine logic is bypassed and only the boiler logic is run. On the other hand, a turbine logic function bid does result in the execution of the boiler logic.

The turbine software control functions are principally embodied in an automatic turbine startup (ATS) control and monitoring program 178 periodically run off the sublevel processor 143 and a turbine control program 180 periodically run off the DEH auxiliary synchronizer 168B, with certain supportive program functions being performed by the turbine logic task 154 or certain subroutines. To provide rotor stress control on the turbine acceleration or turbine loading rate in the startup speed control loop 66 or the load control loop 68, (FIG. 3B) rotor stress is calculated by the ATS program 178 on the basis of detected turbine impulse chamber temperature and other parameters.

The ATS program 178 also supervises turning gear operation, eccentricity, vibration, turbine metal and bearing temperatures, exciter and generator parameters, gland seal and turbine exhaust conditions, condenser vacuum, drain valve operation, anticipated steam chest wall temperature, outer cylinder flange-base differential, and end differential expansion. Appropriate control actions are initiated under programmed conditions detected by the functioning of the monitor system.

Among other functions, the ATS program 178 also sequences the turbine through the various stages of startup operation from turning gear to synchroniztion. More detail on a program like the ATS program 178 is disclosed in another copending application Ser. No. 247,598 entitled "System And Method For Operating A Steam Turbine With Digital Computer Control Having Automatic Startup Sequential Programming", filed by J. Tanco on Apr. 26, 1972 and assigned to the present assignee, now Pat. No. 3,959,635.

In the turbine control program 180, program functions generally are directed to (1) computing throttle and governor valve positions to satisfy speed and/or load demand during operator or remote automatic operation and (2) tracking turbine valve position during manual operation. Generally, the control program 180 is organized as a series of relatively short subprograms which are sequentially executed.

In performing turbine control, speed data selection from multiple independent sources is utilized for operating reliability, and operator entered program limits are placed on high and low load, valve position and throttle pressure. Generally, the turbine control program 180 executes operator or automatically initiated transfers bumplessly between manual and automatic modes and bumplessly between one automatic mode and another automatic mode. In the execution if control and monitor functions, the control program 180 and the ATS program 178 are supplied as required with appropriate representations of data derived from input detectors and system contacts described with FIG. 4. Generally, predetermined turbine valve tests can be performed on-line compatibly with control of the turbine operation through the control programming.

The turbine control program 180 logically determines turbine operating mode by a select operating mode function which operates in response to logic states detected by the logic program 154 from panel and contact closure inputs. For each mode, appropriate values for demand and rate of change of demand are defined for use in control program execution of speed and/or load control.

The following turbine speed control modes are available when the breaker is open in the hierarchial order listed: (1) Automatic Synchronizer in which pulse type contact inputs provide incremental adjustment of the turbine speed reference and demand; (2) Automatic Turbine Startup which automatically generates the turbine speed demand and rate; (3) Operator Automatic in which the operator generates the speed demand and rate; (4) Maintenance Test in which the operator enters speed demand and rate while the control system is being operated as a simulator/trainer; (5) Manual Tracking in which the speed demand and rate are internally computed to track the manual control preparatory to bumpless transfer from manual to automatic operation.

The following turbine load control modes are available when the breaker is closed in the hierarchical order listed: (1) Throttle Pressure Limiting in which the turbine load reference is run back at a predetermined rate to a preset minimum as long as the limiting condition exists; (2) Runback in which the load reference is run back at a predetermined rate as long as predefined contingency conditions exist; (3) Automatic Dispatch System in which pulse type contact inputs provide for adjusting the turbine load reference and demand; (4) Automatic Turbine Loading (if included in system) in which the turbine load demand and rate are automatically generated; (5) Operator Automatic in which the operator generates load demand and rate; (6) Maintenance Test in which the operator enters load demands and rate while the control system is being operated as a simulator/trainer; (7) Manual Tracking in which the load demand and rate are internally computed to track the manual control preparatory to bumpless transfer to automatic control.

In executing turbine control within the control loops described in connection with FIG. 3B, the control program 180 includes a speed/load reference function. Once the turbine operating mode is defined, the speed/load reference function generates the reference which is used by the applicable control functions in generating valve position demand.

The turbine speed or load reference is generated at a control or selected rate to meet the defined demand. Generation of the reference at a controlled rate until it reaches the demand is especially significant in the automatic modes of operation. In modes such as the Automatic Synchronizer or Automatic Dispatch System, the reference is advanced in pulses which are carried out in single steps and the speed/load reference function is essentially inactive in these modes. Generally, the speed/load reference function is responsive to GO and Hold logic and in the GO condition the reference is run up or down at the program define rate until it equals the demand or until a limit condition or synchronizer or dispatch requirement is met.

A programmed turbine speed control function provides for operating the throttle and governor valves to drive the turbine 10 to the speed corresponding to the reference with substantially optimum dynamic and steady-state response. The speed error is applied to either a software proportional-plus-reset throttle valve controller or a software proportional-plus-reset governor valve controller.

Similarly, a programmed turbine load control function provides for positioning the governor valves so as to satisfy the existing load reference with substantially optimum dynamic and steady-state response. The load reference value computed by the operating mode selection function is compensated for frequency participation by a proportional feedback trim factor and for megawatt error by a second feedback trim factor. A software proportional-plus-reset controller is employed in the megawatt feedback trim loop to reduce megawatt error to zero.

If the speed and megawatt loops are in service, the frequency and megawatt corrected load reference operates as a setpoint for the inpulse pressure control or as a flow demand for a valve management subroutine 182 (FIG. 5A) according to whether the impulse pressure control is in or out of service. In the impulse pressure control, a software proportional-plus-reset controller is employed to drive the impulse pressure error to zero. The output of the impulse pressure controller or the output of the speed and megawatt corrected load reference functions as a governor valve setpoint which is converted into a percent flow demand prior to application to the valve management subroutine 182.

The turbine control program 180 further includes a throttle valve control function and a governor valve control function. During automatic control, the outputs from the throttle valve control function are position demands for the throttle valves, and during manual control the throttle valve control outputs are tracked to the like outputs from the manual control 106 (FIG. 4). Generally, the position demands hold the throttle valves closed during a turbine trip, provide for throttle valve position control during startup and during transfer to governor valve control, and drive and hold the throttle valves wide open during and after the completion of the throttle/governor valve transfer.

The governor valve control function generally operates in a manner similar to that described for the throttle valve control function during automatic and manual operations of the control system 11. If the valve management subroutine 182 is employed, the governor valve control function outputs data applied to it by the valve management subroutine 182.

If the valve management subroutine 182 is not employed, the governor valve control function employs a nonlinear characterization function to compensate for the nonlinear flow versus lift characteristics of the governor valves. The output from the nonlinear characterization function represents governor valve position demand which is based on the input flow demand. A valve position limit entered by the operator may place a restriction on the governor valve position demamd prior to output from the computer 90.

Generally, the governor valve control function provides for holding the governor valves closed during a turbine trip, holding the governor valves wide open during startup and under throttle valve control, driving the governor valves closed during transfer from throttle to governor valve operation during startup, reopening the governor valves under position control after brief closure during throttle/governor valve transfer and thereafter during subsequent startup and load control.

A present subroutine 184 evaluates an algorithm for a proportional-plus-reset controller as required during execution of the turbine control program 180. In addition, a track subroutine 186 is employed when the control system 11 is in the manual mode of operation. In the operation of the multiple computer system, the track subroutine 186 is operated open loop in the computer on standby so as to provide for turbine tracking in the noncontrolling computer.

Certain logic operations are performed by the turbine logic program 154 in response to a control program bid by block 188. The logic program 154 performs a series of control and other logic duties which are related to various parts of the turbine portion of the program system 140 and it is executed when a bid occurs on demand from the auxiliary snychronizer program 168 in response to a bid from other programs in the system. In the present system, the turbine logic is organized to function with the plant unit master, i.e. the megawatt and impulse pressure controls are preferably forced out of service on coordinated control so that the load control function can be freely coordinated at the plant level.

Generally, the purpose of the turbine logic program 154 is to define the operational status of the tubine portion of the control system 11 from information obtained from the turbine system, the operator and other programs in the program system 140. Logic duties included in the program 154 include the following: flip-flop function; maintenance task; speed channel failure monitor lamps; automatic computer to manual transfer logic; operator automatic logic; GO and HOLD logic; governor control and throttle control logic; tubine latch and breaker logic; megawatt feedback, impulse pressure, and speed feedback logic, and automatic synchronizer and dispatch logic.

During automatic computer control, the turbine valve management subroutine 182 develops the governor valve position demands needed to satisfy turbine steam flow demand and ultimately the speed/load reference and to do so in either the sequential or the single valve mode of governor valve operation or during transfer between these modes. Mode transfer is effected bumplessly with no load change other than any which might be demanded during transfer. Since changes in throttle pressure cause actual steam flow changes at any given turbine inlet valve position, the governor valve position demands may be corrected as a function of throttle pressure variation. In the manual mode, the track subroutine 186 employs the valve management subroutine 182 to provide governor valve position demand calculations for bumpless manual-/automatic transfer.

Governor valve position is calculated from a linearizing characterization in the form of a curve of valve position (or lift) versus steam flow. A curve valid for low-load operation is stored for use by the valve management program 182 and the curve employed for control calculations is obtained by correcting the stored curve for changes in load or flow demand and preferably for changes in actual throttle pressure. Another stored curve of flow coefficient versus steam flow demand is used to determine the applicable fow coefficient to be used in correcting the stored low-load positon demand curve for load or flow changes. Preferably, the valve position demand curve is also corrected for the number of nozzls downstream from each governor valve.

In the single valve mode, the calculated total governor valve position demand is divided by the total number of governor valves to generate the position demand per valve which is output as a single valve analog voltage (FIG. 4) applied commonly to all governor valves. In the sequential mode, the governor valve sequence is used in determining from the corrected positon demand curve which governor valve or group of governor valves is fully open and which governor valve or group of governor valves is to be placed under position control to meet load reference changes. Position demands are determined for the individual governor valves, and individual sequential valve analog voltages (FIG. 4) are generated to correspond to the calculated valve position demands. The single valve voltage is held at zero during sequential valve operation and the sequential valve voltage is held at zero during single valve operation.

To transfer from single to sequential valve operation, the net positon demand signal applied to each governor valve EH control is held constant as the single valve analog voltage is stepped to zero and the sequential valve analog voltage is stepped to the single valve voltage value. Sequential valve position demands are then computed and the steam flow changes required to reach target steam flows through individual governor valves are determined Steam flow changes are then implemented iternatively, with the number of iterations determined by dividing the maximum flow change for any one governor valve by a predetermined maximum flow change per iteration. Total steam flow remains substantially constant during tansfer since the sum of incremental steam flow changes is zero for any one iteration.

To transfer from sequential to single valve operation, the single valve position demand is determined from steam flow demand. Flow changes required to satisfy the target steam flow are determined for each governor valve, and an iteration procedure like that described for single-to-sequential transfer is employed in incrementing the valve positions to achieve the single valve target position substantially without disturbing total steam flow. If steam flow demand changes during any transfer, the transfer is suspended as the steam flow change is satisfied equally by all valves movable in the direction required to meet the change.

System For Transferring Control Between Computers

A system 200 (FIG. 6) is woven through the control system 11 and the plant 12 to initiate and execute transfers between control computers in a multiple computer control system substantially without disturbing the plant operations and prefereably under any plant operating modes or plant operating conditions. The system 200 includes a transfer trigger system 202 which functions in accordance with the principles of the invention and in the preferred two computer control system executes computer control transfers automatically for the purpose of protecting the electric power plant energy source system (in this case a once through boiler) and the generator drive system (in this case, a generator and a steam turbine) in the electric power plant 12 against malfunctions that otherwise could cause process disturbances or plant shutdown with consequential power service interruption, equipment damage, or consequential injuries to plant personnel. The program elements of the trigger system 202 and a transfer execution system 203 are preferably substantially isolated from ties with other programs so that changes in other programs are substantially isolated and so that transfer system program changes can be made conveniently.

The transfer system 200 is also organized to implement coupler control transfers selected by an opertor as indicated by the reference character 204. Preferably, the manual backup control system 106 (FIG. 4) is interfaced with the multiple or dual channel computer control system to provide plant operating security in the event a transfer malfunction should occur. However, for reasons including those set out in the background, a transfer malfunction (such as unavailabiliy of the standby computer) is considerably less likely than is a malfunction of the controlling computer system itself. In turn, a control computer malfunction can be relatively rare, for example, the P2000 computer typically will fail as few as 3 or 4 times per year when it is operated on a continuous basis. The estimated computer failure rate for a particular computer is dependent on the kinds of malfunctions which are specified as placing the computer in a failure status.

Among other applications of certain features of the present invention, the electric power plant could be a gas turbine electric power plant, a combined cycle electric power plant or a nuclear electric power plant. In all these cases, computer transfers produce a transfer in the control of a turbine and/or a plant energy source system or a steam generating system.

The computer control transfer system 200 also includes a system 206 for dynamically structuring the standby computer so that it calls for substantially the same control outputs and, subject to certain exceptions in the present embodiment, generally is in substantially the same state as the controlling computer at all times. Computer output status identify is required to prevent distrubing or damaging step changes in control outputs to the boiler or turbine at the time of a protective or operator selected control computer transfer.

Although all control changes on transfer would not be damaging, most if not all control changes would be disturbing to the power process to some degree. Examples of damaging control changes are briefly set forth in the background herein. As already considered, possible undesirable consequences of disturbing or damaging control changes at the time of control computer transfer are metal stress damage which foreshortens equipment life, power generatin service interruption, immediate equipment damage and consequential injuries to plant personnel.

Figure 6:
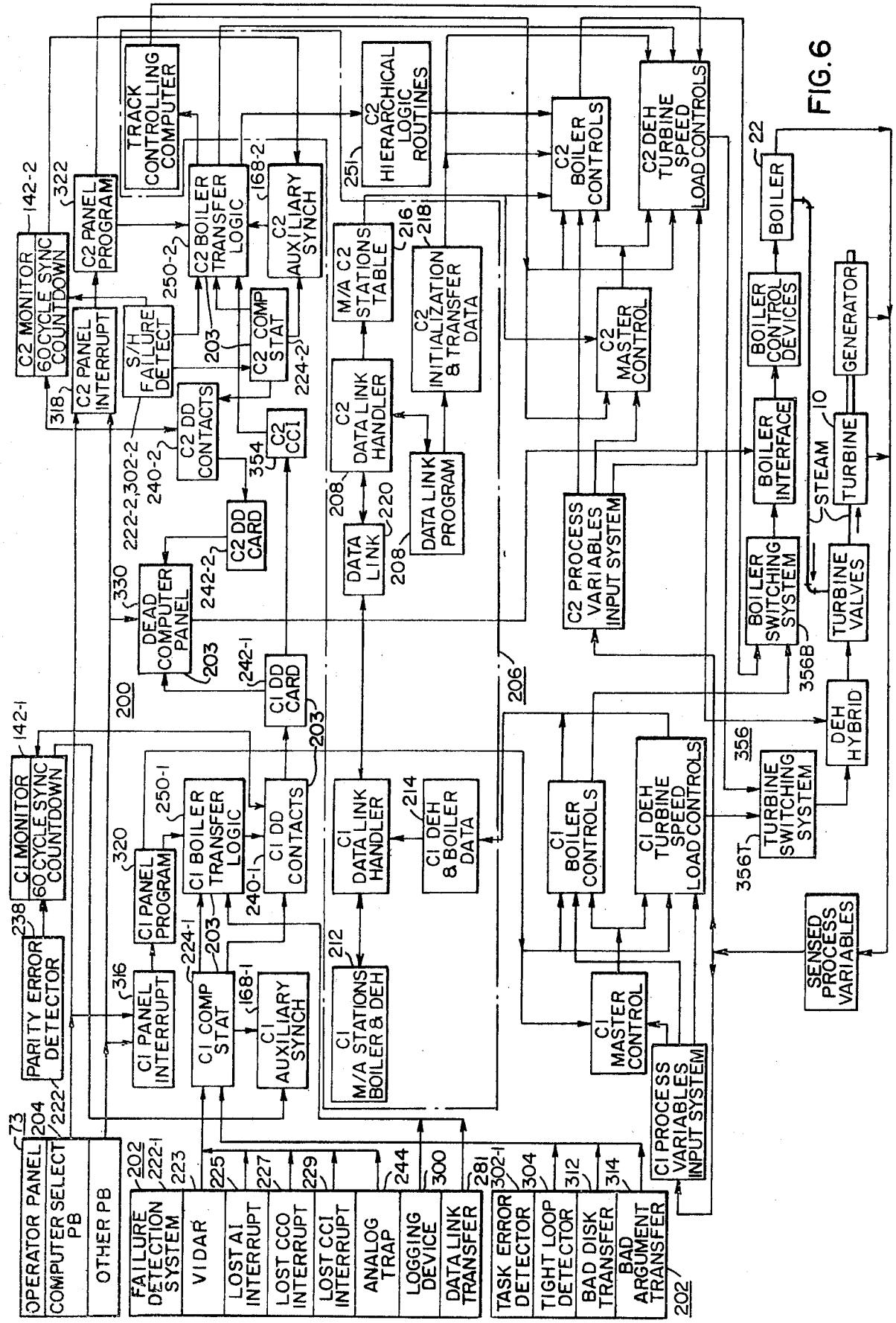
FIG. 6 shows a schematic block diagram of a system for transferring control between the two control computers of FIG. 4.

Generally, the block diagram in FIG. 6 represents the system in a state in which the primary computer 90-1 is controlling and the standby computer 90-2 is on standby. A similar diagram with certain transpositions between the computers 90-1 and 90-2 likewise applicable when the computer 90-2 is controlling and the computer 90-1 is on standby.

Computer Status Updating System

The two computers 90-1 and 90-2 are for the most part programmed alike, and the problem of keeping the computer in the standby mode structured like the controlling computer generally relates to the variability of the values of the control outputs applied to the boiler and the turbine and the variablility of the operating structure of the control loops such as wheather a loop is in manual or automatic control. The matter of avoiding any interference between the two computers as to which one is controlling is considered in connection with the boiler logic program 250-1 or 250-2 subsequently herein.

Data link techniques are preferably employed herein to transfer at least some control system data between the computers 90-1 and 90-2. Generally, substantially all first level boiler control outputs of the computer in the standby mode are preferably sutstantially conformed to those of the controlling computer by a process in which the computer in the standby mode is held in a manual tracking mode and the various first level boiler control loop outputs from the computer in the standby mode are tracked to respective setpoints for the boiler control loops in response to actual variation in boiler process variable inputs.

The tracking controls employed in the boiler control loops take computer capacity that could be otherwise used for other purposes, but in this manner the computer in the standby mode is able to be dynamically structured to be like the controlling computer even though available data links have insufficient data transfer rates to move all the required data between computers with the required periodicity for the various elements of data. Further, with the application of setpoint tracking to the first level boiler controls as opposed to boiler process variable tracking, any need to characterize the boiler subprocesses for programs which would employ such characterizations to make updating back calculations for upstream control loop variable is avoided.

Where fast data links are available, tracking control functions can be cut back and status updating can be shifted to the data link. However, tracking controls may be preferable at least in some applications or at least in part even when a fast data link is available. Thus, with data linking of control loop outputs, certain failure conditions could exist in the computer on standby and such conditions would not become known until after execution of a transfer. For example, a bad analog input could be such as not to fail the computer on standby yet it could produce a substantial offset in the output of a control loop in which it is used after transfer. A resulting disturbance in boiler or turbine operation could cause a trip or equipment damage.

It is also noteworthy that the tracking control approach avoids significant disadvantages associated with the direct approach of operating the first level standby boiler control loops as though they were in automatic control. If the boiler control loops were operated in the automatic mode on a standby basis, the difference between converted analog inputs to the two computers could be intergrated over long periods of time to produce substantially different control outputs for the same loops in the two computers. For example, in the boiler air contral, a position control loop for a damper FD-1 includes a damper position detector which applies a position signal to the analog input system 94-1 and the analog input system 94-2. Within the computer program system, a representation of the feedback position signal is compared to a position setpoint and the error is integrated to generate a position demand output. The analog signal is converted to respective digital signals which are applied to the two computers through the functioning of the respective boiler analog scan programs and the two computer input systems. The damper position value in the computer 90-1 can differ to a small extent by one or more bits from the position value in the computer 90-2 as a result of conversion differences between the two analog input systems 94-1 and 94-2 (commonly referred to as VIDARS). Such small bit differences between the converted position signals or stored position values occur wih VIDARS having low conversion error on the order of 0.1% or less. Although the position bit differences and the resultant bit differences in position errors in the two computers may be samll, the position error difference if integrated over a long period of time and can lead to wide differences in the position demand outputs for the same FD-1 damper position control loops in the two computers. If a computer transfer were made with such a wide difference in the two computer outputs in the damper control loop or other control loops, undesirable boiler and turbine trips or equipment stresses or breakdown could occur as previously described.

In the case of the turbine control loops, the turbine valve positions are sensed and applied to the computer in the standby mode and the valve position demand outputs are conformed to the sensed position values with upstream control loop variables being back circulated as set forth in the referenced patent application Ser. No. 306,752, i.e. setpoint variables including flow demand, impulse pressure demand, and megawatt demand are back calculated from the measurement based position demand. The back calculation approach for the turbine is preferred because the turbine valve control loops involved are relatively small in number and sufficiently alike that a common average back calculation can be employed for position demand as set forth in Ser. No. 306,752 without introducing objectionable error in the updating control loop status calculations insofar as safe transfers between computers are concerned.

Figure 8:
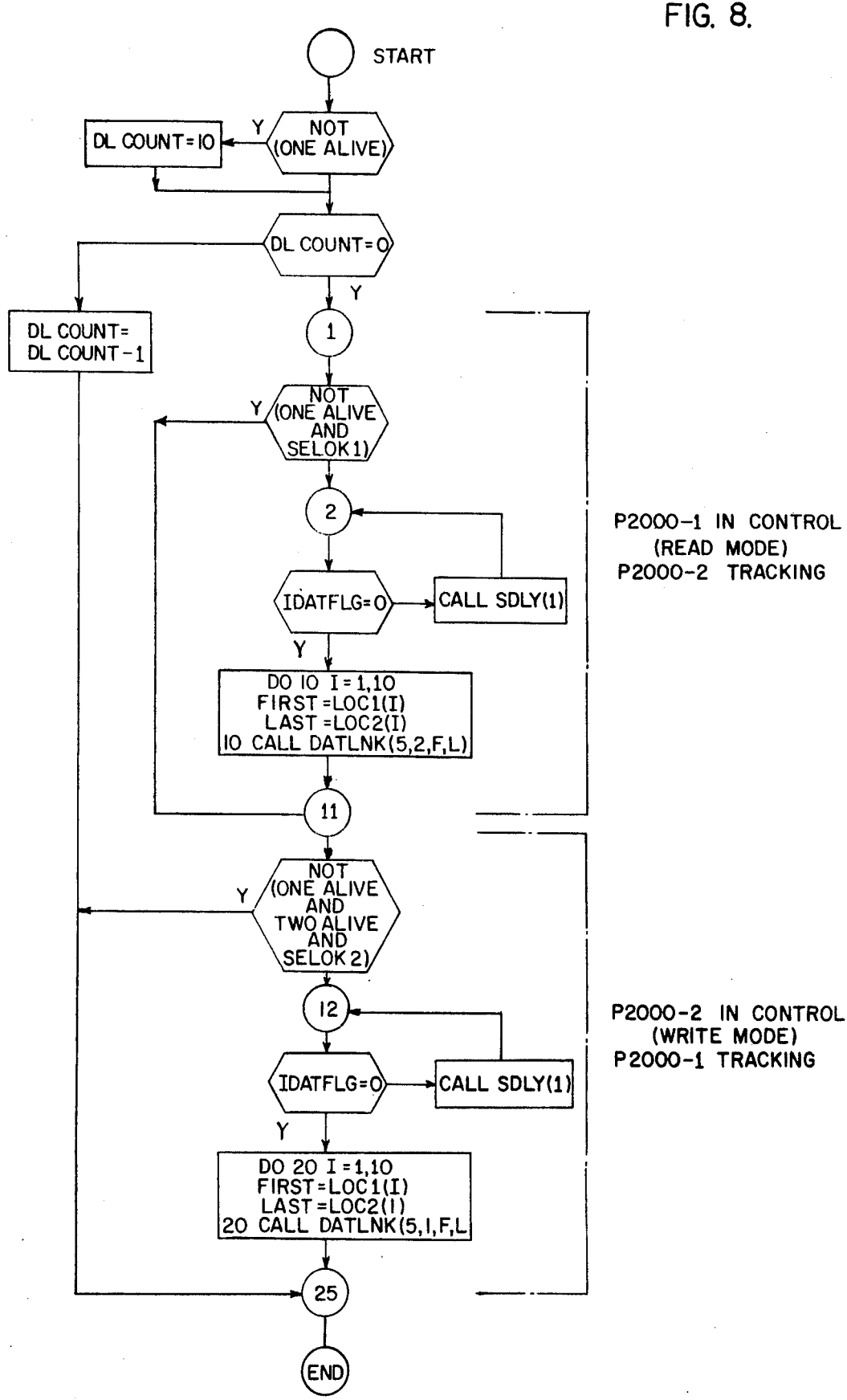
FIG. 8 shows a flow chart representative of a data link program which is loaded into one of the two digital computers shown in FIG. 4.

More particularly, the data link is formed by a data link circuit 220 and conventional data link handler routine in each computer 90-1 or 90-2. Further, as one difference in the program systems in the two computers, the standby computer 90-2 incudes a data link program 208 which acts as a master in the data link in accordance with the flow chart shown in FIG. 8. Accordingly, the standby computer 90-2 writes or reads data whereas the primary control computer 90-1 only follows instructions.

When the primary control computer 90-1 is controlling and the standby computer 90-2 is alive, the standby computer 90-2 is in the standby tracking mode and it reads from the primary control computer 90-1. With the standby computer 90-2 controlling and the primary control computer 90-1 alive, the primary control 90-1 is in the standby mode and the standby computer 90-2 writes data to the computer 90-1.

Since the programming generally is substantially alike in the two computers to facilitate the esatablishment of redundant control operations in the two computers and to economize in the programming effort, a mechanism is included in the programming to identify to each computer its identity, i.e. whether it is the primary computer 90-1 or the standby computer 90-2. In this manner, programming differences including those in the data link programming are made operational. In particular, a flag called computer 1 flag, COMPONE, is used in the primary computer 90-1 to cause it to function as the primary control computer. In the description which follows hereinafter, the standby computer 90-2 is generally considered as being in the standby mode and the computer 90-1 is generally considered as being in the controlling mode as illustrated in FIG. 6.

In the present embodiment, it is preferred that the following data be linked on-line between blocks 212 and 214 of the computer 90-1 and blocks 216 and 218 of the computer 90-2 as part of the status updating system 206:

| DATA LINK - FIVE MINUTE COMPUTER TRANSFERS | | | |
|---|---|---|---|
| No. | Range | No. Loc | Remarks |
| 1 | A509 – A509 | 1 | SOAKDUN - ATS soak down status |
| 2 | A515 – A515 | 1 | ICOL - ATS time in service |
| 3 | A517 – A517 | 1 | RATEINDX - ATS |
| 4 | A52C – A52D | 2 | T & TP VALUES - ATS historic temperature values |
| 5 | A8E7 – A91E | 38 | SOAKTIME - time to soak |
| 6–10 | | | SPARES |

| DATA LINK - ONE MINUTE COMPUTER TRANSFERS | | | |
|---|---|---|---|
| No. | Range | No. Loc | Remarks |
| 1 | EA28 – EA53 | 44 | M/A STATUS - BOILER - |

-continued

| | | | | 44 mode or loop M/A stations |
|---|---|---|---|---|
| 2 | 9362 – 9365 | 4 | | ACCEL/LOAD RATE - DEH |
| 3 | 936A – 936B | 2 | | VALVE POS. LIMIT - DEH |
| 4 | 94B1 – 94B1 | 1 | | VALVE STATUS SINGLV - DEH |
| 5 | 9454 – 9454 | 1 | | Turbine Supervision Off - TURBSPOFF |
| 6–10 | | | | SPARES |

The following data is preferably linked to the block 218 in the standby computer 90-2 in order to shorten the time it takes for the standby computer 90-2 to become available as a standby computer after it is first activated (or vice versa with respect to the primary control computer 90-1):

BOOTSTRAP DATA LINK - TRANSFERS (STOP/INITIALIZE)

| No. | Range | No. Loc | Remarks |
|---|---|---|---|
| 1 | 2796 – 2BF6 | 430× | D7's & L7's BOILER LOGICAL VARIABLE |
| 2 | 35AA – 363F | 95× | K7's BOILER REAL VARIABLES |
| 3 | 31E5 – 32C1 | D1× | DIGITAL IMAGE & STATU S BOILER |
| 4 | 3000 – 31A4 | 1A5× | ANALOGS & AI STATUS BOILER |
| 5 | 9290 – 93CF | 140× | DEH Common; Delta, Epsilon |
| 6 | A4DA – A53F | 66× | ATS Common; calculated real and logical values |
| 7 | A600 – A94F | 350× | ATS Common; calculated real and logical values and one time calibration data for the turbine generator and message flags and inserts |
| 8 | 05F7 – 05FF | 9× | CALENDAR IN MONITOR |
| 9 | B700 – B7FF | 100× | ATS Common |
| 10 | 948A – 958F | 106× | DEH Common |
| 11 | | | SPARE |
| 12 | | | SPARE |

In the context of the structure and purposes of the updating system, the data link system structure in the preferred embodiment is premised on the fact that control outputs are updated in the noncontrolling computer by a manual tracking mode of operation and the fact that certain data is fixed on computer initialization and certain other data is specified by control panel operations. Further, the data link system structure incudes two basic classes of data, i.e., (1) data which is linked to the noncontrolling computer when it is first started to come into the standby mode and (2) data which is linked to the computer on standby as needed to keep it updated with on-line control system and power plant process changes.

In order to structure the computer coming into control so that it can create the same level of plant automation as did the computer going out of control, the status of thirty-five boiler manual/automatic stations controlled from the panel, three control modes based on pushbutton operations FR/FW (temperature error), excess air and gas recirculation control and excess air control and all of the plant unit master modes except manual are data linked in the one minute data transfers. The transmitted plant unit master modes are scanned to identify to the computer coming into control what plant unit master mode is to be set. The gas recirculation control defines a furnace control process which affects some M/A stations particularly as to where the stations get loop setpoints. With the standby computer 90-2 coming into control, the M/A stations are read from the table 216 (FIG. 6) and used by the boiler logic program 250-2 to define the automation state of the boiler control system to which the boiler control loops are brought in a hierarchical order specified by a boiler logic program block 251 (FIG. 6).

The boiler M/A station statuses are data linked since particulr stations could have been changed in the computer going out of control by a mementary pushbutton interrupt during down time of the other computer. Similarly, the status M/A stations could have been rejected from automatic to manual by the computer going out of control without panel operations, and the data link updates the computer on standby in this situation.

The turbine level of automation, i.e. automatic turbine MW or IMP in or out, plant unit master coordinated, ATS, etc, is defined by panel operations and by programming logic. As indicated previously herein, the turbine MW and IMP loops are open if the controlling computer 90-1 is in the plant unit master coordinated mode, and if the MW and IMP loops are otherwise in service in the computer 90-2 they are held out of service in the standby computer 90-2 should a transfer occur.

Preferably, if the pre-transfer computer is on automatic dispatch system control, the automatic dispatch system control is rejected for the computer coming into control so that possible plant contingencies can be subject to the exclusive management of the power plant personnel. In this manner, remotely instituted load changes for the plant are avoided where such changes might otherwise aggravate a contingency or create a new contingency.

The one minute transfer group also preferably includes the maximum turbine acceleration rate logical ACCEL RATE, i.e. RPM/MIN during startup or MW/MIN during load operation, in order to force the computer coming into control to retain the current ACCEL RATE for smoothness of plant operation. Once the logical ACCEL RATE is set during initialization, it is fixed and normally would not be changed. In those instances where a change might be entered into the controlling computer without entry into the noncontrolling computer, the data link provides the updating for the noncontrolling computer.

The turbine valve position limit is preferably data linked since incremental panel changes in the limit value could have been entered into the computer going out of control without being entered into the computer coming into control because of computer down time or other reasons. Different valve position limits and possible resultant turbine operation bumps are thereby avoided on transfer.

The turbine valve mode SV/SEQV and the TURBINE SUPERVISORY OFF status logicals are also preferably data linked between the computers. The valve mode is controlled by panel operation and preferably is held constant during and after transfer even though a turbine valve mode change from sequential to single or vice versa after a transfer could be effected bumplessly if the computer coming into control were not correctly set on the turbine valve mode. Thus, it may be incumbent for plant operating reasons to retain the valve mode existing prior to the transfer, and in any case it is desirable that unnecessary valve mode changes be avoided to avoid unnecessary stress cycles on the turbine metal parts. The turbine supervisory logical is preferably data linked even though it is fixed on initialization and normally would not be changed thereafter.

The five minute transfer data group relates to automatic turbine startup (ATS) data; and its transfer avoids having the computer on standby to be in service for a minimum two hour period prior to automatic startup or loading operation of the turbine. Thus, the minimum time required to validate the stress calculations for automatic control, because of the weighting of historic temperature valves, is substantially the same regardless of which computer is in control and regardless of whether a computer transfer occurs during the validation time period.

Much of the ATS data also pertains to steam turbine loading changes after synchronization. The five minute transfer data group includes a turbine flag SOAKDUN which is susceptible to change after computer initialization. This flag is used in the programming to determine whether turbine rotor heat soak time period is complete and therefore unnecessary calculations could be performed after transfer if the updated state of the flag SOAKDUN is not data linked. Preferably, the remaining turbine rotor SOAKTIME resulting from the heat soak time calculations is also data linked so that possible normally expectable differences in calculation results between the two computers and possible associated turbine disturbances are avoided at the time of transfer. Changes can occur in the calculated heat soak time as the heat soaking of the turbine rotor progresses.

In connection with turbine startup, it is also preferred that the integer in service time count ICOL be data linked. The counter ICOL is advanced in count once every minute and when the computer has been in reliable service for a period of two hours, a permissive is provided for the ATS system to operate the turbine automatically for startup or if desired loading changes. With this limit on the ATS system, assurance is provided that the control placed on the steam turbine will reflect valid metal stress calculations which are based on a historic profile of turbine feedback temperatures. Data linking the ICOL value enables the two computers to interact with the turbine in a consistent manner which could make the computer to which control is transferred during turbine startup available for ATS sooner than might otherwise be the case.

It is also preferred that the current limit on acceleration RATEINDX be data linked primarily to provide for reliable and smooth control transfer of the turbine and boiler operations. The acceleration limit is calculated from current vibration conditions, differential expansion and other variables and in this embodiment may have nine different values ranging from 50 rpm/min to 450 rpm/min (or loading change equivalents). After a computer transfer during turbine startup, the acceleration limit RATEINDX can be modified by the computer then controlling the boiler and the turbine.

In order to conform the turbine control output profile of the computer coming into control with that of the computer going out of control during startup or loading, historic data used in the ATS stress calculations are preferably data linked. This data includes stored analog temperature values and calculated anticipated temperature values which are used to calculate turbine rotor surface temperatures and average rotor volume temperatures. To illustrate one way in which this data link provides advantages in turbine operation, the noncontrolling computer could have a bad analog temperature input which does not fail the noncontrolling computer but which causes substantial error in off-line computer rotor stress calculations prior to computer transfer. With data linking, the noncontrolling computer is forced to line-up its stress calculations with those of the pre-transfer controlling computer at the time of transfer.

In connection with the startup of a previously inactive computer, a Stop/Initialize program is employed and it functions to bring the computer in the inactive state into an available state more reliably and faster than would otherwise be the case. Generally, the computer could have been inactivated because of a power failure, a computer hardware malfunction, a computer software malfunction or for other reasons. The Stop/Initialize program is arranged to set the boiler/turbine control system to a known common state after a computer stoppage. The known restarting state comprises the following conditions:

1. Determine status of other computer
2. Data Link values from other computer, if alive and well
3. Zero backup annunciator scratch areas
4. Restore speed channel hardware
5. Reset typewriters
6. Reset Span and Offset adjustment
7. Reset Turbine CCO's
8. Reset Boiler CCO's
9. Reset Boiler flags
10. Read Boiler CCI's
11. Scan Boiler analog inputs
12. Reset Turbine demand CCI scan
13. Reset selected Turbine logicals
14. Initialize ATS variables
15. Reset counters and logical states
16. Set BETA counters
17. Initialize Boiler panel common and counters
18. Set controller Reset logical After all computer system programs have been run, the computer failure light is flashed on the operator's panel and the operator can then start the system program execution on a periodic basis.

In the Stop/Initialize program, the status of the other computer is read and the data link is then used to obtain information from the other computer that allows the computer being activated to become available for operation faster than would otherwise be the case. Other functions performed include zeroing the disc scratch area used by the boiler annunciator program, resetting the speed channel hardware, the VIDARS, the typewriters, the boiler and turbine CCO's, boiler flags, reading boiler CCI's, scanning boiler analogs, logical variables, counters and initializing flags. Certain counters are preset to values which start uniform execution of the system. Visual display devices are set to display particular values including feedwater, plant and turbine reference values. At the conclusion of the Stop/Initialize program execution, a scan of all turbine CCI's is made. If the program has been executed without problems, a flag STOPINIT is set, and this flag is a permissive which is required along with other permissives for auxiliary synchronizer program execution and overall system program execution.

The following list summarizes the data link transfers on initialization. Generally, data is transferred where it is the type of information which is susceptible to change and could have changed as a result of pushbutton operations or by other means during shutdown of the computer being activated and where a failure to update the data in the computer coming into control might cause a boiler or turbine disturbance, trip or damage. Boiler logic vairables - CCI or calculated status logicals such as rejects, alarms and M/A stations used in boiler control; some of these logicals are set by momentary pushbutton operations which may not have been previously detected by the computer being initialized. Boiler real variables - these are constant variables used for example as setpoints, limits, and scaling for automatic dispathc operations; although these are generally fixed calibration values, pushbutton changes could occur after initialization. Boiler digital image and status - PROGEN user's table of variables used in conjunction with CCI tabular data. Boiler analogs and AI status - this data is linked for reasons including the fact that the analog scan functions in a way that the last calculated analog input value remains in core if an analog input has become bad. DEH common - Delta and Epsilon common includes calibration values for MW, IMP and speed loops, gains an time constants for controllers, high/low limits on controllers, speed deadband and other values. Kappa common includes data related to valve management, i.e. it includes pushbutton operations and modes for the valve management system, single valve/sequential valve status, entered constants, calibration of valve curve slope, number of tries to make manual flow corrections, flow demand, pressure deadband, and other values. ATS - this data includes calculated logicals, real values and calibration data needed to update the ATS system in the computer being activated. Calendar - this data is linked to allow accurate time records to be kept on the logging device for business purposes.

As a result of the described initializing data linking system, standby computer startup is more reliable and faster than would otherwise be the case. Valid turbine metal stress calculations are available from the very beginning of computer availability. Further, the boiler control is immediately available for use without entry of up to 75 keyboard values to validate the boiler control system. Such boiler entries could take 20 minutes or longer depending on how many entry errors are made before all entries are correct and validated. After initialization, DEH manual tracking lines up the DEH controls in the started computer with those in the controlling computer relatively quickly while the boiler tracking controls in the started computer takes some added time for line-up of the boiler control outputs.

Additional information on data link transfers is set forth in the referenced patent application Serial No. 413,291.

Figure 10:
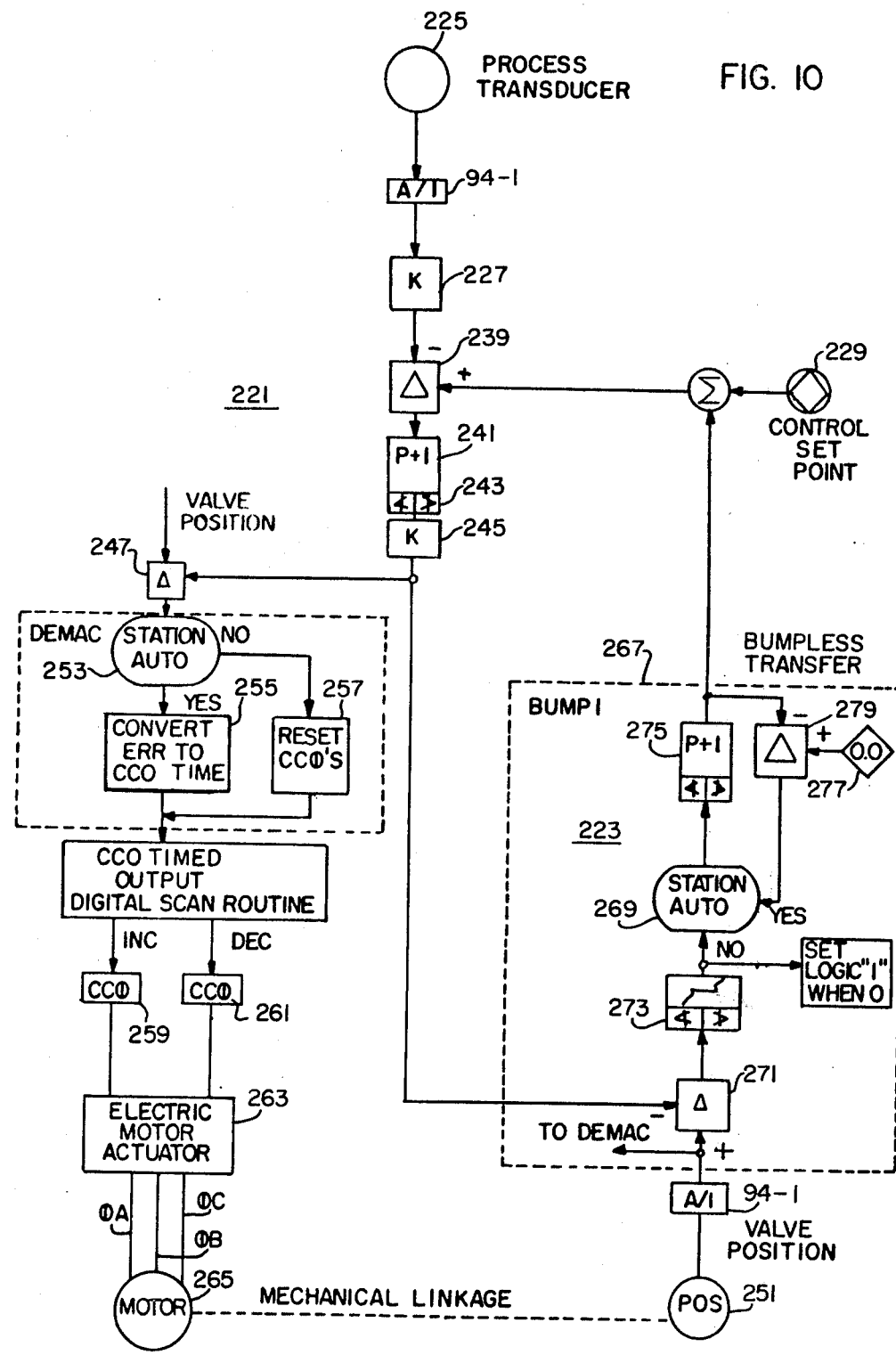
FIG. 10 shows a schematic block diagram of one of a number of boiler control loops with a tracking control which provides for tracking one of the computers in a standby mode to the other computer in the controlling mode.

With respect to the first level boiler controls having integrator action, there is shown in FIG. 10 a first level boiler control loop 221 having a tracking control 223A which is employed in the standby or backup computer 90-2 to update the control loop 221 so that its output corresponds to the output from the same loop in the primary computer 90-1. Once the backup computer determines that it is on standby, appropriate flags are set to place the standby control loop M/A station in the manual tracking mode, i.e. the tracking control 223A and other like controls are made operational to align the standby computer outputs with process changes so that the standby computer setpoints are satisfied and so that the standby and controlling computer outputs from each like pair of boiler control loops in the two computers are substantially identical. Turbine load control loop tracking is provided by a back calculation procedure in a manual tracking mode, i.e. valve position is entered into the computer and the track subroutine 186 (FIG. 5A) and the valve management program 182 make it equal to the position demand to calculate an upstream flow demand and in turn upstream speed corrected megawatt demand and load demand. More details on valve management are set forth in the referenced patent application Serial No. 306,752.

In the first level boiler control loop 221 a process transducer 225A, for example a flow detector, generates an analog signal which is applied to the computer 90-1 through its analog input system 94-1. The flow value is converted to a value in engineering units by block 227 and, during automatic control, it is compared to a flow setpoint 229 by a software error detector 239. Any error is operated upon by a software proportional plus integral controller 241 and high and low limits are applied as indicated by the reference character 243. A gain is applied to the controller ouput by a block 245 and a position demand is then applied to a software error detector 247.

The position demand serves as a setpoint which is compared to the actual position of a controlled device such as a valve. A valve position transducer 251 generates an analog valve position signal which is entered into the computer 90-1 through the analog input system 94-1.

Position error is converted to a timed contact closure output by block 255 if the control loop is in the automatic mode as detected by a block 253. If the control loop is on manual, a block 257 resets the CCO's to take the loop out of control. Increases or decreases in position are implemented through respective CCO's 259 and 261 which energize an electric motor actuator 263 to drive a motor 265 and thereby position the controlled valve to achieve the setpoint flow. The position detector 251 is coupled to the motor 265 for the purpose of sensing the amount of motor motion as a measure of the valve position.

When the computer 90-2 is in the standby mode, a bumpless transfer (BT) block 267 is placed in the manual mode to provide a feedback path for the control loop 221, thereby causing it to track the corresponding control loop in the computer 90-1. A result of computer status detection in the boiler logic program 250-2, the M/A station associated with the control loop 221 is set on manual in a block 269 to initiate the tracking mode.

The position demand signal from the block 245 is compared with the feedback valve position in a software error detector 271 and any error is characterized in a block 273, passed by the block 269 and transferred through a proportional plus integral controller 275 like the controller 241. An output from the controller 275 is summed with the setpoint 229. The controller 275 has two sets of calibration coefficients (time constant and gain), with one set used in tracking and the other set used for automatic bleedoff during return to automatic control. The bleedoff time constant is longer than the time constant for the process integrator 241 to allow smooth return to automatic. The block 273 includes a deadband which passes the tracking position error if it is outside the band and sets the error equal to zero if the tracking position error is within the band. Another block sets a logical permissive for return to automatic if the deadbank output is zero. Once on automatic control, the loss of a deadband permissive will not reject automatic control.

In the manual tracking mode, a deviation in the flow from the setpoint value causes an error to be generated by the error detector 239. The position demand output is compared against the feedback valve position and the bumpless transfer error detector 271 is caused to generate an error output dependent on the actual valve position as controlled by the control loop 221 in the other computer 90-1. The error from the bumpless transfer error detector 271 is integrated in the bumpless transfer controller 275 and the bumpless transfer controller 275 has its output summed with the setpoint from the block 229 to change the net setpoint value applied to the flow error detector 239 in a direction which reduces the error output from the error detector 239.

As the flow error changes over time, the controller 241 changes its output and holds at the value reached when the flow error output reaches zero. Thus, the controlling and noncontrolling computers sense the same flow variable change from the transducer 225A and as the control computer takes control action to change the valve position to correct the flow error calculated by the controlling computer 90-1, the noncontrolling computer 90-2 senses valve position changes and flow changes and modifies its valve position demand from the block 245 until flow error is zero.

Apart from small resolution differences between the two computer systems, the flow error in both the controlling and the standby computers should reach zero at the same time, i.e. when the valve reaches a position which produces no flow error in the controlling computer. Further, apart from small resolution differences between the two computer systems, the position demands from the respective blocks 245 in the two computers should then be the same. Thus, just prior to the execution of a computer transfer, no position error would exist at the output of the position error detector 247 in the computer going out of control and just after transfer no position error would exist at the output of the position error detector 247 in the computer coming into control. Accordingly, the tracking process enables the computer transfer to be made with substantially no disparity in the control demand output from the control system 11, and with no boiler valve motion and no boiler nor power generation disturbance at the time of transfer as a result of relatively large differences in control outputs between the two computers that might otherwise exist. The computer transfer is accordingly made smoothly between the like control loop 221, and other turbine control and first level boiler control loops are similarly smoothyl transferred. Smooth control loop transfer also occurs under non-zero valve position error conditions in a manner similar to that just described.

Once a transfer is executed, the boiler control loop 221 in the newly controlling computer stays in the manual mode and is assigned to a M/A status according to the table 216. Once the hierarchical logic routine 251 (FIG. 6) reaches the boiler control loop 221, the control loop 221 is caused to be placed in the designated mode, in this instance the automatic mode. Normally, the tracking control would cause the tracked position demand to be equal to the actual position at the time of transfer and no error would exist at the output of the error block 271. At the same time, the bumpless transfer block 267 slows its integrated output down to zero by the feedback connection of bumpless transfer blocks 277 and 279 across the bumpless transfer controller 275 by switch operation of the block 269. As the bumpless transfer output drops, the modified setpoint input to the flow error detector 239 drops with it unit it is equal to the value from the setpoint block 229. Simultaneously, the faster responding process control loop reacts to any resultant error from the block 239 to prevent the valve from moving any significant amount as the bumpless transfer from manual to automatic is executed. As a result of the functioning of the tracking controls, very low offset exists in the control outputs in the tracking computer relative to the controlling computer (typically less than 0.1% which is a typical accuracy of a VIDAR) as compared to the offset which would occur if the control outputs were calculated in the noncontrolling computer on the basis of process inputs without tracking control operation.

As already indicated, the control loop 221 and the tracking control which employs the bumpless transfer block 267 typify the first level boiler control loops and tracking controls employed in the various boiler operations. Thus, similar tracking controls are used for first level boiler controls as considered in greater detail in the referenced patent application Ser. No. 413,291, filed concurrently herewith including the following:

| Control | Controlled Device |
|---|---|
| Feedwater | FWB Valve |
| | BFP-1 |
| | BFP-2 |
| Fuel | Minimum Gas Valve |
| | Gas Air Register |
| | Gas Valve |
| | Oil Valve |
| | Oil Air Register |
| Air | FD-1 Inlet Damper |
| | FD-2 Inlet Damper |
| Gas Recirculation | Recirculation Fan-1 |
| | Recirculation Fan-2 |
| Reheat | IR-1 Valve |
| | IR-2 Valve |
| Superheat | IS-1 Valve |
| | IS-2 Valve |

The control loop 221 can be varied somewhat, for example, in some cases in the present embodiment the block 241 is a proportional/proportional plus integral controller to eliminate calibration difficulties created by having two integrators in series.

In addition to the above first level boiler control loops in which tracking controls are employed, higher level boiler controls including the temperature error control and the fuel/air ratio control include bumpless transfer blocks which prevent those controls from modifying setpoints for the first level boiler controls during tracking operations and further which provide for bumplessly bringing the higher level controls into operation after the execution of a computer transfer so that any differences between the status of the higher level control loops in the two computers is bridged bumplessly, substantially without disturbing the power generation process. It is noted that at the time that a computer transfer is executed, the first level control outputs from the two computers are substantially conformed by the functioning of the tracking controls in the first level control loops.

An example of this operation at higher levels in the boiler control is the temperature error system. The transfer operates to balance the multiplier effect in the feedwater system when on manual be seeking a level of 1.0, and when on automatic will track for brief periods of time as required by the temperature control system.

When evaluating the second bumpless transfer in the temperature error system which is used to balance the fuel system multiplier, the technique applied is similar to the feedwater correction signal. For periods of time when the temperature error is on manual, the bumpless tranfer adjusts the corrective multiplier signal to a value of 1.0, and when the temperature error system is on auto the bumpless transfer will track any change made to the multiplier by the temperature error system.

Trigger System For Computer Transfers

When the primary control computer 90-1 is controlling, the transfer system 200 functions to initiate a protective automatic turbine and boiler control computer transfer or an operator selected transfer to the standby computer 90-2 if the latter is alive. With the functioning of the status updating system 206 as previously described, such transfer is made safely and bumplessly. Automatic protective transfers occur in response to certain system conditions.

As shown in FIG. 6, the transfer trigger subsystem 202 includes a hardware failure detection system 222 which generates computer input interrupt signals representative of external hardware failures so as to set a flag in a computer status program 224 (COMP STAT) and thereby in most instances initiate an automatic control computer transfer if the standby computer 90-2 is available. Individual hardware failure detection subsystems are structured so as to call for a computer transfer under detected conditions which make it reasonable to presume a hardware failure has occurred.

1. VIDARS

Figure 13A:
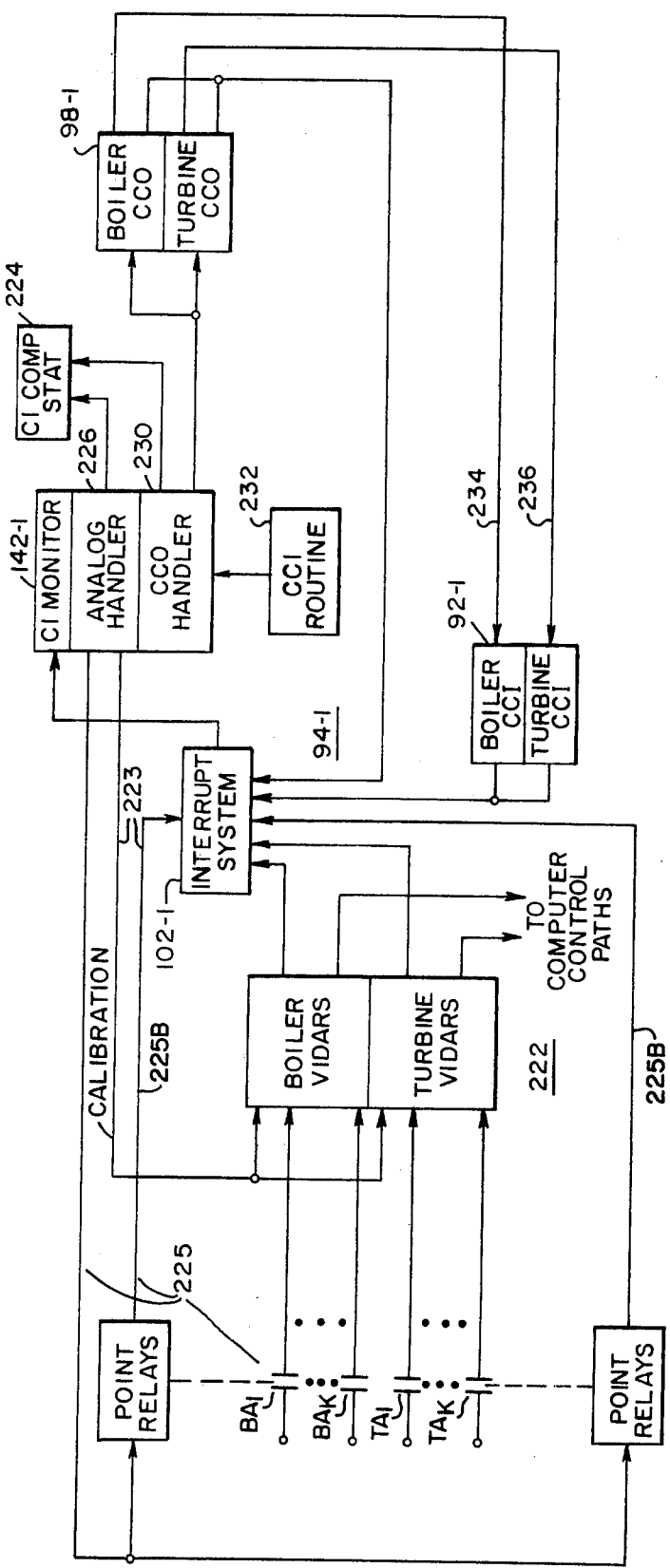
FIG. 13A shows a schematic diagram of a hardware failure detection subsystem included in the computer transfer system of FIG. 6.

If a calibration failure occurs in the boiler or turbine VIDAR units (see FIG. 15A1 and 15A2) in the analog input system 94-1 or 94-2, it is preferred that a VIDAR transfer subsystem 223 initiate an automatic computer transfer since inaccurate analog inputs could cause the controlling computer to operate the boiler or turbine in a distorted manner. As shown in FIG. 13A, each VIDAR couples multiple boiler or turbine analog signals sequentially into the computer 90-1 or 90-2 on a periodic basis. The VIDAR integrates each analog signal over its sample time period and generates a converted binary word signal for input to the controlling computer.

The analog handle (T:ANI or B:ANI) as indicated by the reference character 226 in FIG. 13A in the executive monitor 142 calibrates each VIDAR by applying sample voltages to it and sensing the converted inputs. If the VIDAR characteristic curve is offset from zero, a calibration offset change is applied to the VIDAR. If the slope or span of the curve is different from the specified value, a calibration gain change is applied to the VIDAR. If either or both the calibration offset and gain reach values where neither can be further adjusted for calibration purposes, the analog handler 226 sets a turbine flag PSVF1 or a boiler flag PSVF2 according to the VIDAR which has malfunctioned. In turn, flag VDROS1 or VDROS2 is set in the computer status program 224 and an automatic computer transfer is initiated. Typically, calibration would be required with system frequency changes and the calibration range would be exceeded by the occurrence of excessive system frequency error.

2. Lost Analog Input Interrupt

Another protective transfer subsystem 225 is provided to trigger a computer control transfer when the turbine or boiler analog input system 94-1 or 94-2 fails in a manner such that an analog point relay fails to close in response to a periodic analog handler command. With the failure of a point relay, the converter relay corresponding to the process transducer connected to the failed point relay contacts goes to zero because no analog voltage is supplied to the associated VIDAR during the sampling time period. As in the case of a VIDAR calibration failure, substantial distortion could result in the boiler or turbine operation with a point relay failure. Therefore, initiation of an automatic control computer transfer is preferred on the detected failue of an analog point relay.

When an analog point relay is to be closed, the analog handler 226 (FIG. 13A) sets a flag PANIF on the generation of the relay close command. The monitor 142-1 senses the set flag and counts down preferably for 1/10 second. If a relay closure interrupt has not been returned within the 1/10 second as indicated by the reference character 225B, a relay failure is presumed and a control computer transfer is initiated. Normally, a mercury wetted relay contact closes in about 3 to 4 milliseconds, and the countdown time of 100 milliseconds accordingly provides ample time for relay operation.

When an interrupt return does not occur, a turbine flag ANIFAIL1 or a boiler flag ANIFAIL2 is set in the computer status program 224 and an automatic computer transfer is initiated.

3. Lost Contact Closure Output Interrupt

If a turbine or boiler output contact fails to function in the contact closure output system 98-1 or 98-2, a disturbance could occur in the boiler or turbine operation and it is therefore preferred that a computer transfer be automatically initiated by a lost CCO interrupt subsystem 227 on a detected CCO failure. Generally, as each contact closure output is generated in connection with the performance of control and other tasks, the monitor 142-1 counts down for 1/10 second and the CCO handler indicated by the reference character 230 in FIG. 13A sets turbine and boiler flags PCFLG1 and PCFLG2. If a boiler or turbine CCO completion interrupt is not returned in 1/10 second, the boiler or turbine flag in the handler 230 is not reset and a corresponding turbine or boiler flag CCOFAIL1 or 2 is set in the computer status program 224 to initiate an automatic computer transfer.

4. Lost Contact Closure Input Interrupt

It is also preferred that a failed input contact in the boiler and turbine contact closure input systems 92-1 and 92-2 result in an automatic computer transfer since the computer 90-1 might otherwise continue to operate the turbine 10 and the boiler 22 with the absence of important or critical process information. Preferably, in a lost CCI subsystem 229, a CCI routine 232 (FIG. 13A) causes a preselected boiler CCO and a preselected turbine CCO to be operated on a periodic basis and a flag CCISI1 or 2 is set each time a test is made. The CCO's are wired to activate CCI's as indicated by the reference characters 234 and 236 and the monitor 142-1 counts down 1/10 second after a CCO command is generated. If the appropriate CCI interrupt is not returned within 1/10 second, a flag CCIS1FL or CCIS2FL is set in the computer status program 224 and a computer transfer is triggered.

5. Parity Error

With the use of conventional core memory for which a parity error detector 238 is provided as in the present case, the output of a parity error detector 238 is preferably coupled to the computer 90-1 to trigger an automatic computer transfer when a parity error occurs. In the present embodiment, a fast 32,768 word Ampex core is employed in the P2000 computers 90-1 and 90-2 and a parity error detector 238 (FIG. 6) is provided for each computer main frame. Each core word location has 17 bits and the 17th bit is set or reset according to whether the word has an odd or even number of bits at any point in time. For each word, the partiy error detector 238 compares the actual number of set bits with the state of the 17th bit. If a difference is detected, an interrupt is generated and the computer 90-1 is immediately made inactive, and accordingly the monitor 60 cycle sync countdown no longer activates a toggling program 240 (DD CONTACTS) thereby deactivating an external dead computer detector circuit card 242 (FIG. 6). A control computer transfer is thereby simultaneously triggered.

6. Analog Trap

Figure 14A:
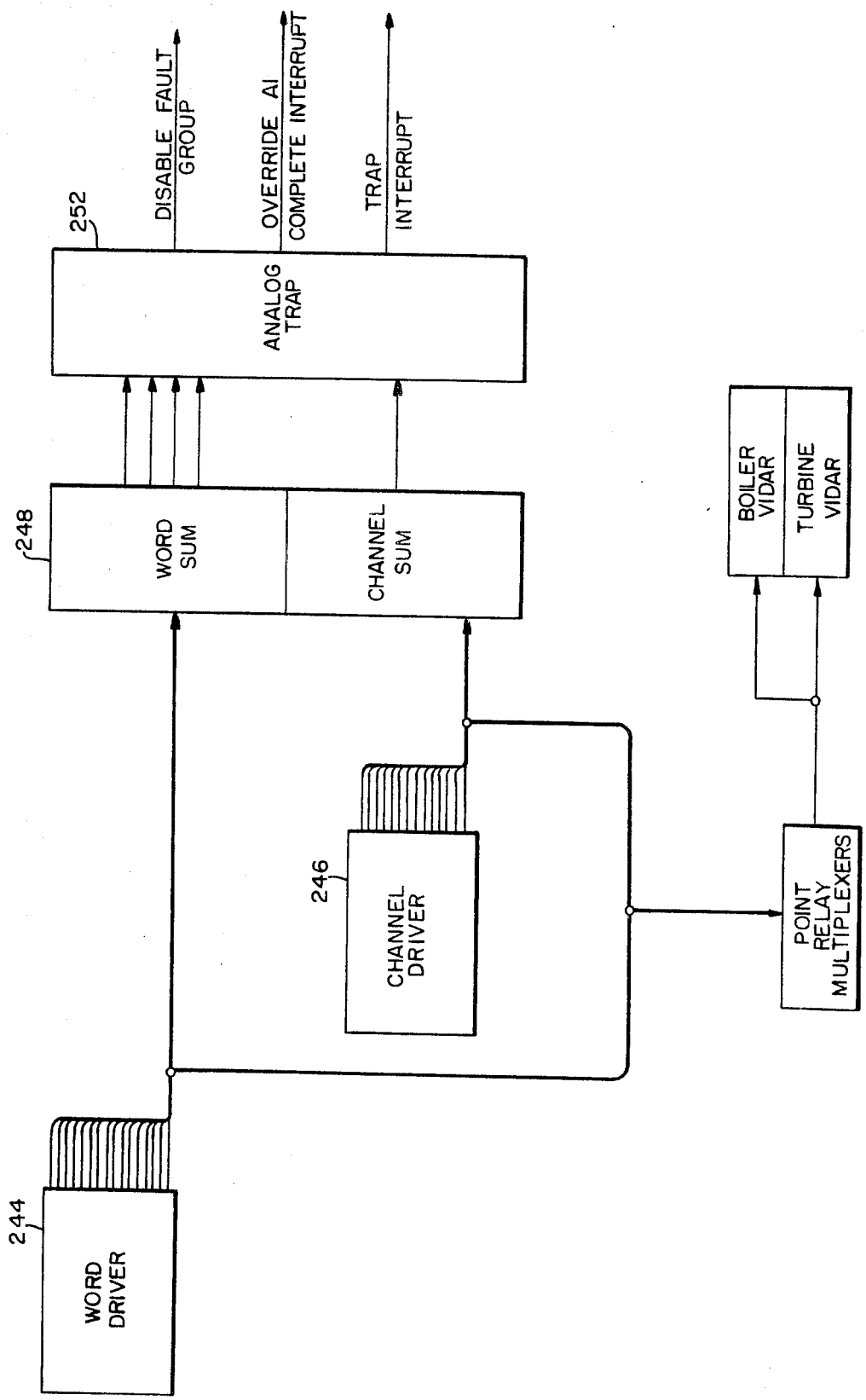
FIGS. 14A through 14E show circuitry included in an analog trap subsystem included in the computer transfer system of FIG. 6.

The purpose of an analog trap subsystem 244 is to trap or detect whether a circuitry malfunction has occurred in the channel and word drive circuitry for the analog input relay system apart from the operability of the analog point relays as detected by the lost analog interrupt subsystem 226. Thus, as shown in FIG. 14A, word driver cards 244 (only one shown) and channel driver cards 246 (only one shown) provide matrix circuitry with each matrix point being activated under Analog Handler control to switch a corresponding analog point relay in the analog point relay system. Normally, only one analog point relay is to be closed in any one VIDAR input channel (boiler or turbine) and a summing resistor card 248 (only one shown) and an analog trap card 252 (only one shown) detect whether the computer word and channel drive circuitry is attempting to close two or more relays at any one time in any one VIDAR input channel. In the sequencing of input relay contact closures to obtain successive analog input point samplings, a contact closure is held for about 18 milliseconds in a 25 millisecond time frame with the successive analog closures occurring in successive time frames. A faulty multiple analog input relay condition would exist where the sequence is disturbed by the generation of drive signals which cause common closure of multiple relay contacts over at least some time portion of the time frame.

If a multiple relay activation is detected, the analog trap card 252 generates an interrupt which causes the computer status program 224 to initiate a control computer transfer as indicated in FIG. 6. Protective transfer of control responsibility to the standby computer 90-2 is preferred for an analog trap condition since the simultaneous application of multiple analog signals to a VIDAR could cause unsafe or undesirable boiler or turbine operation. In power plants having one control computer with manual backup capability, turbine or boiler operation is switched from automatic to manual backup control in the event of an analog trap condition. Thus, in the latter case, the computer status program 224 would generate a contact closure output which would cause the outputs from the turbine manual control 106 and/or manual backup boiler controls (not indicated in FIG. 4) to undertake process control.

Figure 14B:
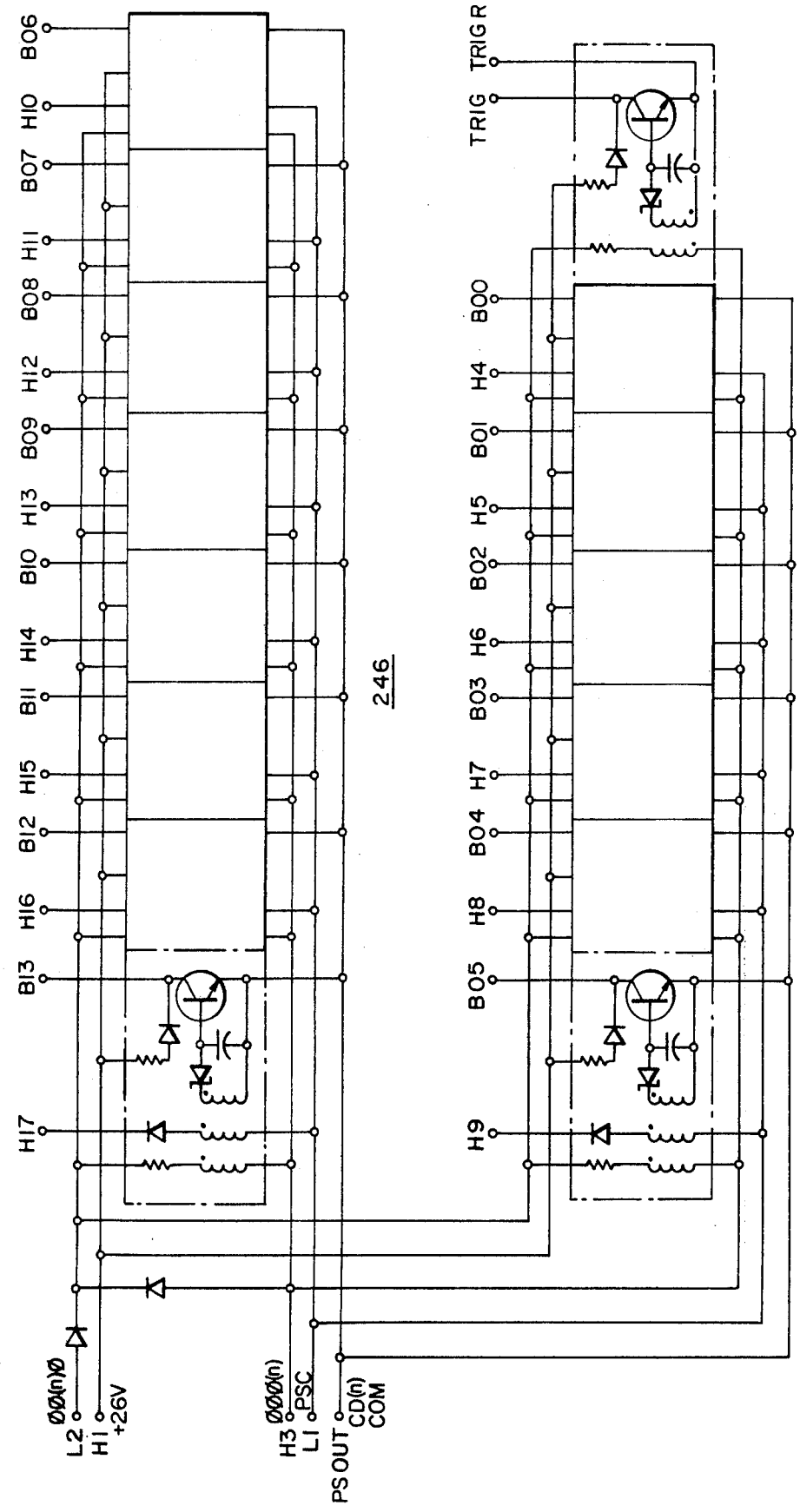
Figure 14C:
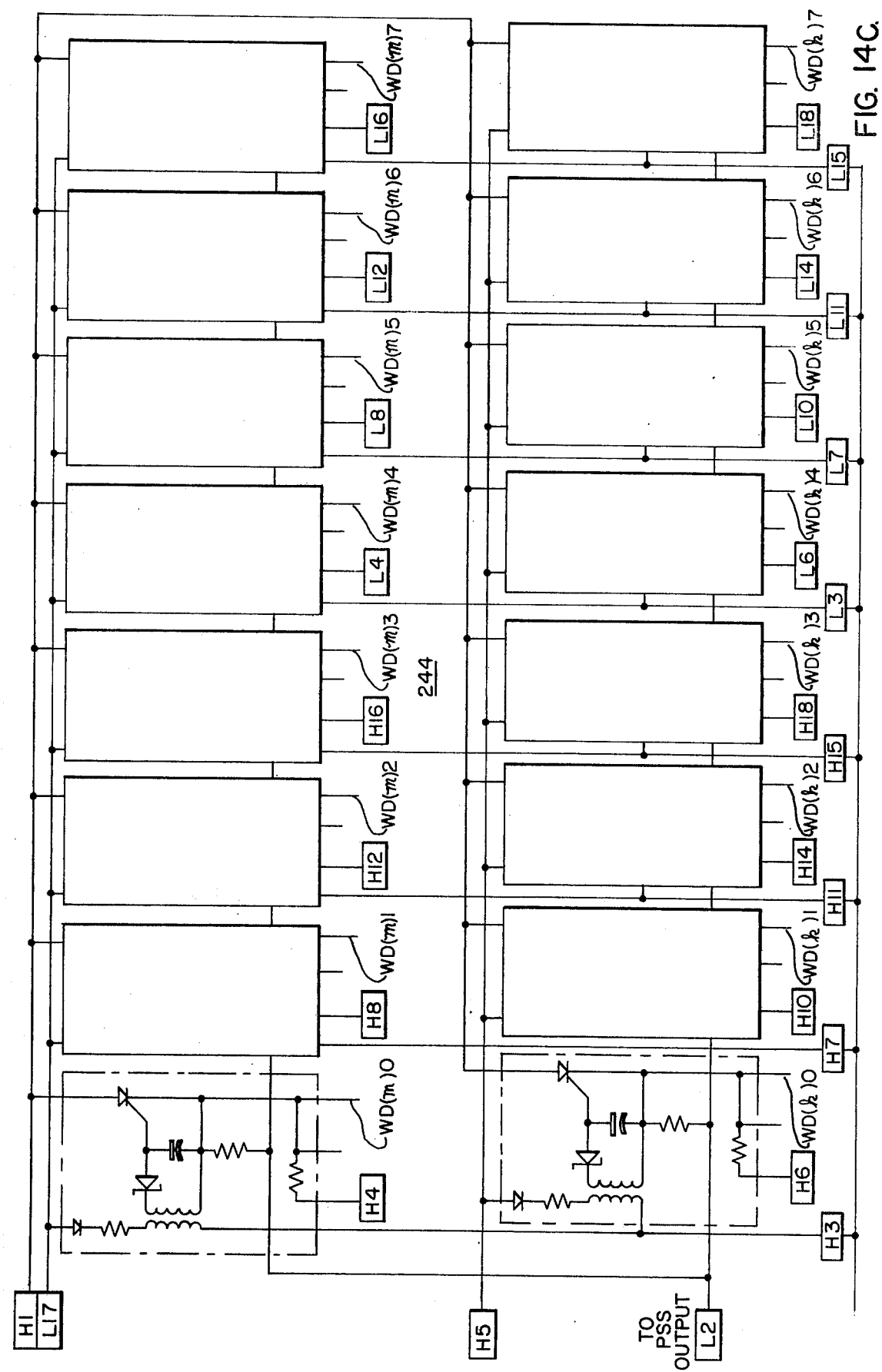
Figure 14E:
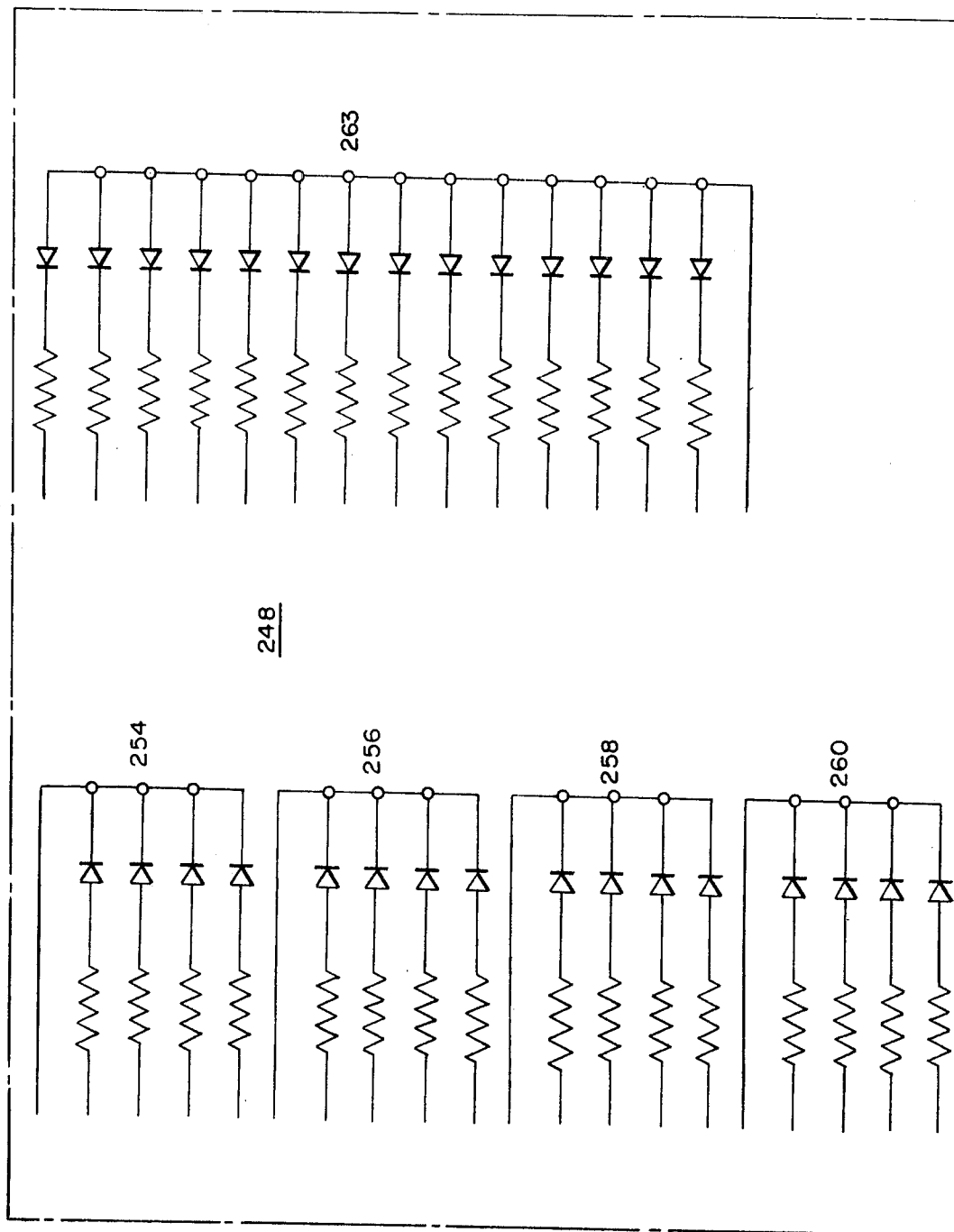
Figures 1, 15A:
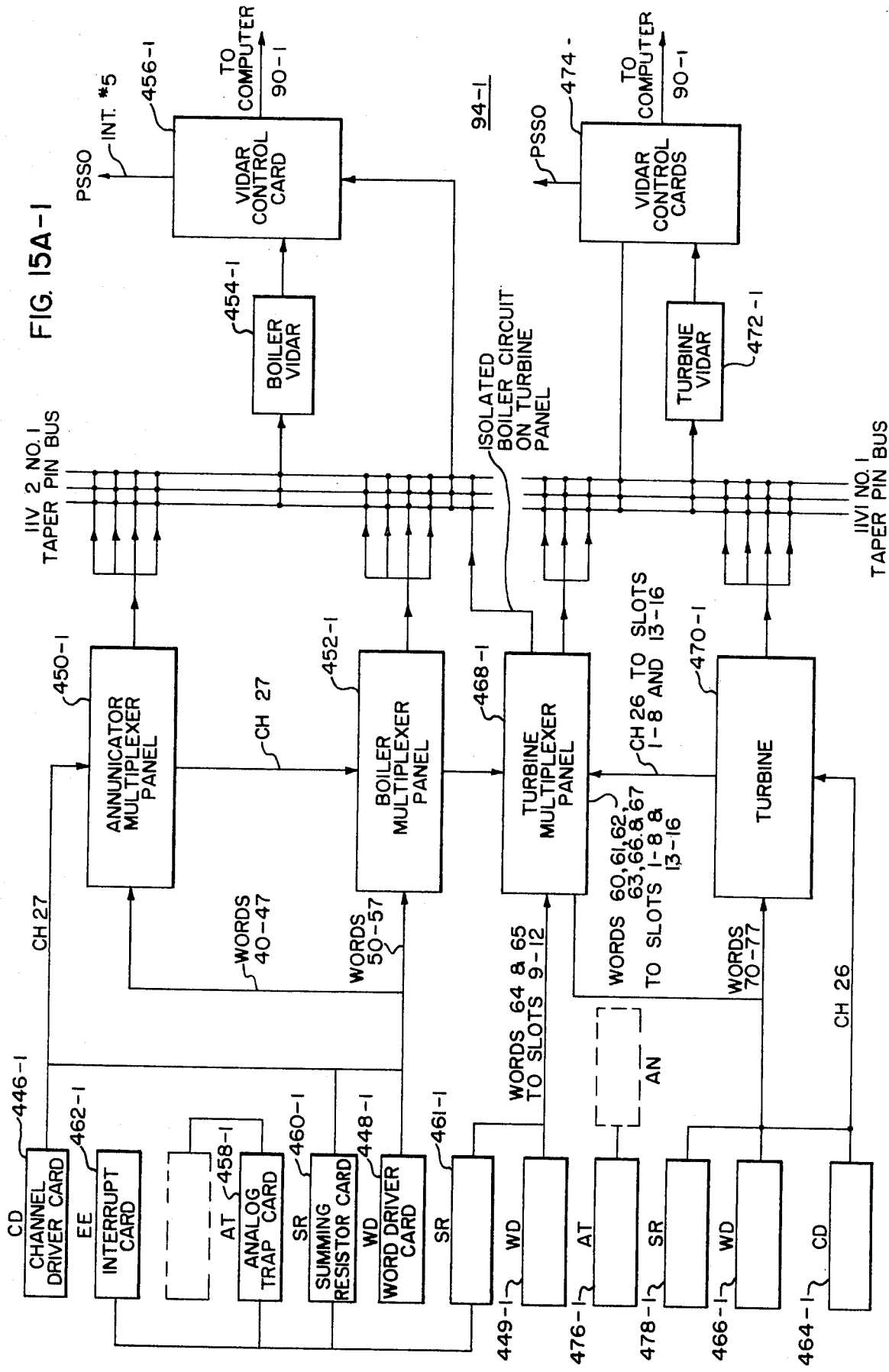
Figures 2, 15A:
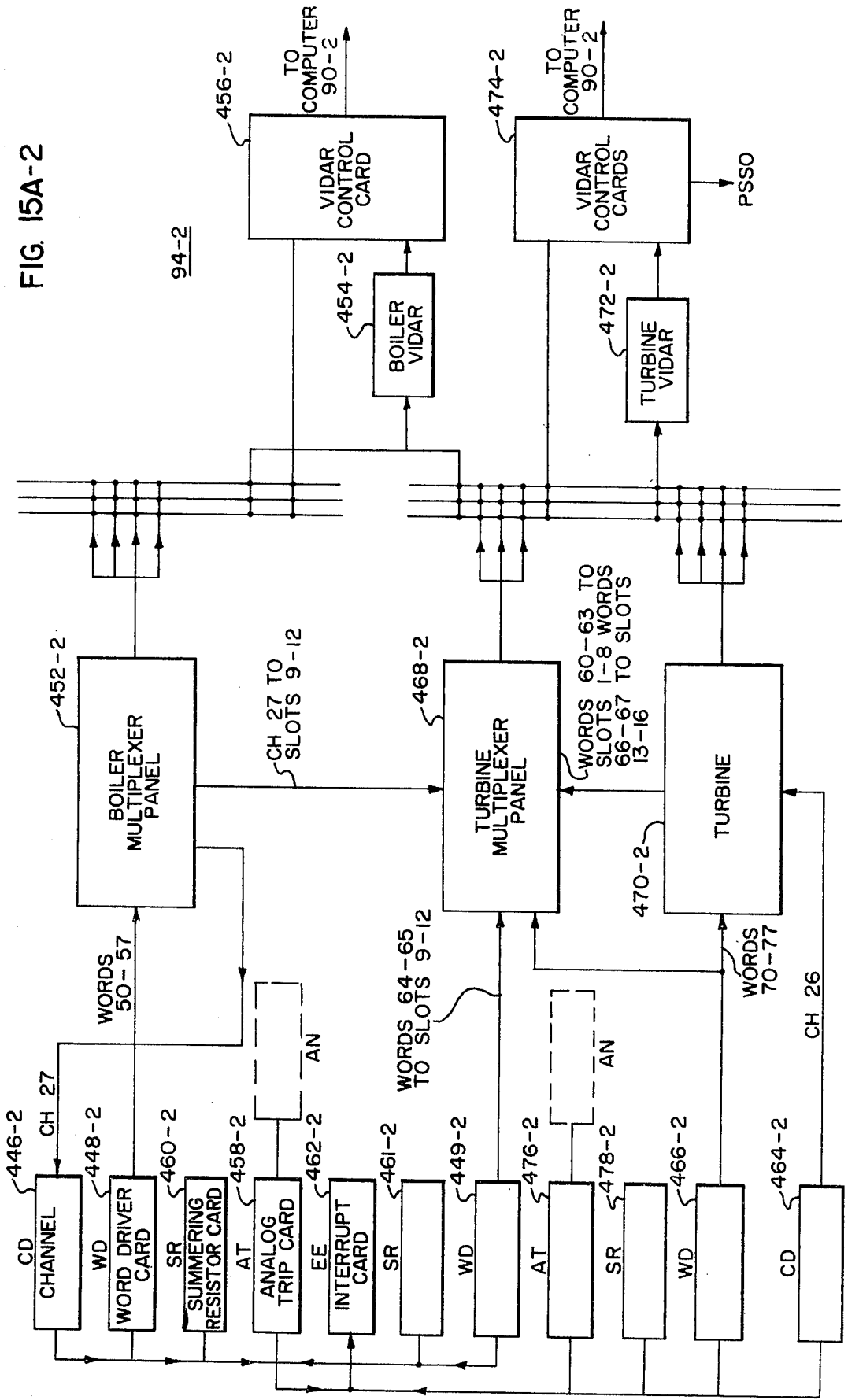

Conventional channel driver circuits and word driver circuits are provided on circuit cards 244 and 246 shown in FIGS. 14B and 14C. As shown in FIG. 14E, the word driver outputs are organized into four subgroups which are applied to four resistor diode summer circuits 254, 256, 258 and 260. All of the channel driver outputs are applied to a single summer circuit 263. Reference is made to FIG. 15A1 and 15A2 where there is shown the preferred scheme for the analog input systems 94-1 and 94-2 in which the boiler inputs and the turbine inputs are organized into separate subsystems which are separately interfaced with the associated computer.

Figure 14D:
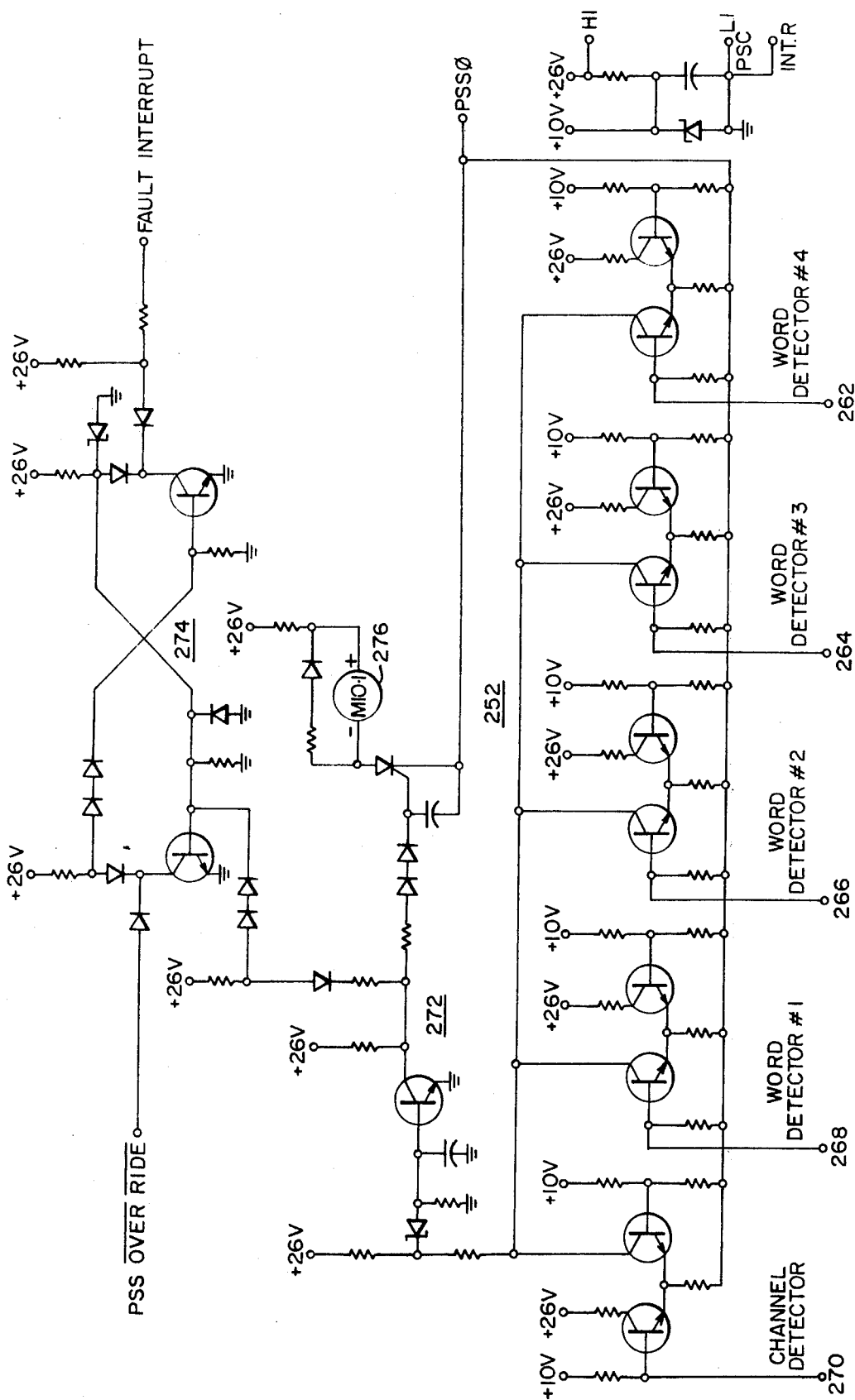

The outputs from the summing resistor card 248 are coupled to the analog trap card 252 which is shown in FIG. 14D. Thus, the summed word signals and the summed channel signals are respectively applied to transistor trap detector switch circuits 262, 264, 266, 268 and 270 which are sufficiently sensitive that a switch output occurs if the summed input signal corresponds to a sum of more than one word drive signal or a sum of more than one channel drive signal, and no output occurs if the summed input corresponds to one or or word drive signal or one or no channel drive signal.

In turn, all of the trap detector switches 262 through 270 are connected in OR relationship to the input of a driver transistor circuit 272. When the driver transistor circuit 272 is actuated, an output transistor circuit 274 is triggered to generate momentary high voltage output signals PSS and FAULT INTERRUPT and to operate a relay 276. The PSS signal acts as an override to prevent generation of an analog input completion interrupt and the FAULT INTERRUPT signal serves as an analog trap input to the computer 90-1 to initiate a computer transfer. In summary, the analog trap subsystem 244 produces a computer transfer interrupt if any two associated word drive signals or any two associated channel drive signals are generated at the same time, i.e. if the word and channel drive circuitry is attempting simultaneously to set any two point relays associated with each other in the same VIDAR input channel. Some additional information on the analog trap is provided in the referenced patent application Ser. No. 413,291.

7. Data Link Transfer

Figure 13B:
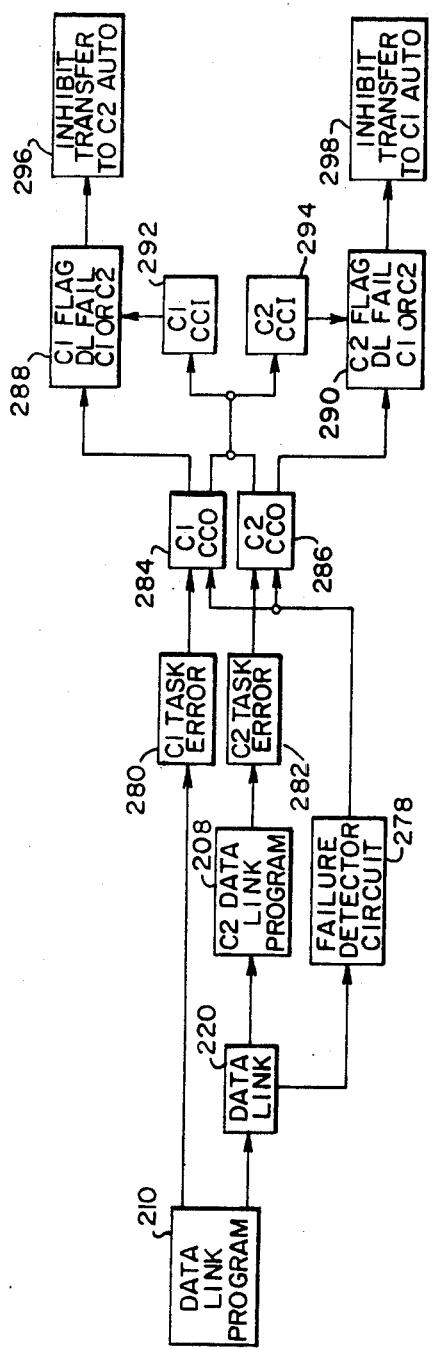
FIG. 13B shows a block diagram of a data link failure subsystem included in the computer transfer system of FIG. 6.

If the data link hardware fails as detected by a circuit 278 shown in FIG. 13B, or if a data link software error occurs as detected by a C1 or C2 task error routine 280 or 282 considered more fully subsequently herein, a control computer transfer is permitted to occur on operator select or on a protective trigger from another transfer trigger subsystem 281 but such transfer is preferably restricted such that the computer coming into control does so in the manual mode, i.e. the automatic mode is inhibited in the post transfer state of the control system 11. The reason for the restriction is that a failed data link presumably makes the computer coming into control unreliable in the automatic mode since the linked data for standby computer status updating pertains largely to automatic operation.

If an error is detected by the circuitry 278 or by the task error block 280 or 282 in the data link transfer subsystem 281, a CCO 284 or 286 is generated in the computer 90-1 or 90-2. Simultaneously, a flag DLFAIL is set in a block 288 or 290 included within boiler logic programming considered more fully subsequently herein. The CCO's 284 and 286 are crosswired to respective CCI's 292 and 294 in the two computers 90-1 and 90-2 thereby putting both computers in the same data link failure flag status when a data link failure is detected by either computer 90-1 or 90-2. Once the flag DLFAIL or is set, an automatic inhibit is set as indicated by blocks 296 and 298.

8. Logging Device

The logging device in this case is a Selectric Typewriter (FIG. 4) and it is coupled to the computer 90-1 for operation. In the event an interrupt is not returned after a character output to the typewriter, or if a software failure occurs in the form of an improper message format, a subsystem 300 initiates a response, i.e. preferably a panel light is turned on in the plant section of the panel board and data logging is switched over to the programmer's console typewriter if it is available. The standby computer 90-2 is coupled in this case only to the programmer's console typewriter.

A task error detector 302 also forms a part of the transfer trigger system 202 and it preferably triggers a control computer transfer when certain predetermined software malfunctions occur. In the operation of a real time control computer, the computer is considered to have entered a tight loop and gone out of real time control when a combination of events causes the computer to spend its duty cycle at some higher task level such that one or more lower task levels become unserviced. In that case, the control computer may cause undesirable process disturbances as a result of nonperformance of the lower priority tasks. A tight loop detector 304 is accordingly provided to trigger a computer transfer in the event a tight loop condition occurs. Other software malfunction detectors are also included in the software error detector 302.

1. Tight Loop Detector

Figure 13C:
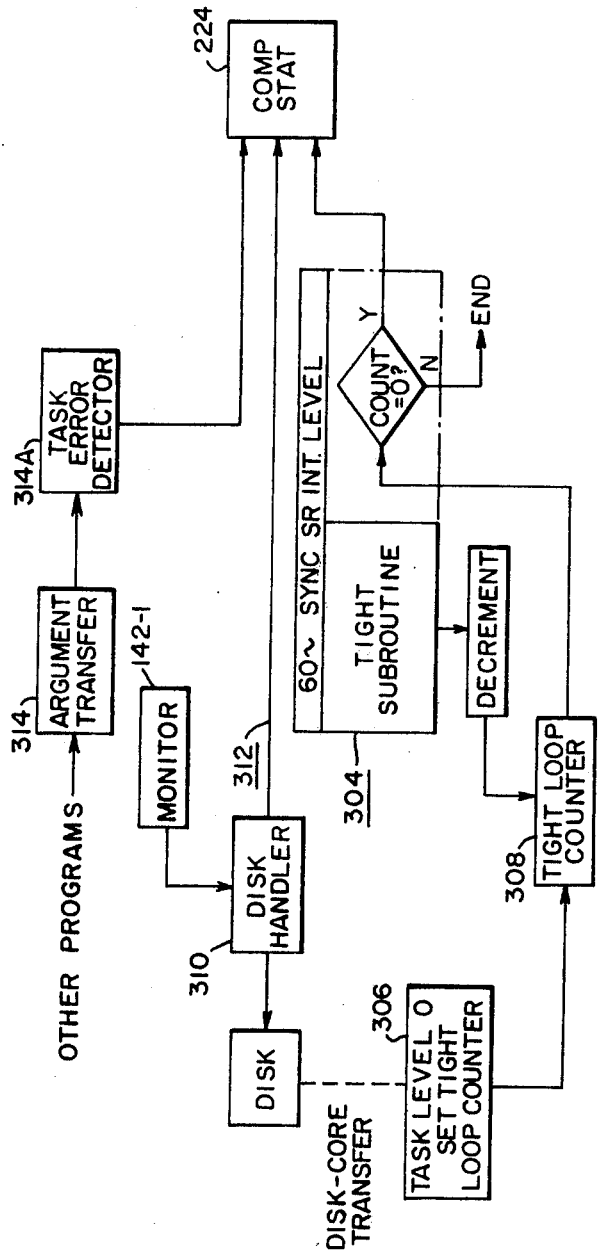
FIG. 13C shows a diagram of a software malfunction detection subsystem included in the computer transfer system of FIG. 6.

As shown in FIG. 13C the tight loop detector 304 comprises a subroutine TIGHT which is preferably executed at the service request interrupt level (i.e. above task levels). Preferably, the only higher service request interrupt is the power failure interrupt. At a lower and preferably the lowest task level i.e. level one, another subroutine 306 sets a tight loop counter 308 to a count of 30 every second. The subroutine TIGHT decrements the tight loop counter by a count of one every 0.1 seconds. If the tight loop counter ever reaches the count of zero, i.e. if the lowest task level fails to be serviced to end the count within the limited time period, the subroutine TIGHT sets a flag PROGD-SAB in the computer status program 224 to trigger a control computer transfer. Thus, it is presumed that some combination of events has caused the computer 90-1 to go into a tight loop if the tight loop counter 308 reaches a zero count within a 3 second period. For example, a sequence of events interrupt card outside the computer 90-1 could fail such that a 300 or 400 cycle signal is generated at the card output to cause the computer 90-1 to use its duty cycle (subject to higher priority interrupts) in responding to the faulty cyclical interrupt input.

2. Bad Disc Transfer

A bad disc transfer detector is included as part of a conventional disc handler 310 in a bad disc transfer subsystem 312. If a disc transfer is detected to contain a parity error, the disc handler 310 sets a flag in the computer status program 224 preferably to trigger a control computer transfer. In this manner, process disturbances which could otherwise be caused by program errors introduced by a bad disc transfer are avoided.

3. Bad Argument Transfer

A bad argument transfer trigger subsystem 314 includes a conventional task argument error detector 314A (FIG. 13C) preferably to trigger a control computer transfer on detection of a bad argument produced during program execution. Approximately 50 to 60% of the programming in the computer 90-1 is tied to the detector 316 for argument evaluation. For example, if the CCO handler 230 (FIG. 13A) were to be called by a program but that program had no CCO to transmit the CCO system 98-1, a bad argument would exist. Generally, the task argument error detector 314A is especially needed where no parity error detector is employed, and it is otherwise needed as in the present case to provide protection especially in relation to the loading of new or modified programs into the computer 90-1 or 90-2 after the system operation has been initiated. Reference is made to a Westinghouse manual TP043 where greater detail is presented on the detection of task errors. Some added information is also presented in the referenced patent application Ser. No. 413,291.

System For Initiating Operator Selected Computer Transfers

To institute a computer switchover by operator selection, the appropriate computer select pushbutton is operated and panel interrupts are processed by programs 316 and 318 in the two computers 90-1 and 90-2 to bid panel programs 320 and 322 in the operator select system 204. The panel programs 320 and 322 generate logicals which are respectively applied to the C1 and C2 boiler logic programs 250-1 and 250-2. In turn, the boiler logic program 250-1 deactivates the dead computer detector contacts routine 240-1 to stop toggling the dead computer detector card 242-1 if the computer 90-1 has been controlling and the computer 90-2 has been selected for control by the operator. With deactivation of the dead computer detector card 242-1, control transfer is initiated to the computer 90-2. On the other hand, if the computer 90-2 has been controlling and the computer 90-1 has been selected for control by the operator, a control transfer is initiated without deactivation of the dead computer detector card 242-2 by the dead computer detector contacts routine 240-2.

System For Executing Computer Transfers

A number of software and hardware elements interact in the transfer execution system 203 in detecting which computer is controlling and whether the noncontrolling computer is available for control and in executing a control transfer safely and bumplessly from the controlling computer to the computer in the standby mode or to manual backup controls.

1. Dead Computer Detector Card

Generally, the computer status program 224 (FIG. 6) includes a block 324 (FIG. 9) to detect whether a malfunction trigger has been generated to require an automatic protective transfer to standby control. If the computer status program 224 detects a transfer trigger in the block 324 a flag DEADOK is reset in block 326 and the C1 dead computer detector contacts program 240-1 is operated by block 328 to stop the dead computer detector card 242-1 from toggling and thereby bring the standby computer 90-2 into active control. As previously considered, the failure or malfunction detection system 202 can set any of the following flags to trigger an automatic protective computer control transfer:

VDROS1 or 2
ANIFAIL1 or 2
CCOFAIL1 or 2
CCIS1FL1 or 2
ANITRP1 or 2

At the same time, the auxiliary synchronizer 168-1 is deactivated to stop the execution of all periodic programs in the computer 90-1. In addition, the boiler logic program 250-1 is provided with a logical that the primary computer 90-1 has gone out of control.

The dead computer detector contacts program 240 is a part of the P2000 executive package and is preferably operated periodically off the monitor 60 cycle sync countdown routine. It operates through a cycle of outputting a 14 bit word containing all 1's in odd places and all 0's in even places, reading the bits from the dead computer detector card and comparing them by exclusive OR logic to the last output bits, outputting a 14 bit word containing all 0's in odd places and all 1's in even places, reading the bitd from the dead computer detector card and comparing them to the last output bits, and repeating the cycle continuously unless a malfunction occurs. Such a malfunction does occur if the I/O equipment is detected not to be functioning properly as a result of the EXCLUSIVE OR toggle check or as the result of a protection system reset of the flag DEADOK in the computer status program COMP STAT.

The dead computer detector card is a standard P2000 circuit card which includes a set of bit flip-flops which cause an output dead computer relay to remain energized so long as the card is toggled by the dead computer detector contacts program 240-1. Energization of the dead computer relay indicates that the computer is alive and well. The dead computer contacts program is preferably operated with a periodicity less than one second, i.e. with a periodicity of 0.5 second, so that any need for control computer transfer can be detected in less time than the typical one second time period for full stroke turbine valve movement. However, the periodicity is not so little as to consume excessive computer duty cycle. The preferred 0.5 second periodicity satisfies both of the described constraints.

2. Dead Computer Panel

Figure 7:
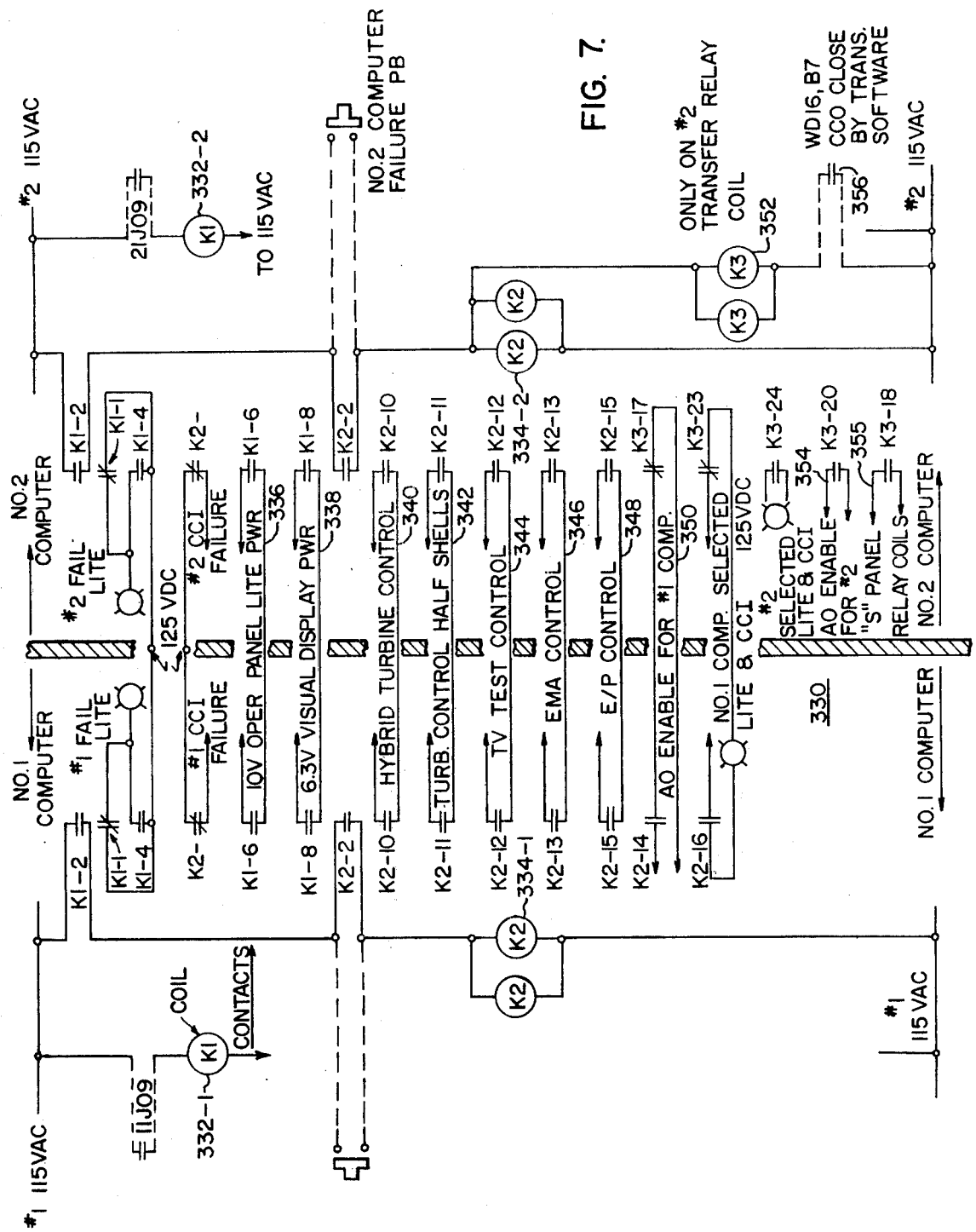
FIG. 7 shows a schematic circuit diagram for a dead computer panel associated with the two digital computers of FIG. 4.

A dead computer panel 330 (FIG. 6) provides for energizing various output equipment circuits, if one of the two computers is in control, and it provides control over the computer output equipment to switch the computer in control to the process control devices. As shown in FIG. 7, the dead computer panel 330 includes a K1 relay 332-1 which is energized with closure of the dead computer detector card output relay by the dead computer detector software in the computer 90-1. A like K1 relay 332-2 is operated in a like manner by the computer 90-2.

After the computer fail pushbutton is pushed, K2 relays 334-1 and 334-2 are energized if the K1 relays are energized. Energization of the K1 and K2 relays of either computer 90-1 or 90-2 switches power to a number of computer interface circuits including a 10 volt operator panel light power enabling circuit 336, a 6.3 volt visual display power enabling circuit 338, a hybrid turbine control enabling circuit 340, a turbine control half shells enabling circuit 342, a throttle valve test enabling control 344, an electric motor actuator control enabling circuit 346 and an electropneumatic control enabling circuit 348.

Since the single analog output system 100 (FIG. 4) is employed, it is switched by a circuit 350 to be coupled to the computer 90-1 by means of normally open relay contacts K2-14 and a normally closed relay contact K3-17 associated with a K3 transfer relay 352.

When a transfer is to be executed, the dead computer detector card 242-1 drops out its relay which closes a CCI 354 (FIG. 6) to trigger a sequence interrupt for the computer 90-2. The computer transfer is then implemented by the boiler turbine logic program 250-2, i.e. a CCO 356 (FIG. 7) is generated to operate the K3 transfer relay 352 and software functions needed for execution of the transfer are initiated.

With energization of the K3 transfer relay 352, the analog output enable circuit 350 for the computer 90-1 is deenergized and an analog output enable circuit 354 for the computer 90-2 is enabled to switch over the digital to analog converter circuitry to the computer 90-2. Similarly, a circuit for the transfer of S panel 355 (FIG. 7) is operated to energize relays which switch the control outputs from the CCO's of the computer 90-1 to the CCO's of the computer 90-2. All other enabling circuits 336-348 remain energized since the K1 relay 332-2 remains energized as the K1 relay 332-1 opens its normally open contacts within 0.5 second of the trigger event for the transfer.

Generally, in control switchover, the backup control takes over control with a level of automation equal to or below the automation level of the computer going out of control. Reduced post-transfer automation occurs when events during or after transfer require particular loops to be rejected from the automatic mode. Thus, control loops may have been or may become radically upset prior to, during, or after transfer to the point where automatic control is undesirable or impossible. In that event, a permissive is lost to prevent the control loop from returning to automatic after the transfer.

3. Boiler Logic Program

Figure 11B:
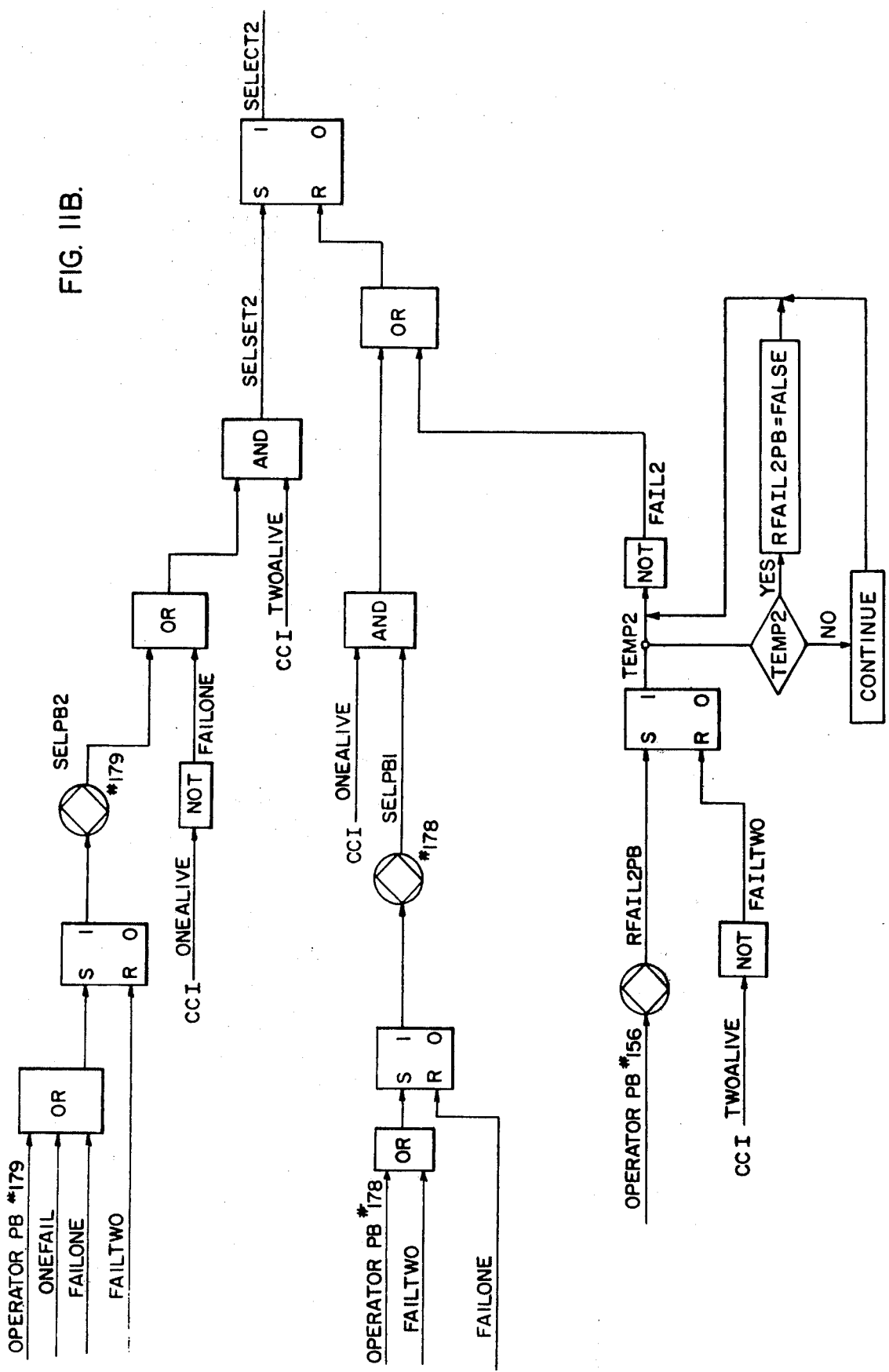

As shown in FIG. 12, the boiler logic program 250-2 employs a block 360 to examine the status of the other computer upon demand for a program run by block 362, i.e. if a state change occurs in any of four CCI's corresponding to C1 alive (CH67 Bit 13), C2 alive (CH67 Bit 12), C1 in control (CH67 Bit 10). FIGS. 11A and 11B show the employed transfer execution demand logic. In block 364, a check is made as to whether the computer 90-1 is dead, i.e. whether the dead computer detector card 242-1 has generated a CCI and the program is ended if the computer 90-1 is alive and in control. If the computer 90-1 is dead, block 366 detects whether the standby computer 90-2 is available for control. If not, the control system 11 is rejected to manual by block 368, i.e. direct wired circuits which parallel the computer control from the panel boiler M/A stations to the electric motor actuators and other boiler control devices become activated and the turbine manual control 106 is switched into active control. However, certain boiler startup loops do not have manual backups which means that boiler startup requires computer availability.

If the standby computer 90-2 is available for control upon a transfer initiation, block 370 in the boiler logic program 250-2 changes all of the standby M/A conditions from the standby manual mode to the modes specified in the data linked M/A stations table 216. In the computer going out of control, the M/A stations are placed in the manual mode to provide for subsequent standby mode tracking.

Next, block 372 in the standby computer program inhibits a retransfer to the primary computer 90-1 for a fixed time period such as 10 minutes in order to allow the power generation process to stabilize following the transfer before a retransfer is permitted to be executed. In standby computer program block 374, the turbine logic is bid to be run and the boiler chains are bid so that the boiler control loops can be placed in the mode specified in the M/A table 316 in a hierarchical manner, i.e. beginning with first level boiler controls and ending with the plant unit master mode (i.e. either plant manual, start, ramp, local coordinated, remote coordinated, turbine follow, or boiler follow). The turbine control is immediately placed on operator automatic if the operator automatic mode has been selected by pushbutton. Automatic dispatch, impulse pressure control, and magawatt control are all rejected in the computer coming into control. In order to protect against actual or possible overspeed contingencies, the turbine speed control loop is automatically connected by block 376 on transfer if it was open prior to transfer and remains closed if it was closed prior to transfer. Hardware failure is the only condition which will remove the speed control loop from service.

Block 378 places the turbine control on demand CCI scan as opposed to periodic CCI scan. Next, the panel GO and HOLD pushbutton operations are processed by the block 380 prior to the program end. The order in which boiler controls are brought into the automatic mode is as set forth in the program listing included as part of the referenced concurrently filed patent application Ser. No. 413,291.

Wide Range Speed/Load Transfers

The transfer sytem 200 is structured so as to implement computer transfers upon a transfer trigger or operator selection regardless of the operating level of the plant. Thus, computer transfers can occur smoothly as the steam generator or boiler is being started, as the turbine is being started and raised to synchronous speed, and as the boiler and turbine are operated in the load mode.

During boiler startup, automatic control is required in this embodiment and any transfer of control from computer must be to the other computer or the boiler is shut down. The boiler startup valves including BE, SA, FWB (FIG. 1C) as well as separator tank startup valves WD and SP are operated by the controlling computer. Prior to a computer transfer, the backup computer operates in the manual track mode to generate tracked control outputs for the startup valves. On transfer, the computer coming into control applies its control loops to the startup valves bumplessly and a bumpless transfer is then made from manual tracking to automatic as previously described. The control system 11 functions sufficiently tightly on a transfer during boiler startup that separator pressure and level are normally smoothly maintained during the transfer to avoid a steam blowoff to atmosphere which would be costly because of treated water costs.

On turbine startup, the speed control loop operates the turbine throttle and governor valves under operator or automatic control as the boiler controls determine the inflow of feedwater, fuel and air to the boiler. Computer transfers can occur smoothly at any time on a wide speed range basis during turbine acceleration to synchronous speed. In the turbine speed control loop, sensed turbine speed is compared to the speed reference to generate a speed error. Since no integration is applied to the speed error, i.e. a proportional control transfer function is used, there is no need for a tracking control of the type previously described.

With the previously described five-minute data link, computer transfer is achieved with reduced time for the backup computer to resume automatic startup control after the transfer is executed. Thus, insofar as the steam turbine is concerned, the automatic startup appears to have been placed on a hold during the transfer and then resumed shortly thereafter. The actual time for the ATS to become operational as a control on the rate of change of the speed reference in the backup computer is a function of the time required for the standby computer to process its control logic to make the transition from manual speed loop tracking to speed loop operation and any delay that may be intentionally added to that. Generally, the logic determines whether automatic control is to be rejected for reasons such as an unreliable input. Normally the logic delay would be about two or three seconds. In this case there is added a delay of approximately two minutes in order to be sure that the most current analog temperature inputs are entered by the analog scan for ATS use.

Once the startup procedure reaches the point where synchronization is to occur, a computer transfer can be executed during the synchronization period. However, synchronization is not allowed to occur during a computer transfer and the computer coming into control requires a restart of the synchronization procedure where the computer going out of control failed at the beginning or at some intermediate point of the synchronization procedure.

Once the control system 11 has the turbine and the boiler in the load operation, the transfer system executes smooth computer transfers under widely varying conditions of plant load operation. On fast load changes, such as a drop from 650 MW to 400 MW occasioned by a plant or external contingency, the control system 11 can smoothly execute a computer control transfer in response to a computer system malfunction such as an analog trap normally to provide automatic control continuity for the plant in a safe manner as the large and fast load swing is in process. Such transfer is achieved with better, faster and more accurate overall response to the plant contingency than could be expected to be provided by a plant operator. In some instances, the plant contingency could be such that the 15 seconds or less required for automatic control to be reached in the backup computer could be critical as to whether the particular contingency has deteriorated to the point that a boiler or turbine trip is initiated. However, in those instances as well as in other instances where automatic control continuity would avoid a contingency trip, operator backup control would likewise be expected to lead to a trip because of the complexity involved in judging how the equipment in the plant is interacting during the contingency.

As one illustration, an experienced plant contingency was one in which a boiler feed pump turbine tripped leaving only one such turbine in service and requiring a fast load runback from 700 MW to 350 MW. The plant was on operator control at the time and the operator was unable to coordinate the plant operations to prevent a plant trip. At a later time after the boiler feed pump turbine had been repaired and with the computer control system 11 on automatic, the power plant was operating at 650 MW and the other boiler feed pump turbine failed. The plant quickly ran back to 350 MW under automatic control with some overshoot but without a plant trip. In the latter case, no computer transfer was triggered during the contingency, but if a transfer had been triggered the system would have had some reduced capability of a safe automatic response without a plant trip because of the transfer time. However, the resultant safe nontrip response capability would still be better than the capability of an operator safely to avoid a trip under such circumstances.

Generally, a 15 second time period is allowed by the boiler logic program 50 for a computer transfer to be executed with return to automatic. If the computer coming into control has not had a logically determined set of boiler control loops put on automatic to result in the boiler control being considered to be automatic as a whole, the boiler operation is restricted to the state of automation then existing and the plant is placed in the separate turbine and boiler control mode. The restriction is premised on the judgment that automatic control should be reached within the 15 second time frame and if it has not it is presumed that the operator's attention is required.

The transfer system is capable of transferring control between computers in all modes of load operation. This is because the noncontrolling computer is updated as to the mode of the controlling computer by the 5 minute data link, and the boiler logic program 250 and the turbine logic program cause the computer coming into control to set up the boiler and turbine control loops to fit the plant mode required.

In this particular case, the standby computer 90-2 is not programmed to put the impulse pressure and magawatt loops in service and they are therefore rejected on a transfer from the computer 90-1. The reason for this is that the plant is operated most of the time in the coordinated mode in which the turbine IMP and MW loops are out of service. Therefore, the turbine IMP and MW loop availability in the primary computer 90-1 was judged to be sufficient for plant operations in this case.

In order to hold the DEH hybrid against taking manual control and generating a manual control panel indication during a computer transfer, a timing circuit is employed to delay a turbine manual override which would otherwise occur with the use of circuitry which activates the manual control into operation on the loss of computer control. the delay is set at 20 seconds, somewhat greater than the 15 second time span allowed for a computer transfer with return to automatic mode of operation. More detail on the turbine manual interface is presented subsequently herein.

In the valve management operation of the turbine governor valves during the load mode, the characterization used to generate valve position demands as a function of steam flow demand in the single valve mode or the sequential valve mode is dependent on the operating load level. Thus, in this embodiment, a linear characterization is employed for loads up to 70% load, and above 70% load a different characterization is employed for each of several preselected bands of load variation. The reason for this is that the valve pressure drop increases and the valve flow coefficient changes over the load range.

In order to track the noncontrolling computer to the governor valve position, the valve positions are read by the noncontrolling computer, the flow versus position characterization is determined, and the impulse pressure, megawatt and load demands are back calculated. In addition, the single valve AO and the sequential valve AO's are read as generated by the controlling computer.

In instances where the load level is above 70%, the time to complete valve tracking can become conflicting with the time during which a computer transfer is to occur with return to automatic and without rejection to turbine manual. Thus, the back calculation process above 70% load is an iterative process in which the valve position based on input valve position value is compared to a valve position generated by multiplying a flow coefficient against a stored linear relationship of flow versus position. Each iteration involves a flow coefficient applicable to one of the load bands. When the actual valve position matches the calculated position within a deadband, the operating load range and associated flow coefficient is then identified and valid calculations can proceed with use of the identified characterization (flow coefficient and linear relationship). In this case, the time allowed for return to automatic without rejection to manual on a transfer is 20 seconds. Therefore, the iterative back calculation procedure employs a total of 17 bands or 17 flow coefficients between 70% load and 100% load so that the tracking calculation can be completed in about 17 seconds or so in the worst case (highest load in this instance) and thereby allow some additional time so that the computer coming into control can execute the logic necessary to bring the system up to plant coordinated control without a rejection to manual. If the resolution of the valve back calculation is reduced too much, excessive error could occur on control transfer because of differences in the back calculated demand and the actual demand. The resolution provided by the present embodiment allows transfer and return to automatic and it leads to a maximum error of about 1-¾% between the back calculated and actual load demand.

It is noted that the tracking procedure could take longer than indicated above if a steam flow disturbance occurs during the period of a computer transfer. In that event, a rejection to turbine manual could occur at higher loads because of the added calculation time as compared to the normal calculation procedure when no significant steam flow disturbance has occurred.

4. Computer Transfer Switching System

Figure 15B:
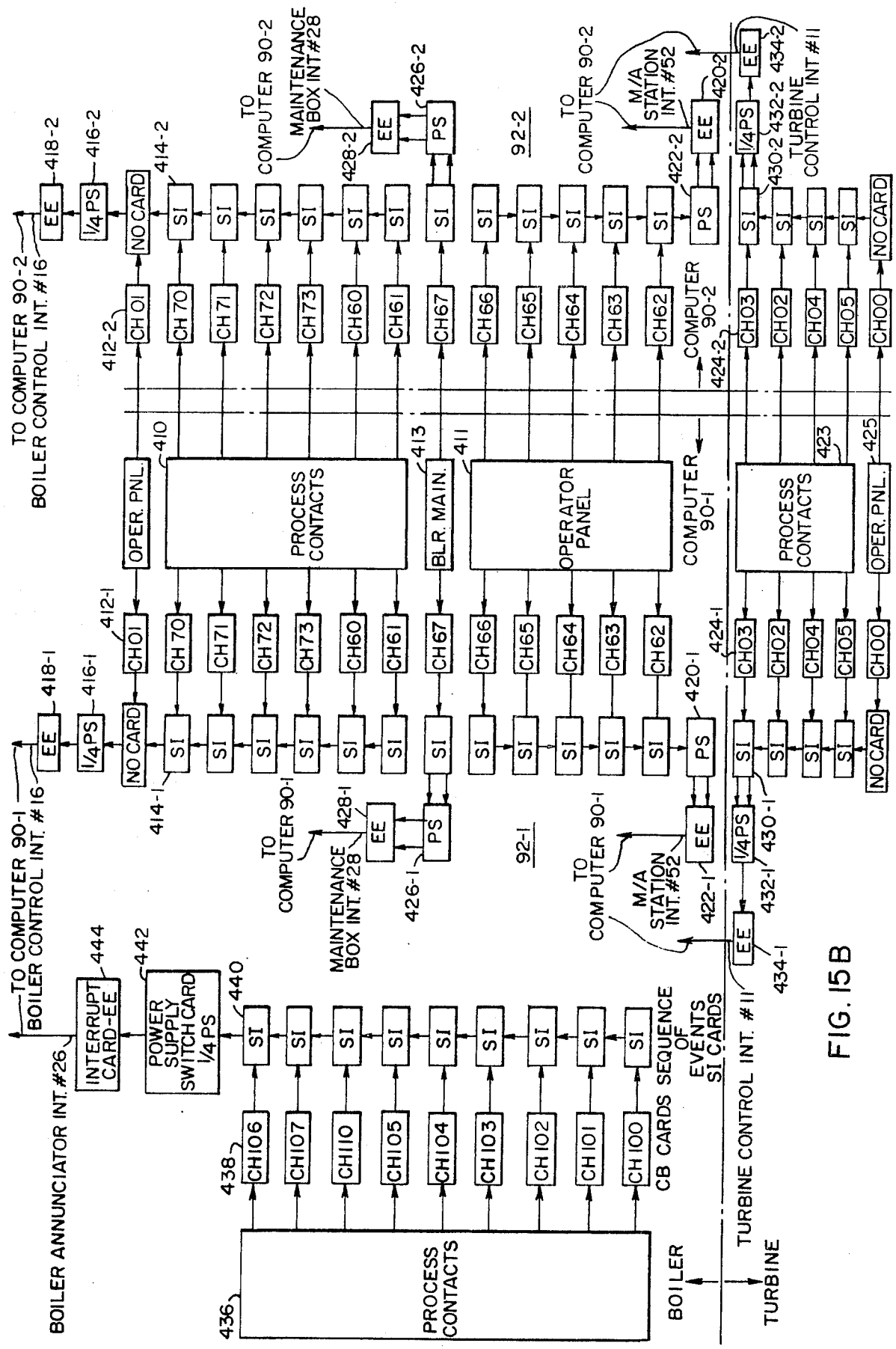
FIG. 15B shows a schematic diagram of CCI systems provided for the computers of FIG. 4.
Figure 15C:
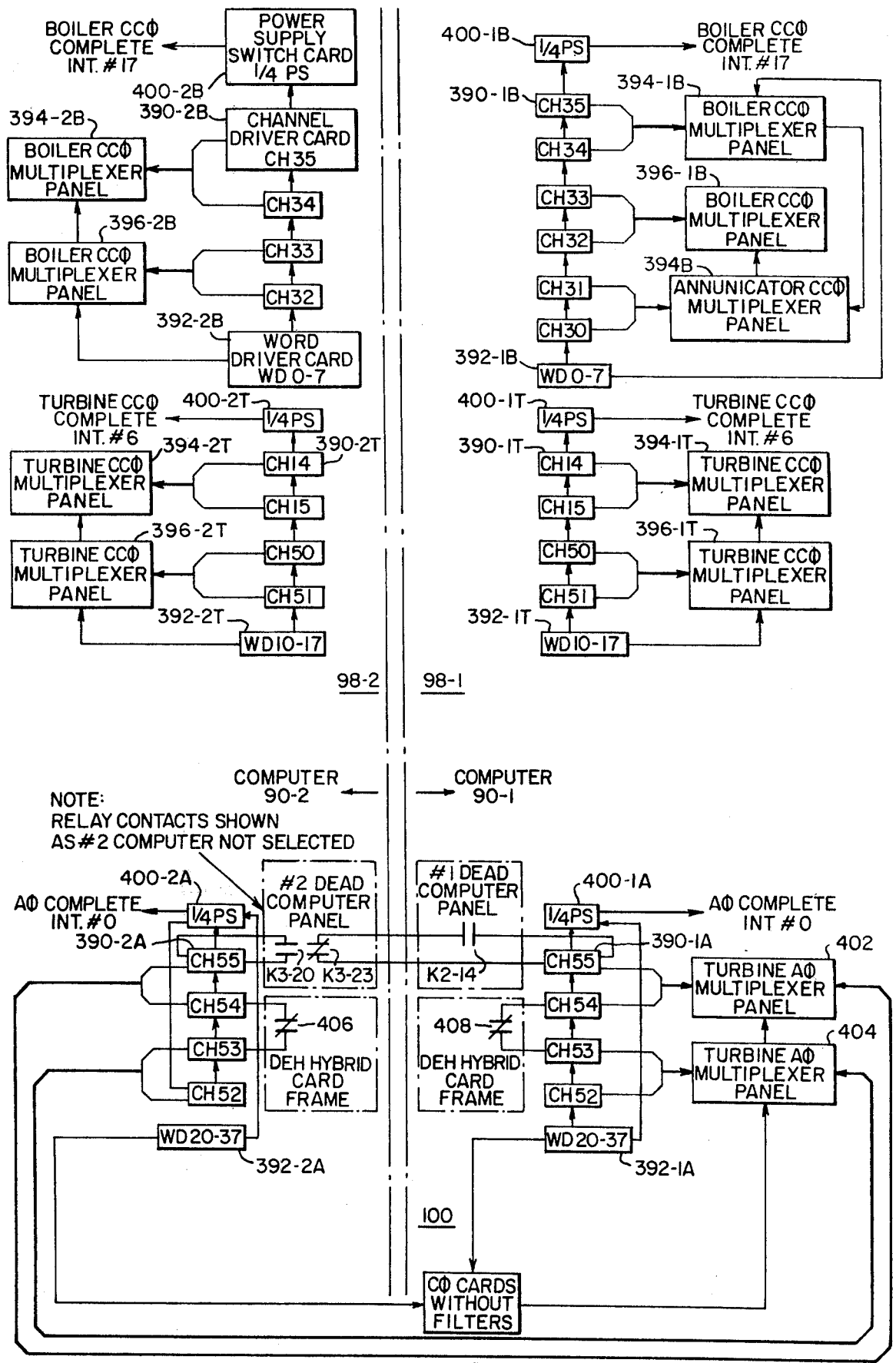
FIG. 15C shows a schematic diagram of CCO systems and an analog output system provided for the digital computers shown in FIG. 4.
Figure 15D:
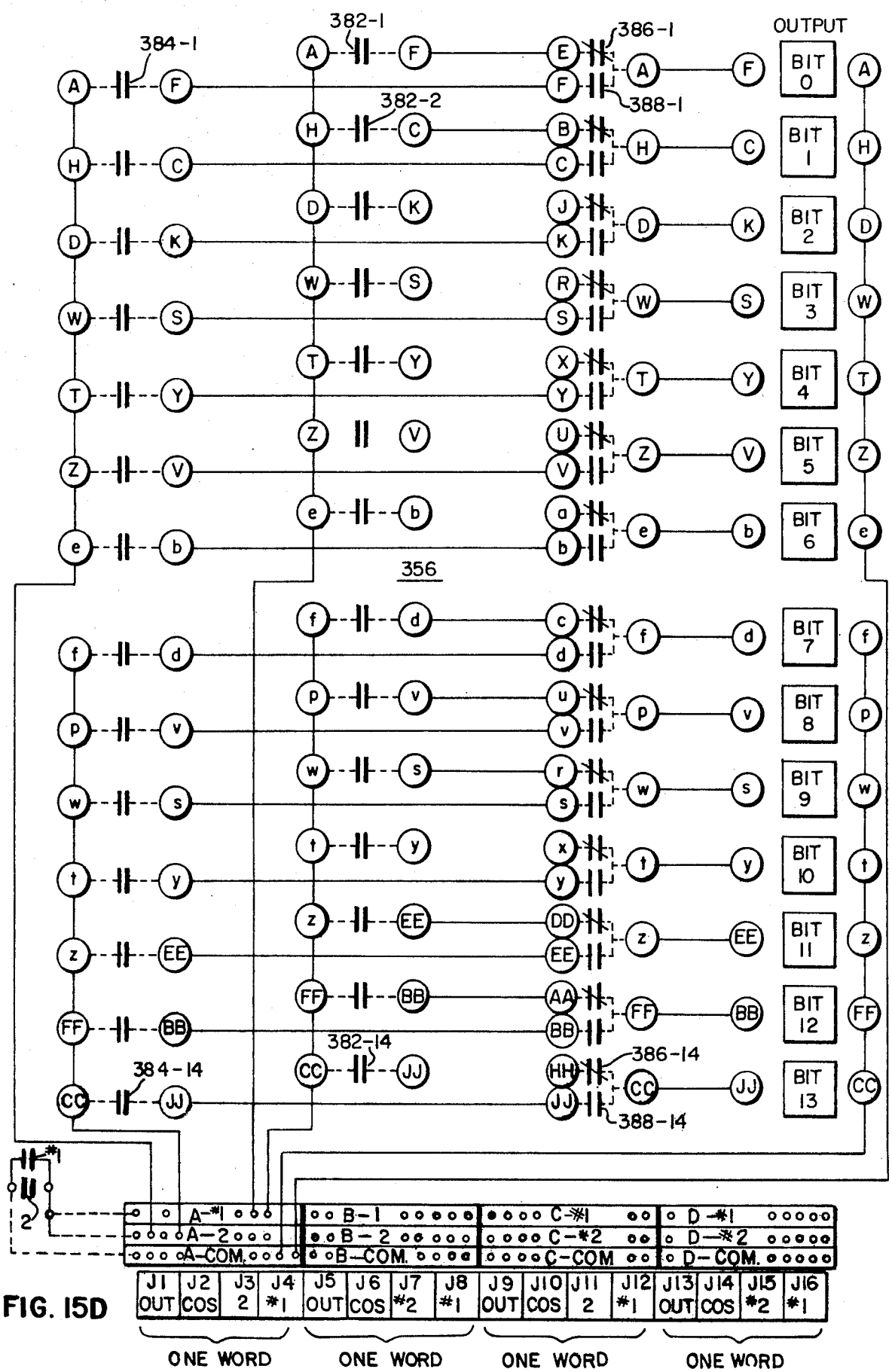
FIG. 15D shows a schematic view of a transfer panel used to switch the control system output to the CCO system of the controlling computer.

The CCO transfer panel 356 is partially shown in FIG. 15D. Since the panel 356 is an interconnection panel for a large number of relay contacts, Elco connector pins are used to establish the interwiring. Dotted lines indicate wiring external to the panel. Encircled letters indicate the Elco connector pins. With some few exceptions, each CCO 382 from the computer 90-1 (only one word of CCO's is shown) preferably is wired with a corresponding CCO 384 from the computer 90-2 through respective normally closed and normally open transfer contacts 386 and 388 of a monostable transfer relay. All of the monostable relays are either energized or deenergized according to the state of the K3 transfer relay 352 on the dead computer panel.

Upon energization of the transfer relays, the transfer contacts 386 and 388 are changed in state to couple the CCO's from the computer 90-2 to the boiler and the turbine. Upon deenergization of transfer relays, the transfer relay contacts 386 and 388 return to their normal state to couple the CCO's from the computer 90-1 to the boiler and the turbine.

5. CCO System and AO System

The CCO system 98-1 and 98-2 and the analog output system 100 are shown in greater detail in FIG. 15C. Preferably the two CCO systems 98-1 and 98-2 are provided to obtain increased system reliability relative to a system having a single CCO system shared by two computers. Further, each CCO system 98-1 or 98-2 is preferably divided into independent boiler and turbine CCO channels. On the other hand, it is preferred that the single analog output system 100 be employed to avoid complications that would then be involved in interfacing the DEH hybrid with the control computers.

In the analog output system 100, a standard contact operated ladder resistor network generates analog signals in correspondence to patterns of relay contact closures. The two computers share the analog output system 100 and on computer transfers the K-3 relay provides for switching the analog output system 100 between the CCO systems 98-1 and 98-2.

Channel driver cards 390-1B and a word driver care 392-1B operate two boiler contact closure output multiplexers 394-1B and 396-1B and a boiler annunciator multiplexer 398D in order to drive particular system relay contacts in accordance with CCO Handler outputs. On completion of a CCO operation, a power switch card 400-1B causes a CCO completion interrupt No. 17 to be generated in the computer 90-1.

Similarly in the standby computer 90-2, channel driver cards 390-2B and a word driver card 392-2B operate two boiler CCO multiplexers 394-2B and 396-2B to drive particular system relay contacts in accordance with CCO Handler outputs. A power switch card 400-2B causes a CCO completion interrupt to be generated in the computer 90-2.

With respect to turbine control, the CCO system 98-1 is provided with channel driver cards 390-1T and a word driver card 392-1T which operate two turbine CCO multiplexers 394-1T and 3-1T to drive particular system relay contacts in accordance with CCO Handler outputs. An interrupt No. 6 is generated for the computer 90-1 upon turbine CCO completion.

Similarly, the CCO system 98-2 is provided with channel driver cards 390-2T and a word driver card 392-2T which operate turbine multiplexers 394-2T and 396-2T to drive particular system relay contacts in accordance with CCO Handler outputs. The turbine CCO completion interrupt for the computer 90-2 is also identified as interruption No. 6.

With respect to analog outputs, channel driver card 390-1A and a word driver card 392-1A operate two analog output multiplexers 402 and 404 if the computer 90-1 is in control. A power switch 400-1A generates an analog output completion interrupt No. 0 after completion of each analog output. If the computer 90-2 is in control, channel driver card 390-2A and a word driver card 392-2A operate the multiplexers 402 and 404 and a power switch 400-2A generates an analog output completion interrupt No. 0 after completion of each analog output.

The analog output multiplexers 402 and 404 are switched between the two computers by special CO card enabling contacts K3-17 and K3-20 operated by the dead computer K2 and K3 relays 334-1 and 352. Contacts 406 and 408 operated by a DEH hybrid relay are normally closed to enable the analog output system 100, and they are opened if the computer rejects to manual thereby holding the analog outputs at their last values.

6. CCI System

As in the case of CCO's, it is preferred that CCI's be handled by the two separate CCI systems 92-1 and 92-2 (FIG. 15B) for the two computers 90-1 and 90-2. Further, each CCI system is provided with separate boiler and turbine input channel addresses.

Boiler process contacts 410, operator panel contacts 411 and maintenance panel contacts 413 are coupled to the computer 90-1 and th computer 90-2 respectively through CB cards 412-1 and 412-2 and sequence of events cards 414-1 and 414-2. Power switch cards 416-1 and 416-2 respectively operate computer interrupt cards 418-1 and 418-2 when a boiler contact changes state. Manual/automatic station contact changes are channelled respectively through power switch cards 420-1 and 422-2 and interrupt cards 422-1 and 420-2, and maintenance panel contact changes respectively go through power switch cards 426-1 and 426-2 to interrupt cards 428-1 and 428-2.

Similarly, turbine process contacts 423 and operator panel contacts 425 are coupled to the computers 90-1 and 90-2 respectively through CB cards 424-1 and 424-2 and sequence of events cards 430-1 and 430-2. Power switch cards 432-1 and 432-2 respectively activate interrupt cards 434-1 and 434-2 on a change in a turbine system contact.

A boiler annunciator input channel is provided for the computer 92-1 only and it includes process contacts 436 which are tied to CB cards 438 and sequence of events cards 440. Annunciator interrupts are generated by annunciator contact changes through a power switch card 442 which operates an interrupt card 444.

7. Analog Input System

The analog input systems 94-1 and 94-2 are shown in greater detail in FIG. 15A1 and 15A2. Redundant analog input systems are preferred for the two computers to obtain added system reliability. Further, each analog input systems 94-1 or 94-2 is divided into separate analog input channels for turbine and boiler analog inputs.

In the boiler analog input channel, a channel driver card 446 and word driver cards 448 and 449 operate under analog handler control with an annunciator multiplexer 450 and a boiler multiplexer 452 and a boiler part of a turbine multiplexer 468 to connect specified analog point relays to a boiler VIDAR 454. Control cards 456 operate the VIDAR 454 to convert analog input signals to digital signals which are applied to the computer 90-1. After completion of each analog input, an interrupt PSSO is generated.

An analog trap card 458 and summing resistor cards 460 and 461 are associated with the channel and word driver cards 446 and 448 to provide an analog trap in the manner previously described. An interrupt card 462 generates analog trap interrupts which as already indicated trigger protective computer control transfers. Interrupt No. 51 is a turbine analog trap and interrupt No. 55 is a boiler analog trap.

In the turbine analog input channel, a channel driver card 464 and a word driver card 466 operate with the turbine multiplexer 468 and a turbine multiplexer 470 to connect specified analog point relays to a turbine VIDAR 472. In this instance, several slots in the turbine multiplexer 468 are isolated from the turbine channel and connected in the boiler channel as already indicated in order to make needed use of words not otherwise used in the turbine multiplexer panel 468. Control cards 474 operate the VIDAR 472 to convert analog input signals to digital signals which are applied to the computer 90-1.

An analog trap card 476 and a summing resistor card 478 are associated with the channel and work driver cards 464 and 466 to provide the described type of analog trap. Turbine analog trap interrupts are applied to the computer through the interrupt card 462.

The analog input system 94-2 is like the analog input system 94-1 and therefore like reference characters are used in correspondence to those used for the analog input system 94-1.

Manual Backup Control System For Dual Computer Control

The DEH Hybrid Panel provides manual backup turbine control and the various boiler control loops are provided with manual backup control with the employment of direct wiring from the operator panel M/A stations to the electric motor actuators and other boiler control devices. Manual backup control for the turbine or the boiler is obtained by operator selection or by rejections from automatic.

Thus, if one of the computers fails and the other computer is unavailable for operation, the boiler and the turbine backup manual controls are switched into control as a result of a logical generated by the boiler logic program 250 in the controlling computer. If the operator selects the noncontrolling computer for operation when it is unavailable, the boiler logic program 250 inhibits a transfer to the unavailable computer and does not trigger a transfer to manual. If the data link is not functioning as communicated to each computer through CCI's or by software flags, the boiler logic program 250 disables the noncontrolling computer from going to the automatic mode should a computer transfer occur.

A process rejection from automatic can also transfer the control from automatic to manual operation to an extent dependent on the nature of the rejection. Such a rejection is generated as a logical variable in the control logic on the occurrence of a process contingency such as a loss of a feed pump. For example, a turbine contingency could cause a reject to turbine manual while the boiler holds at its then existing level of automation. As another example, a boiler contingency could cascade a large portion of the boiler control from automatic to manual while the turbine holds on automatic control.

As already indicated, boiler manual control is provided for electric motor and other actuators which are operated by direct wiring from the operator panel. The turbine manual control is physically housed in the DEH Hybrid Panel as schematically illustrated in FIGS. 16A-16J. The overall organization of the multiple computer control system with backup turbine manual control is shown in FIG. 16J and it will be described herein only to the extent necessary for an understanding of the invention. Reference is made to the aforementioned Braytenbah U.S. Pat. No. 3,741,246 issued June 26, 1973 and entitled "Steam Turbine System With Digital Computer Position Control Having Improved Automatic/ Manual Interface" for more detail on a manual turbine control which is generally like the one shown in FIG. 16J, but that manual control is arranged for operation with a single digital turbine control computer.

During computer control, the computer 90-1 or 90-2 generates position signals for throttle valve controls 401 and governor valve controls 403 during the startup and load modes of operation. Generally, throttle valve position control is used during turbine acceleration and governor valve position control is used during load operation. The governor valves can be operated in either the single valve mode or the sequential valve mode, and in this case.

A throttle valve track circuit 409 provides for channeling either the computer throttle valve control signal or an operator manual throttle valve control signal from the operator panel to the throttle valve servos. In addition, the throttle valve track circuit 409 provides for tracking the turbine manual control to the computer throttle valve control to enable transfers to manual to be executed bumplessly.

Similarly, a governor valve track circuit 411 provides for channeling either the computer single valve control signal or an operator manual single valve control signal to the governor valve servos. The governor valve track circuit 411 also provides for tracking the turbine manual control to the computer single valve control for the governor valves so as to enable transfers to manual to be executed bumplessly. If the governor valves are in the sequential mode at the time of a transfer the manual, the computer single valve output is zero to make the manual single valve signal zero and the last computer sequential valve signals are held on the governor valve servos after the transfer with valve positions thereafter defined by the combined effect of the held sequential signals and any operator entered manual single valve signal.

Figure 16A:
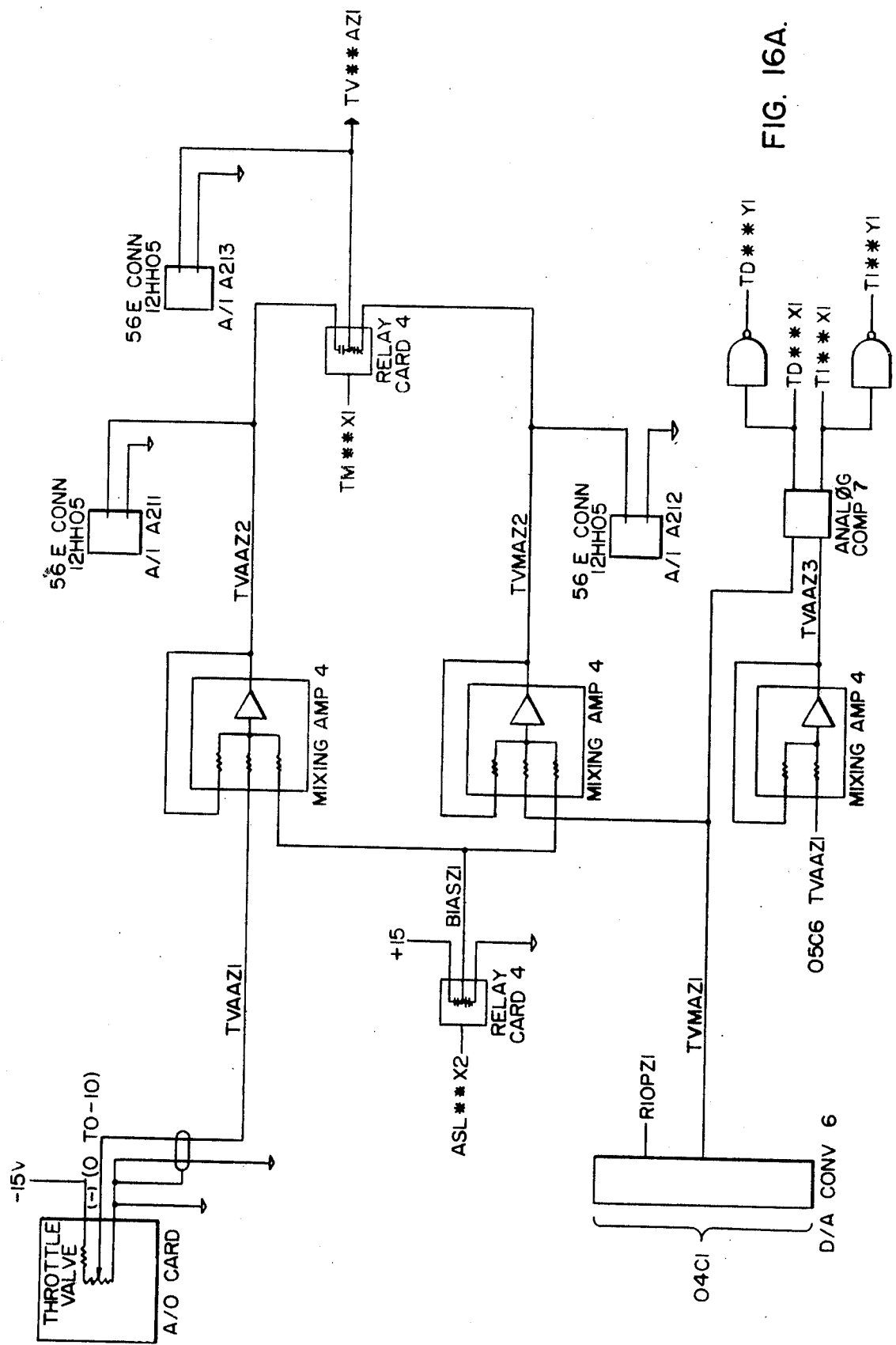

In FIG. 16A, a throttle valve analog output card generates a signal TVAAZ1 which is applied to a mixing amplifier to generate an automatic throttle valve output signal TVAAZ2. Similarly, an operator manual throttle valve signal TVMAZ1 is obtained from a TV UP/DOWN counter 413 (FIG. 16J) and applied to a mixing amplifier to generate a manual throttle valve output signal TVMAZ2. If the turbine is not latched, a relay card generates a signal BIASZ1 to bias the throttle valves closed through both mixing amplifiers. The output throttle valve control signal is the signal TVAAZ2 if a turbine flip-flop 405 (FIG. 16J) is set to operate a relay and hold a normally open contact closed and thereby pass the signal TVAAZ2 to the output. Simultaneously, a normally closed contact is held open to block the manual signal TVMAZ2 from appearing as the output. If the flip-flop 405 is reset by a contingency event or by operator selection, the throttle valve control output signal is made equal to the manual signal TVMAZ2. To provide for bumpless transfer when the control is switched from automatic turbine control to manual backup turbine control, the automatic throttle valve control output signal TVAAZ1 is amplified and compared to the manual throttle valve control output signal TVMAZ1 by an analog comparator. Outputs TDY1 and TDX1 and outputs T1Y1 and T1X1 are generated and applied to the TV UP/DOWN counter 413 to track the counter output to the computer signal. The TV counter output is applied to a digital to analog converter which in turn generates the manual TV signal TVMAZ1. After a transfer to manual, operator panel signals increment or decrement the counter 413 to change the value of the signal TVMAZ1. The manual throttle valve control output signal TVMAZ2 is applied as an analog input to the computers for tracking purposes.

Figure 16B:
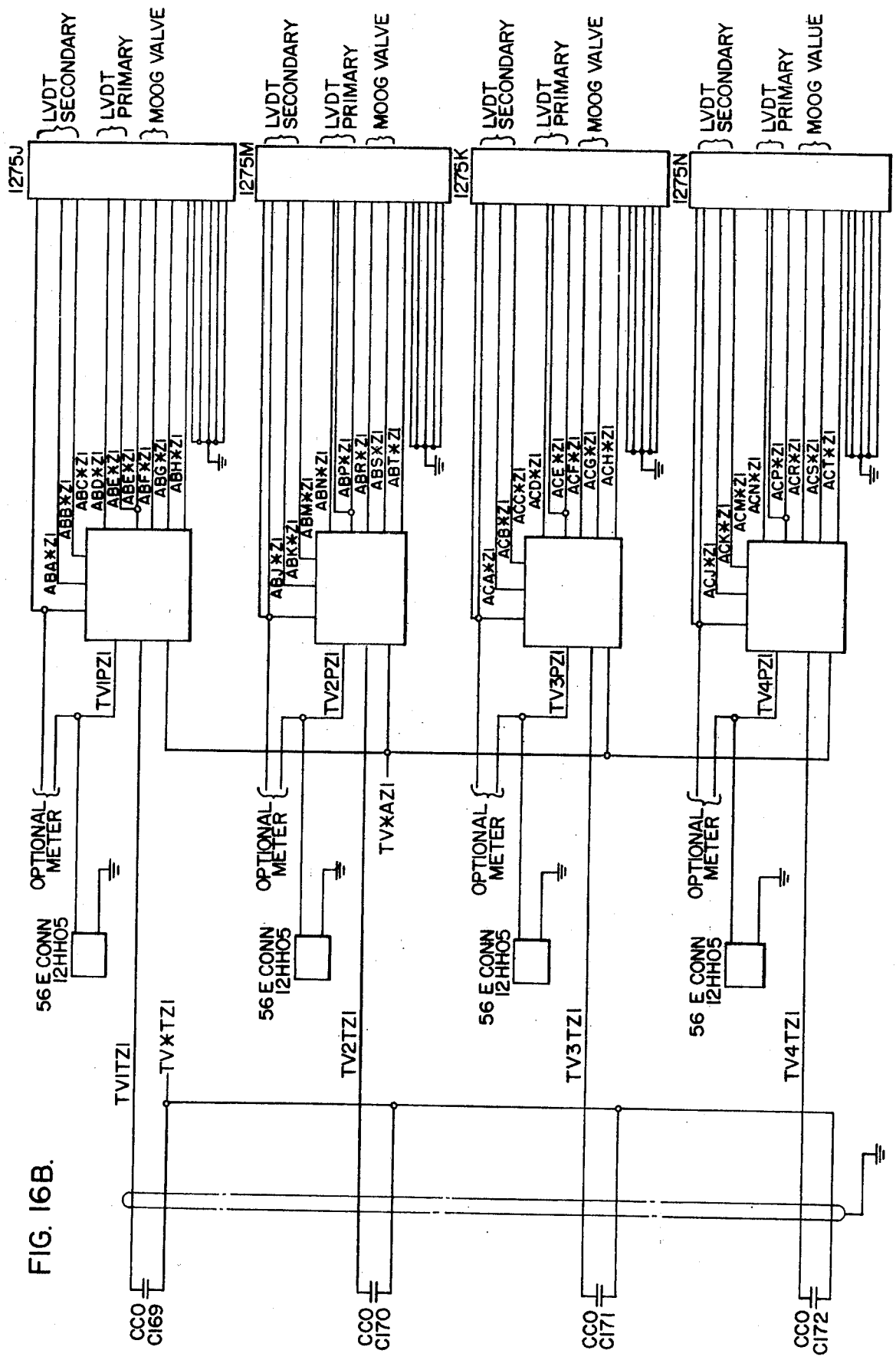
Figure 16C:
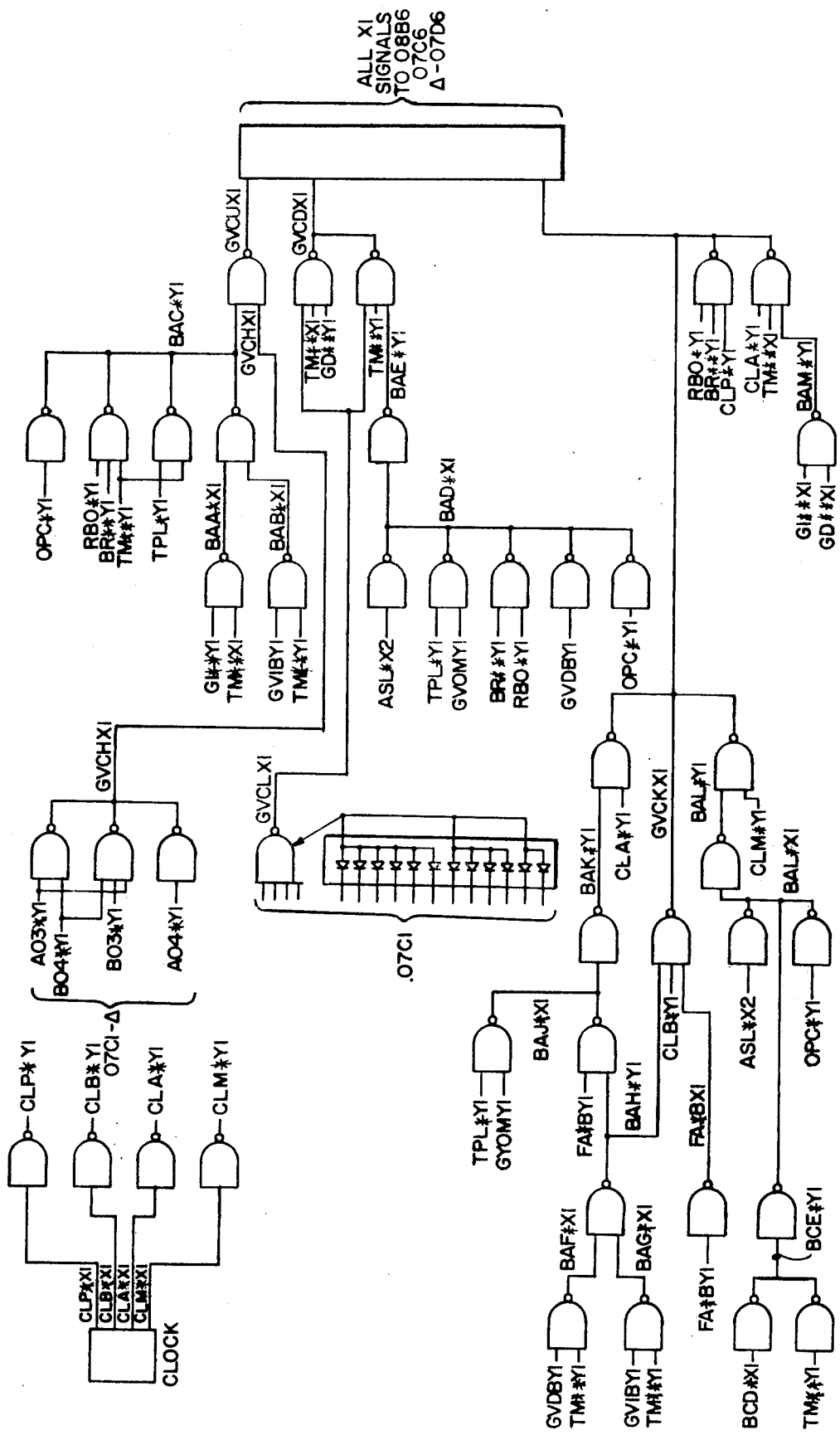

As shown in FIG. 16B, the throttle valve control signal TV*AZ1 is applied to respective servos for the four throttle valves. The control outputs of the servos are applied to the respective Moog valves and respective valve position feedback signals are applied to the servos by the LVDT circuits. The throttle valve position feedback signals are also applied to the computers 90-1 and 90-2 through the block 12HHO5. It is noted that signals TV1PZ1 through TV4PZ1 are throttle valve test signals applied to the servos by computers CCO's during throttle valve testing.

Figure 16D:
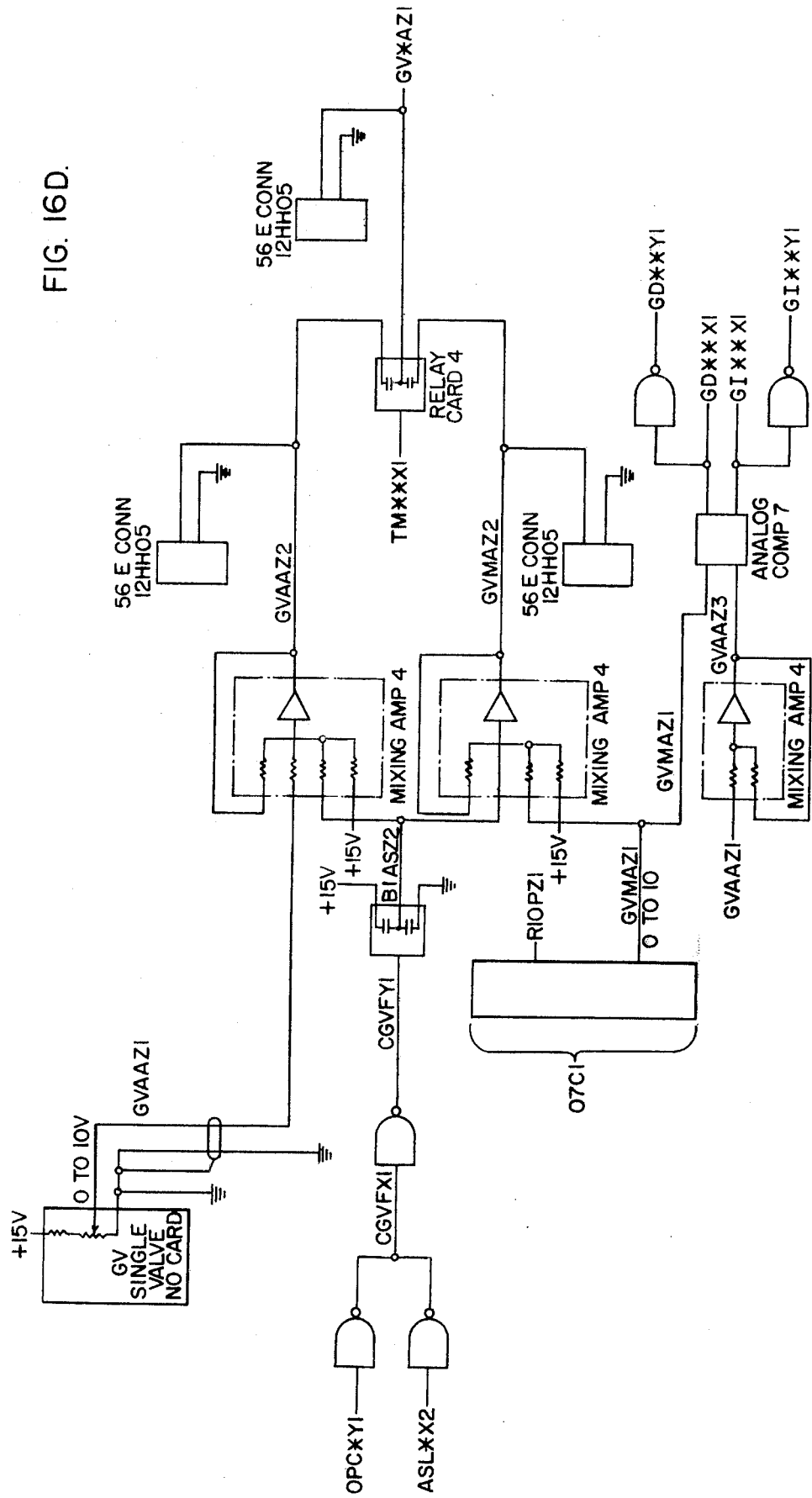

As shown in FIG. 16D a single valve signal GVAAZ1 is applied to an amplifier to generate an automatic single valve control signal GVAAZ2. A governor valve operator manual signal GVMAZ1 is applied to an amplifier to generate a manual single valve signal GVMAZ2. The manual/automatic flip-flop 405 determines whether the single governor valve output control signal is the automatic signal GVAAZ2 or the manual signal GVMAZ2. If the turbine is not latched, the governor valves are biased closed by a signal BIASZ2. The governor valve manual signal GVMAZ2 is also applied as an analog input to the computers for tracking purposes. As in the case of throttle valve control, the computer single valve signal GVAAZ1 is amplified and compared to the manual governor valve signal GVMAZ1 and comparator output signals are developed to cause a GV UP/DOWN counter 415 to track the computer single valve signal. Thus, the GV counter 415 is connected to a D/A converter which generates the tracked manual single valve signal GVMAZ1.

Figure 16E:
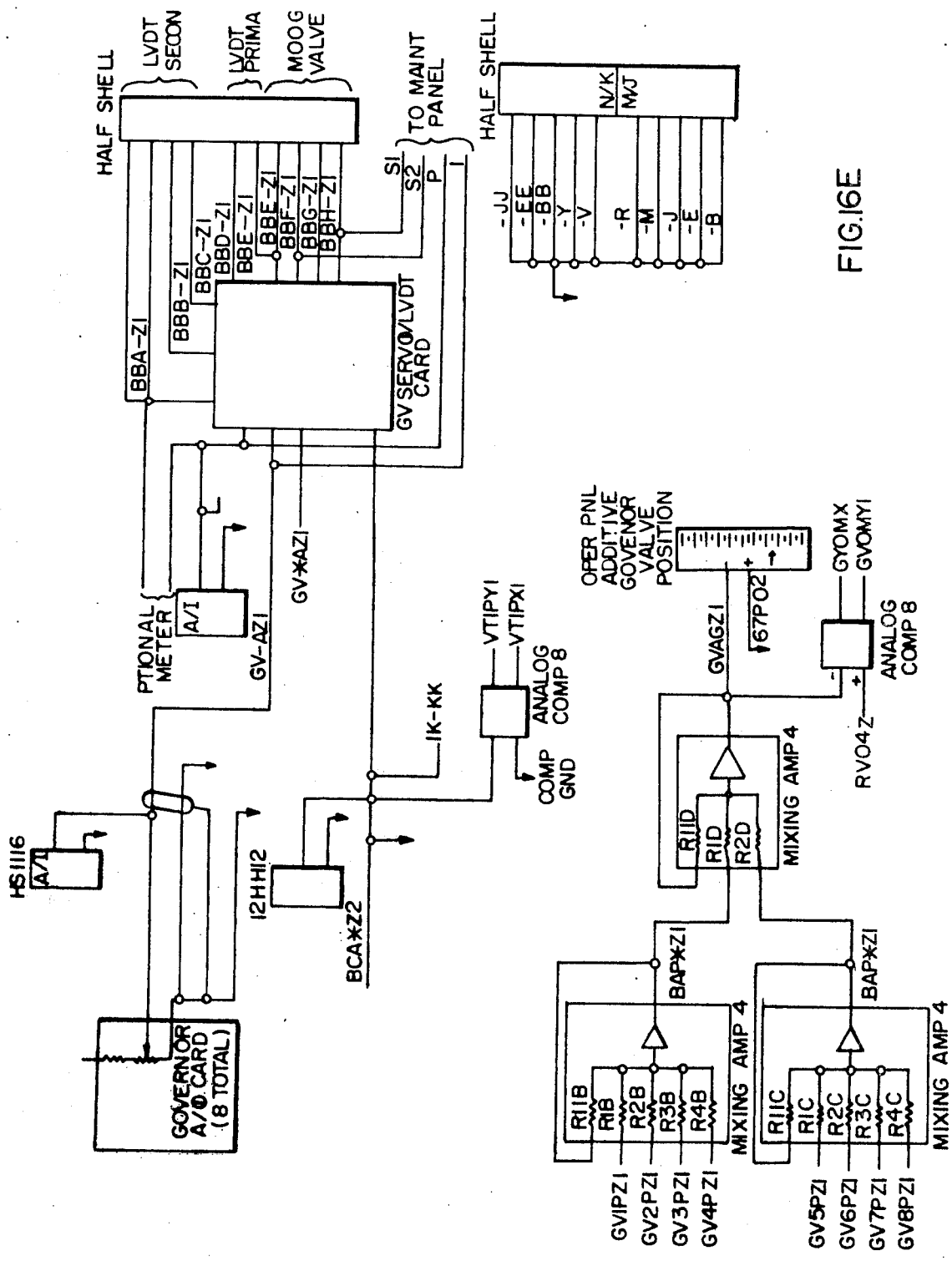
Figures 1, 16F:
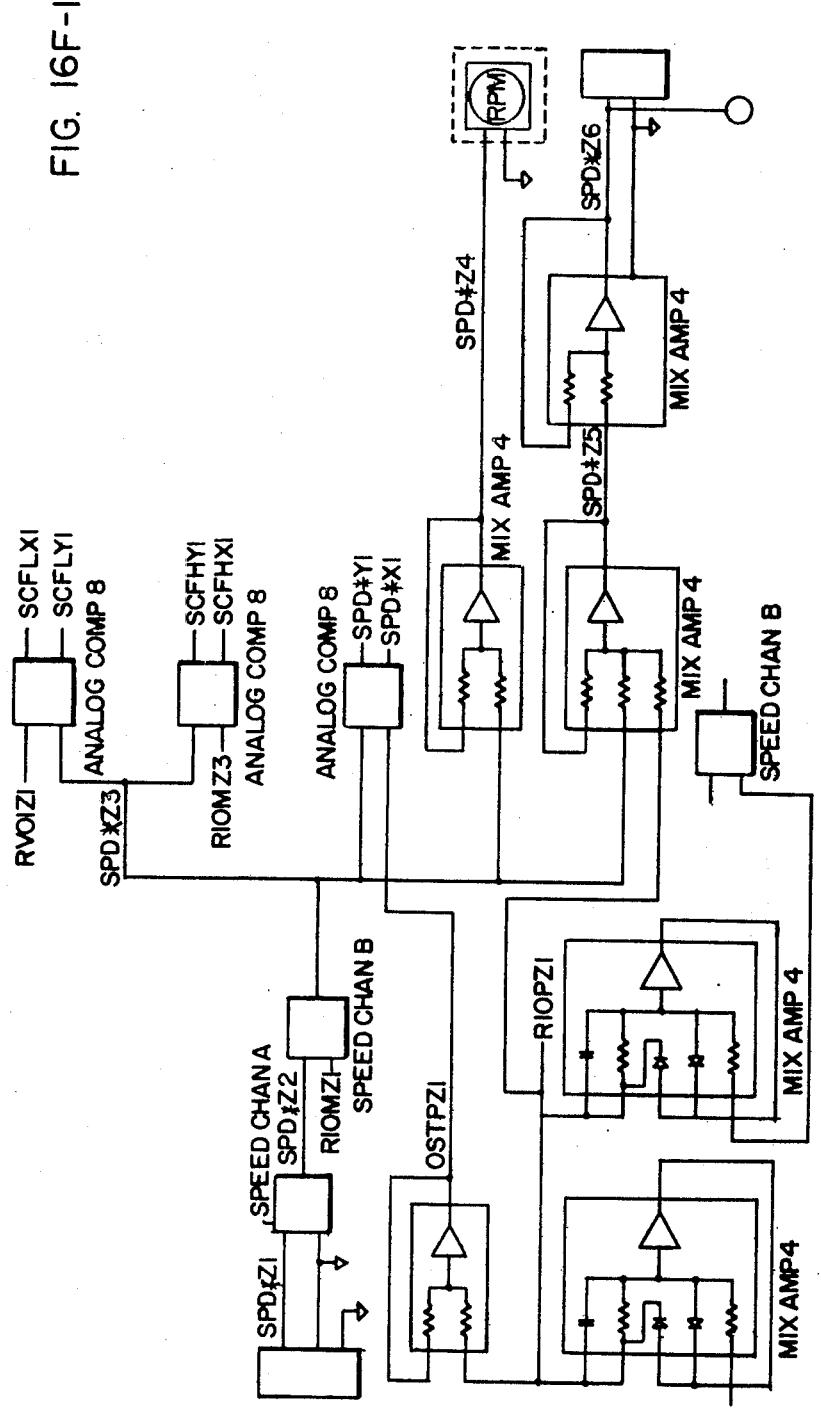

With respect to FIG. 16E, eight separate output signals from the sequential governor valve output signals GV-AZ1 (GVIAZ1 through GV8AZ1) are applied directly to respective governor valve servo cards. In addition, the single valve signal GV*AZ1 is applied to the same cards. In FIG. 16E, only one governor valve servo is shown with its input circuit since it is representatine of all others. The servos operate the governor valves through the Moog valves and LVDT circuitry provides position feedback signals which are applied to the servos for fast valve position control as well as to both computers for purposes of tracking in the noncontrolling computer or computers and for purposes of output comparison in the controlling computer. If the turbine is in the sequential valve mode, the signals GV1AZ1 through GV8AZ1 have magnitudes determined by the computer and the single valve signal GVAZ1 has a magnitude of zero. In the single valve mode, the single valve signal has a magnitude under computer control and the sequential valve signals are zero. As already indicated, the governor valves are limited to single valve operation in the manual mode. In the lower left area of FIG. 16E, there is shown circuitry for generating an additional governor valve position indication.

Figure 16H:
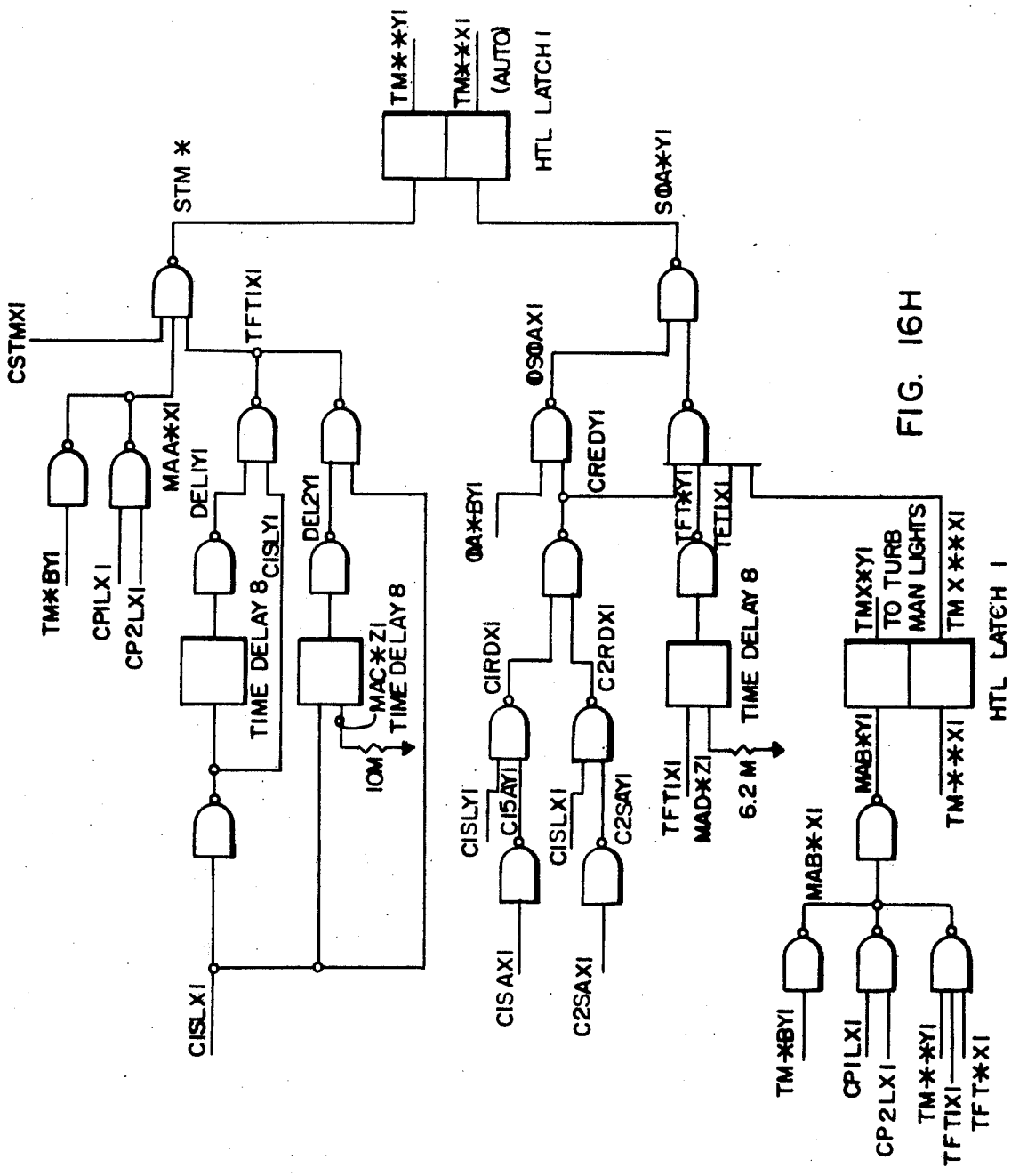

An arrangement is shown in detail in FIG. 16H for operation the turbine manual/automatic flip-flop 405 so as to signal the manual control which computer has control of the turbine and the boiler and so as to provide for manual control in the event of operator selection or in the event of failure of both computers. The following is an identification of the input logicals:

CP1L Computer No. 1 Live (CCI)
CP2L Computer No. 2 Live (CCI)
CRED Control Computer Ready for Auto
CSTM Computer Select Turbine Manual (CCI)
C1RD Computer No. 1 Ready for Auto
C2RD Computer No. 2 Ready for Auto
C1SA Computer No. 1 Select Auto (CCI)
C2SA Computer No. 2 Select Auto (CCI)
C1SL Computer No. 1 Selected for Control (CCI)
DEL1 Delay signal No. 1
DEL2 Delay signal No. 2
0A*B Operator Auto Pushbutton
OSOA Operator Select Operator Auto
S0A* Select Operator Auto
STM* Select Turbine Manual
TFT* Transfer Time
TFT1 Transfer Time First Half
TM** Turbine Manual
TM*B Turbine Manual Pushbutton
TMX* Previous State of Turbine Manual
TS0A Transfer Select Operator Auto If a transfer of control from one computer to another occurs, whether because of computer failure or transfer selection, the signal C1SL will change state. This causes the signal TFT1X1 to go to zero for a period of five seconds, holding the Turbine Manual Latch in a reset state. The TMX Latch (previous state of turbine manual), however, retains its initial state during the transfer time unless reset by the manual pushbutton or failure of both computers. This, in turn, keeps the manual lights extinguished during the transfer if the initial state was Auto. After five seconds, the signal TFT1X1 goes to one, but the signal TFT*Y1 remains a one for another 15 seconds. During this 15 second period during which TFT1X1 and TFT*Y1 are both one, the TMX Latch is set to Auto, provided that the previous state was Auto and that the controlling computer has set its Ready contact. If the fifteen second period expires without Auto having been selected, the TMX Latch reverts to Manual, turning on the Manual lights, and the TMX Latch remains in Manual and can no longer be set to Auto unless the Operator Auto pushbutton is pushed while the controlling computer has its Ready contact set. Once Auto is set, the Ready contact need not be kept closed. The Manual State may be selected by the controlling computer setting its Computer Select Turbine Manual Contact. The Manual State will also be set, even overriding a transfer in progress, if both computers are dead, or if the Turbine Manual pushbutton is pushed.

Figure 16I:
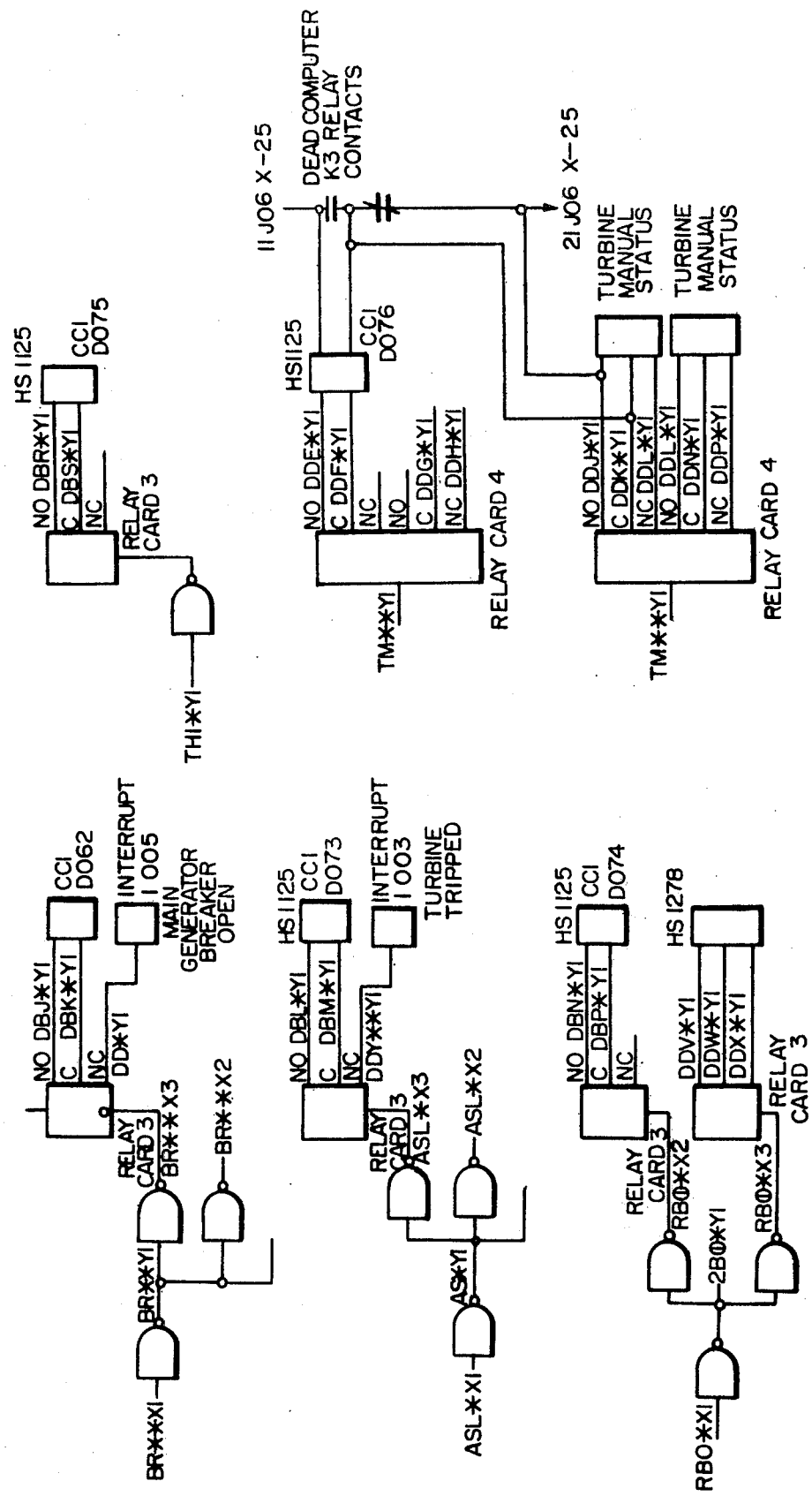
Figure 16J:
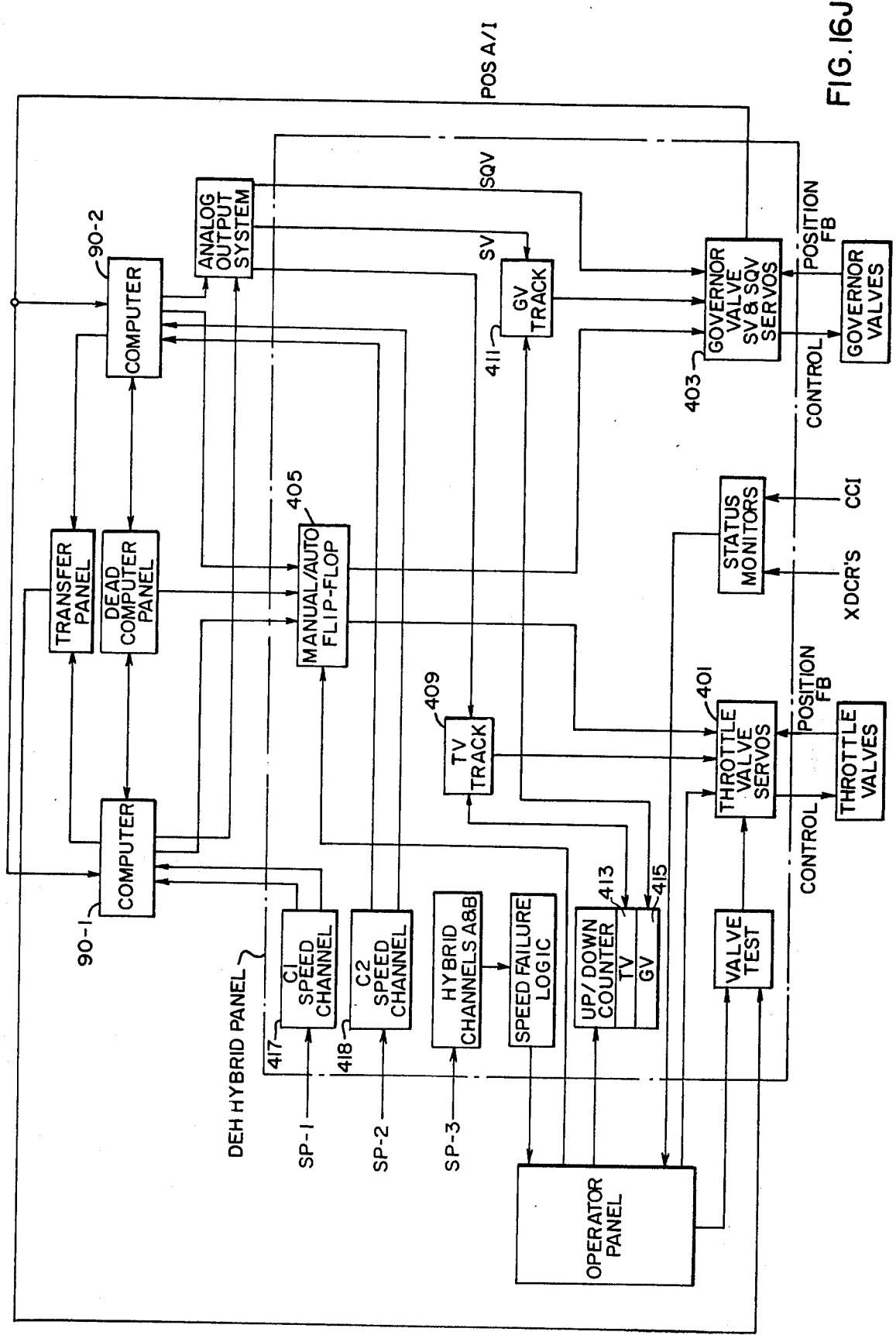

In FIG. 16I there are shown certain process contact inputs to the DEH Hybrid Panel. These include a breaker open relay and a turbine tripped relay. FIG. 16I also shows the dead computer K3 relay contacts in the governor valve analog output interrupt completion return circuitry. This allows operation of the governor valves by the computer in control, and functions as the transfer mechanism for switching control outputs.

The GV UP/DOWN counter 415 is shown in greater detail in FIG. 16C. The signal GVCUX1 represents an UP increment signal input to the counter from either the operator panel or the tracking control 411. Similarly, the signal GVCDX1 represents DOWN increments. The three bottom rightmost blocks in FIG. 16C generate a permissive for the counter. The TV counter 413 is similar to the GV counter 415.

The DEH Hybrid Panel also includes speed channel circuits 417 and 419 which develop respective sets of Fine and Coarse digital speed signals for the two computers from respective digital speed pickup signals SP-1 and SP-2. The speed channel circuitry is shown in detail in FIG. 16F-1 and 16F-2. More descriptive detail is provided on speed channel circuitry like that disclosed herein in a copending and coassigned patent application Ser. No. 247,888, entitled "Improved Turbine Speed Controlling Valve Operation" filed by J. Reuther on Apr. 26, 1972. Serial No. 247,888 is hereby incoporated by reference. The present disclosure differs from Ser. No. 247,888 essentially in improvements made for multiple computer implementation of a turbine speed control loop with digital speed signal inputs.

As shown in FIG. 16F-2, separate digital speed signals are applied to respective speed channels A in the circuit 417 (upper) and the circuit 419 (lower) for the computers 90-1 and 90-2 (see upper leftmost and bottom leftmost blocks for speed pickups in FIG. 16F-2). Coarse and fine digital speed signals are developed in the separate circuits 417 and 419 for input to the respective computers 90-1 and 90-2. Computer input channels operate with interrupts to couple the digital speed signals to the computers. A single crystal oscillator designated as MAINT PANEL is shard by the two circuits 417 and 419. As shown in FIG. 16F-1, speed channel failure detection is provided by the two topmost analog computer blocks. A separate digital speed signal SP-3 is employed with the channel A speed signal in the detector circuitry.

Throttle pressure controller circuitry is also included in the DEH Hybrid Panel as shown in FIG. 16G. Thus, a HTL LATCH 1 controls whether the throttle pressure control is in or out. A time delayed signal TMD*Y1 takes the throttle pressure control out of service on a transfer from automatic turbine control to manual turbine control. Controller operation is provided by an analog computer which has the throttle pressure feedback TPA*Z1 and a throttle pressure setpoint applied to its input.

What is claimed is:

1. A control system for an electric power plant having at least one steam turbine and a steam generator, said control system comprising multiple digital computers including at least a first digital computer and a second digital computer, means for generating input signals representing predetermined process variables associated with said steam generator, means for generating input signals representing predetermined process variables associated with said steam turbine, means for coupling the input signals to both of said computers, each of said computers including means for sequentially controlling its programmed operation and substantially identical means for generating control outputs for operating controllable elements of said steam generator and throttle and governor valves of said steam turbine as a function of the input signals, means for sensing predetermined control system malfunctions, means for coupling the outputs of one of said computers to operate the steam generator controllable elements and turbine valves, means for substantially conforming the structure of the other computer to the structure of said one computer in real time including means for generating control outputs in the other computer substantially equal to those from said one computer, means for generating in said other computer representations of predetermined variables stored in said one computer and normally undetectable from the control outputs of said one computer and subject to change as a result of internal operations of said one computer or as a result of responses to input signals entered only into said one computer even though such signals normally are entered into both computers, and means for executing a transfer in the control of the steam generator and the turbine from said one computer to said other computer substantially without disturbing the power generation when said sensing means detects a control system malfunction.

2. A plant control system as set forth in claim 1 wherein said input signal coupling means includes separate contact closure input systems for said computers commonly responsive to signals from said input signal generating means.

3. A plant control system as set forth in claim 1 wherein said output coupling means includes separate contact closure output systems for said computers and said executing means includes means for coupling contact closure outputs of said other computers to the turbine and uncoupling contact closure outputs of said one computer when a transfer is made.

4. A plant control system as set forth in claim 3 wherein said output coupling means further includes a single analog output system coupled to the turbine and shared by said computers and said executing means includes means for coupling said other computer to said analog output system and uncoupling said one computer from said analog output system when a transfer is made.

5. A plant system as set forth in claim 1 wherein only two computers are provided.

6. A turbine as set forth in claim 5 wherein said structure conforming means and said representation generating means include means for linking data between said computers.

7. A plant control system as set forth in claim 1 wherein said structure conforming means and said representation generating means include means for linking data between said computers.

8. A plant control system as set forth in claim 7 wherein an operator panel is provided with means for generating at least some of the latter input signals for control mode selection and control parameter selection purposes.

9. A plant control system as set forth in claim 1 wherein an operator panel is provided with means for generating at least some of the latter input signals for control mode selection and control parameter selection purposes.

10. A plant for generating electric power comprising at least a steam generator and a steam turbine, a plurality of throttle and governor valves for directing steam from said steam generator to said turbine, and a control system including multiple digital computers including at least a first digital computer and a second digital computer, means for generating input signals representing predetermined process variables associated with said steam generator, means for generating input signals representing predetermined process variables associated with said steam turbine, means for coupling the input signals to both of said computers, each of said computers including means for sequentially controlling its programmed operation and substantially identical means for generating control outputs for operating controllable elements of said steam generator and throttle and governor valves of said steam turbine as a function of the input signals, means for sensing predetermined control system malfunctions, means for coupling the outputs of one of said computers to operate the steam generator controllable elements and turbine valves, means for substantially conforming the structure of the other computer to the structure of said one computer in real time including means for generating control outputs in the other computer substantially equal to those from said one computer, means for generating in said other computer representations of predetermined variables stored in said one computer and normally undetectable from the control outputs of said one computer and subject to change as a result of internal operations of said one computer or as a result of responses to input signals entered only into said one computer even though such signals normally are entered into both computers, and means for executing a transfer in the control of the steam generator and the turbine from said one computer to said other computer substantially without disturbing the power generation when said sensing means detects a control system malfunction.

11. An electric power plant as set forth in claim 10 wherein said input signal generating means includes separate contact closure input systems for said computers commonly responsive to signals from said input signal generating means and said output coupling means includes separate contact closure output systems for said computers and said executing means includes means for coupling contact closure outputs of said other computer to the turbine and uncoupling contact closure outputs of said one computer when a transfer is made.

12. A plant control system as set forth in claim 11 wherein each of said contact closure systems includes a steam generator contact closure subsystem and a separate turbine contact closure subsystem.

13. An electric power plant as set forth in claim 10 wherein said structure conforming means and said representation generating means include means for linking data between said computers.

14. A steam turbine system operative to receive motive steam and drive an electric generator and produce electric power, and turbine comprising a plurality of turbine sections, a plurality of throttle and governor valves for directing steam through said turbine sections, and a control system including multiple digital computers including at least a first digital computer and a second digital computer, means for generating input signals representing predetermined process variables associated with said steam turbine, means for coupling the input signals to both of said computers, each of said computers including means for sequentially controlling its programmed operation and substantially identical means for generating control outputs for operating said throttle and governor valves of said steam turbine as a function of the input signals, means for sensing predetermined control system malfunctions, means for coupling the outputs of one of said computers to operate said steam turbine valves, means for substantially conforming the structure of the other computer to the structure of said one computer in real time including means for generating control outputs in the other computer substantially equal to those from said one computer, means for generating in said other computer representations of predetermined variables stored in said one computer and normally undetectable from the control outputs of said one computer and subject to change as a result of internal operations of said one computer or as a result of responses to input signals entered only into said one computer even though such signals normally are entered into both computers, and means for executing a transfer in the control of the steam turbine from said one computer to said other computer substantially without disturbing the power generation when said sensing means detects a control system malfunction.

15. A steam turbine system as set forth in claim 14 wherein said input signal generating means includes separate contact closure input systems for said computers commonly responsive to signals from said input signal generating means.

16. A steam turbine systtem as set forth in claim 14 wherein said output coupling means includes separate contact closure output systems for said computers and said executing means includes means for coupling contact closure outputs of said other computer to the turbine and uncoupling contact closure outputs of said one computer when a transfer is made.

17. A steam turbine system as set forth in claim 16 wherein said output coupling means further includes a single analog output system coupled to the turbine and shared by said computers and said executing means includes means for coupling said other computer to said analog output system and uncoupling said one computer from said analog output system when a transfer is made.

18. A steam turbine system as set forth in claim 14 wherein only two computers are provided.

19. A steam turbine system as set forth in claim 14 wherein said structure conforming means and said representation generating means include means for linking data between said computers.

20. A boiler control system as set forth in claim 19 wherein said structure conforming means and said representation generating means include means for linking data between said computers.

21. A turbine operative to drive a generator and produce electric power, said turbine comprising a rotor structure coupled to the generator and driven by motive fluid, means for controlling the flow of turbine motive fluid, and a control system including multiple digital computers including at least a first digital computer and a second digital computer, means for generating input signals representing predetermined process variables associated with said turbine, means for coupling the input signals to both of said computers, each of said computers including means for sequentially controlling its programmed operation and substantially identical means for generating control outputs for operating said flow controlling means of said turbine as a function of the input signals, means for sensing predetermined comtrol system malfunctions, means for coupling the outputs of one of said computers to operate said flow controlling means, means for substantially conforming the structure of the other computer to the structure of said one computer in real time including means for generating control outputs in the other computer substantially equal to those from said one computer, means for generating in said other computer representations of predetermined variables stored in said one computer and normally undetectable from the control outputs of said one computer and subject to change as a result of internal operations of said one computer or as a result of responses to input signals entered only into said one computer even though such signals normally are entered into both computers, and means for executing a transfer in the control of the turbine from said one computer to said other computer substantially without disturbing the power generation when said sensing means detects a control system malfunction.

22. A control system for a boiler comprising multiple digital computers including at least a first digital computer and a second digital computer, means for generating input signals representing predetermined process variables associated with said boiler, means for coupling the input signals to both of said computers, each of said computers including means for sequentially controlling its programmed operation and substantially identical means for generating control outputs for operating controllable elements of said boiler as a function of the input signals, means for sensing predetermined control system malfunctions, means for coupling the outputs of one of said computers to operate the boiler controllable elements, means for substantially conforming the structure of the other computer to the structure of said one computer in real time including means for generating control outputs in the other computer substantially equal to those from said one computer, means for generating in said other computer representations of predetermined variables stored in said one computer and normally undetectable from the control outputs of said one computer and subject to change as a result of internal operations of said one computer or as a result of responses to input signals entered only into said one computer even though such signals normally are entered into both computers, and means for executing a transfer in the control of the boiler from said one computer to said other computer substantially without disturbing the boiler process when said sensing means detects a control system malfunction.

23. A boiler control system as set forth in claim 22 wherein said input signal generating means includes separate contact closure input system for said computers commonly responsive to signals from said input signal generating means and said output coupling means includes separate contact closure output systems for said computers and said executing means includes means for coupling contact closure outputs of said other computer to the turbine and uncoupling contact closure outputs of said one computer when a transfer is made.

24. A boiler control system as set forth in claim 22 wherein an operator panel is provided with means for generating at least some of the latter input signals for control mode selection and control parameter selection purposes.

25. A control system for operating a steam turbine which drives an electric generator and which includes a throttle and governor valves, said control system comprising multiple digital computers including at least a first digital computer and a second digital computer, means for generating input signals representing predetermined process variables associated with said steam generator, means for generating input signals representing predetermined process variables associated with said steam turbine, means for coupling the input signals to both of said computers, each of said computers including means for sequentially controlling its programmed operation and substantially identical means for generating control outputs for operating controllable elements of said steam generator and throttle and governor valves of said steam turbine as a function of the input signals, means for sensing predetermined control system malfunctions, means for coupling the outputs of one of said computers to operate the steam generator controllable elements and turbine valves, means for substantially conforming the structure of the other computer to the structure of said one computer in real time including means for generating control outputs in the other computer substantially equal to those from said one computer, means for generating in said other computer representations of predetermined variables stored in said one computer and normally undetectable from the control outputs of said one computer and subject to change as a result of internal operations of said one computer or as a result of responses to input signals entered only into said one computer even though such signals normally are entered into both computers, and means for executing a transfer in the control of the steam generator and the turbine from said one computer to said other computer substantially without disturbing the power generation when said sensing means detects a control system malfunction.

26. A steam turbine control system as set forth in claim 25 wherein said structure conforming means and said representation generating means include means for linking data between said computers.

27. A steam turbine control system as set forth in claim 25 wherein said input signal coupling means includes separate contact closure input systems for said computers commonly responsive to signals from said input signal generating means.

28. A steam turbine control system as set forth in claim 25 wherein said output coupling means includes separate contact closure output systems for said computers and said executing means includes means for coupling contact closure outputs of said other computers to the turbine and uncoupling control closure outputs of said one computer when a transfer is made.

29. A steam turbine control system as set forth in claim 28 wherein said output coupling means further includes a single analog output system coupled to the turbine and shared by said computers and said executing means includes means for coupling said other computers to said analog output system and uncoupling said one computer from said analog output system when a transfer is made.

30. A steam turbine control system as set forth in claim 25 wherein only two computers are provided.

31. A steam turbine control system as set forth in claim 25 wherein an operator panel is provided with means for generating at least some of the latter input signals for control mode selection and control parameter selection purposes.

32. A steam turbine control system as set forth in claim 31 wherein said structure conforming means and said representation generating means include means for linking data between said computers.

* * * * *